United States Patent
An et al.

(10) Patent No.: US 11,696,000 B2
(45) Date of Patent: *Jul. 4, 2023

(54) METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Seungjoo An, Seoul (KR); Kyoungsoo Moon, Seoul (KR); Jinwon Lee, Seoul (KR); Woosuk Ko, Seoul (KR); Sejin Oh, Seoul (KR); Donghyun Kang, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,231

(22) Filed: Feb. 11, 2022

(65) Prior Publication Data
US 2022/0174374 A1 Jun. 2, 2022

Related U.S. Application Data

(63) Continuation of application No. 17/031,308, filed on Sep. 24, 2020, now Pat. No. 11,265,619, which is a (Continued)

(51) Int. Cl.
*H04N 21/81* (2011.01)
*H04N 21/8358* (2011.01)
(Continued)

(52) U.S. Cl.
CPC ........ *H04N 21/8133* (2013.01); *H04H 20/93* (2013.01); *H04N 21/2353* (2013.01);
(Continued)

(58) Field of Classification Search
CPC .......... H04N 21/8133; H04N 21/2353; H04N 21/23892; H04N 21/4126; H04N 21/4622;
(Continued)

(56) References Cited

U.S. PATENT DOCUMENTS

| | | |
|---|---|---|
| 6,983,059 B2 | 1/2006 | Muratani |
| 9,330,429 B2 | 5/2016 | Barnes et al. |

(Continued)

FOREIGN PATENT DOCUMENTS

| | | |
|---|---|---|
| CN | 1278691 A | 1/2001 |
| CN | 101189783 A | 4/2008 |

(Continued)

OTHER PUBLICATIONS

ETSI, "Digital Video Broadcasting (DVB): Multimedia Home Platform (MHP) Specification 1.1.1," ETSI TS 102 812, V1.2.1, Jun. 2003, pp. 37-67, 188-247.

(Continued)

*Primary Examiner* — Randy A Flynn
(74) *Attorney, Agent, or Firm* — Birch, Stewart, Kolasch & Birch, LLP

(57) ABSTRACT

A method of processing supplementary content in a digital receiving apparatus, includes connecting to an external device being different from a broadcaster; receiving uncompressed audio/video (A/V) content from the external device being different from the broadcaster; extracting audio watermark from the uncompressed A/V content, wherein the audio watermark includes domain type information, time information and event flag; constructing a first uniform resource locator (URL) based on the audio watermark, transmitting a request to a remote server based on the first URL; receiving a second URL for the supplementary content (Continued)

from the remote server, and presenting the supplementary content based on the second URL.

8 Claims, 49 Drawing Sheets

Related U.S. Application Data continuation of application No. 16/453,326, filed on Jun. 26, 2019, now Pat. No. 10,827,232, which is a continuation of application No. 15/711,089, filed on Sep. 21, 2017, now Pat. No. 10,356,490, which is a continuation of application No. 15/101,365, filed as application No. PCT/KR2014/011636 on Dec. 1, 2014, now Pat. No. 9,800,952.

(60) Provisional application No. 61/910,961, filed on Dec. 3, 2013.

(51) Int. Cl.
| | |
|---|---|
| *H04N 21/462* | (2011.01) |
| *H04N 21/858* | (2011.01) |
| *H04N 21/41* | (2011.01) |
| *H04H 20/93* | (2008.01) |
| *H04N 21/2389* | (2011.01) |
| *H04N 21/235* | (2011.01) |
| *H04N 21/2383* | (2011.01) |
| *H04N 21/643* | (2011.01) |
| *H04N 21/8547* | (2011.01) |
| *H04H 60/13* | (2008.01) |

(52) U.S. Cl.
CPC ... *H04N 21/23892* (2013.01); *H04N 21/4126* (2013.01); *H04N 21/4622* (2013.01); *H04N 21/8358* (2013.01); *H04N 21/8586* (2013.01); *H04H 60/13* (2013.01); *H04H 2201/50* (2013.01); *H04N 21/2383* (2013.01); *H04N 21/64322* (2013.01); *H04N 21/8547* (2013.01)

(58) Field of Classification Search
CPC ........... H04N 21/8358; H04N 21/8586; H04N 21/2383; H04N 21/64322; H04N 21/8547; H04H 20/93; H04H 2201/50; H04H 60/13

See application file for complete search history.

(56) References Cited

U.S. PATENT DOCUMENTS

| | | |
|---|---|---|
| 2002/0162118 A1 | 10/2002 | Levy et al. |
| 2003/0056103 A1 | 3/2003 | Levy et al. |
| 2005/0210526 A1 | 9/2005 | Levy et al. |
| 2006/0222203 A1 | 10/2006 | Mercier |
| 2007/0074624 A1 | 7/2007 | Wolosewicz et al. |
| 2008/0301304 A1 | 12/2008 | Chitsaz et al. |
| 2011/0019870 A1 | 1/2011 | Ballocca et al. |
| 2011/0055860 A1 | 3/2011 | Ramaswamy et al. |
| 2011/0075990 A1* | 3/2011 | Eyer ................. H04N 21/4722 386/E5.003 |
| 2013/0024885 A1 | 1/2013 | Meuninck et al. |
| 2013/0117571 A1 | 5/2013 | Petrovic et al. |
| 2013/0227293 A1 | 8/2013 | Leddy et al. |
| 2014/0026159 A1 | 1/2014 | Cuttner et al. |
| 2014/0245339 A1 | 8/2014 | Zhang et al. |
| 2014/0351871 A1 | 11/2014 | Bomfim et al. |

FOREIGN PATENT DOCUMENTS

| | | |
|---|---|---|
| CN | 101427575 A | 5/2009 |
| CN | 101563699 A | 10/2009 |
| CN | 103229513 A | 7/2013 |
| WO | WO 2013/103273 A1 | 7/2013 |

OTHER PUBLICATIONS

IPTV Forum Japan, "Integrated Broadcast-Broadband System Specification," IPTVFJ STD-0010, Version 1.0, Mar. 22, 2013, pp. 1-124 (127 pages total).

ISO/IEC, "Information technology—Generic coding of moving pictures and associated audio information: Systems," International Standard ISO/IEC, vol. 13818-1. XP-002601409, Dec. 1, 2000, pp. 1-154 (172 pages total).

* cited by examiner

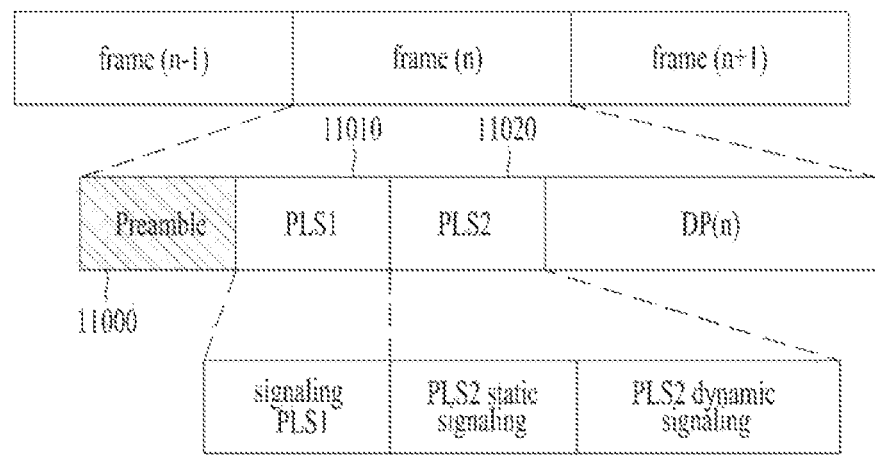

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 14

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC_32 | 32 |

FIG. 21
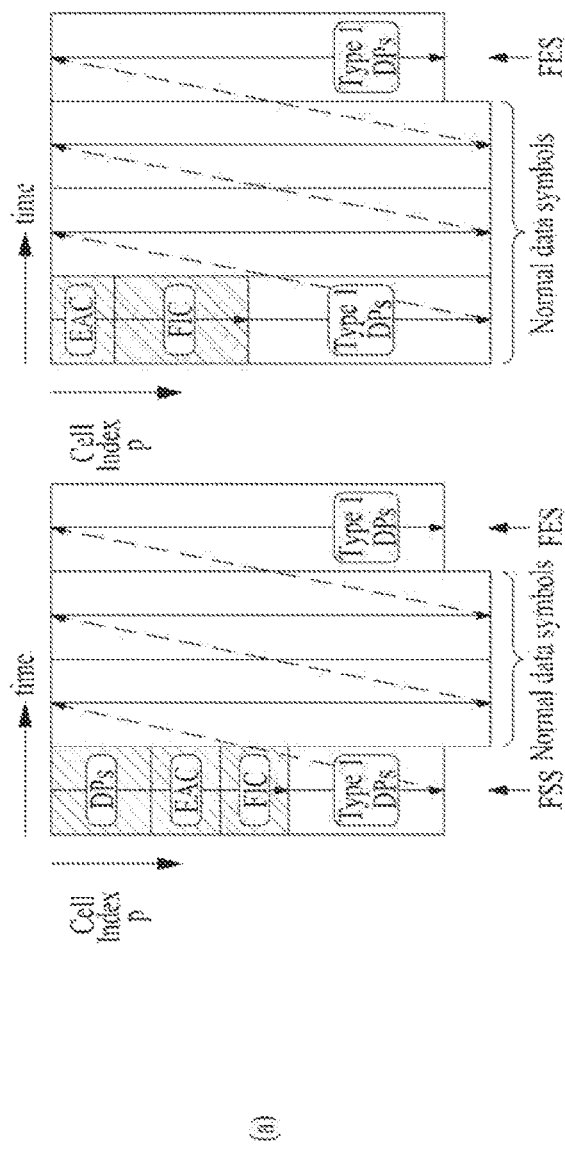
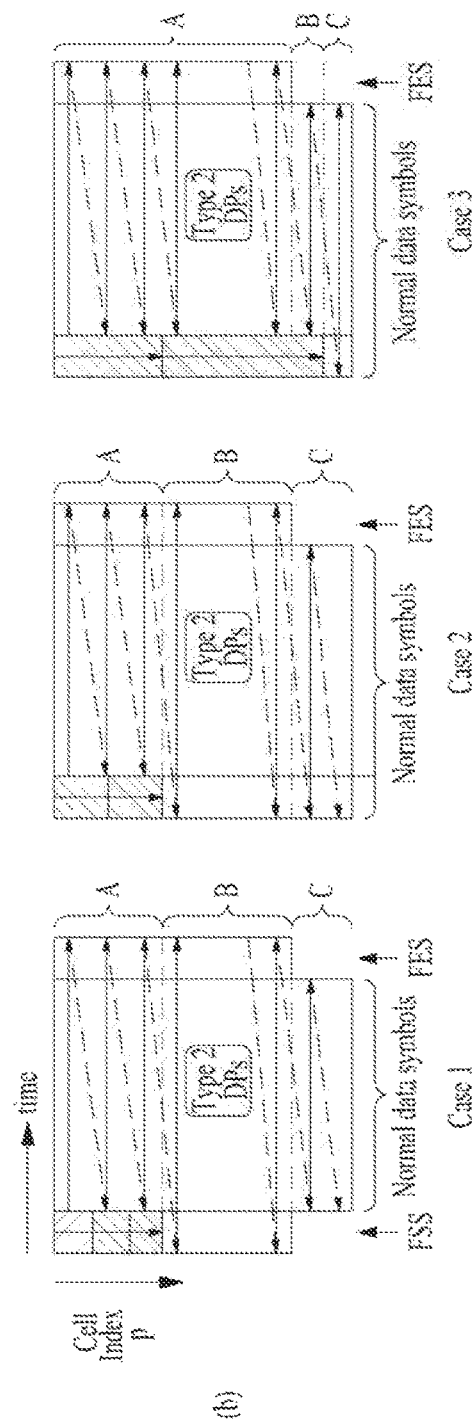

FIG. 25
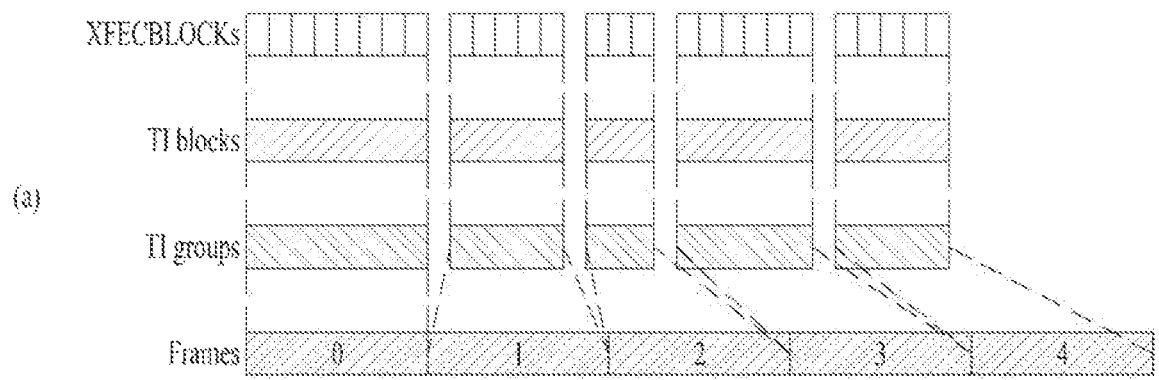
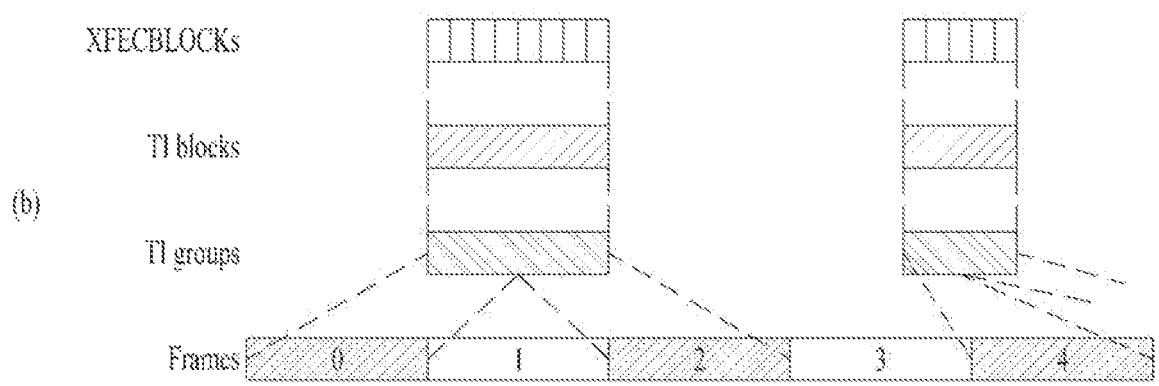
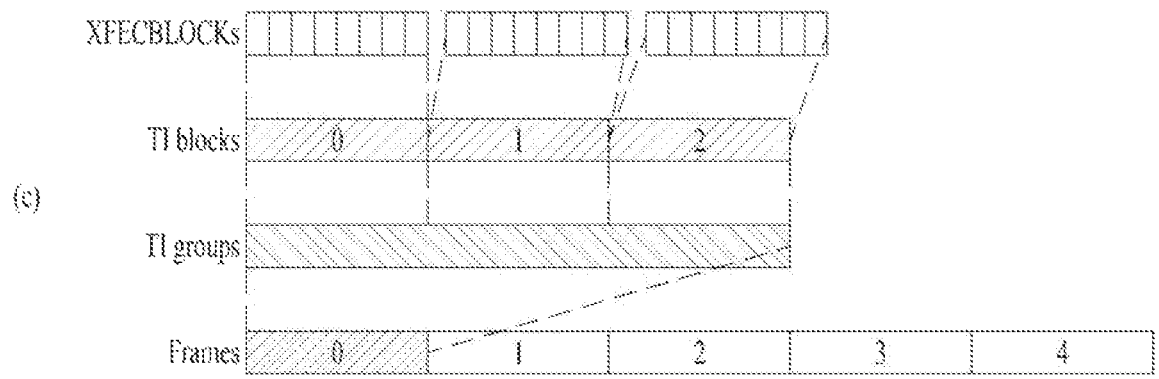

FIG. 29

| Timestamp size value | Description |
|---|---|
| 00 | 1 byte |
| 01 | 2 bytes |
| 10 | 4 bytes |
| 11 | 8 bytes |

| Timestamp size unit value | Description |
|---|---|
| 000 | Mili-sec |
| 001 | Sec |
| 010 | Min |
| 011 | Hour |
| 100 | Variable Unit |
| 101 to 111 | Reserve for future use |

| URL Protocol type value | Description |
|---|---|
| 000 | NULL |
| 001 | http:// |
| 010 | https:// |
| 011 | ws:// |
| 100 to 111 | reserved for future use |

FIG. 48

| Event Value | Description |
|---|---|
| 000 | Prepare |
| 001 | Execute |
| 010 | Suspend |
| 011 | Kill |
| 100 to 111 | reserved for future use |

FIG. 49

| Destination Type (8 bits) | Description |
|---|---|
| 0x00 | Targeting all device classes |
| 0x01 | Targeting devices of the TV class |
| 0x02 | Targeting of the Smartphone class |
| 0x03 | Targeting of the Tablet class |
| 0x04 | Targeting of the PC class |
| 0x05 | Remote server |
| 0x06 to 0xFF | reserved for future use |

FIG. 50

| Timestamp Size = 01 | Timestamp Value = 000 | Timestamp = 5005 | Content Identifier | Event = 001 | Destination = 0x02 | URL Protocol Type = 001 | URL = atsc.org |
|---|---|---|---|---|---|---|---|

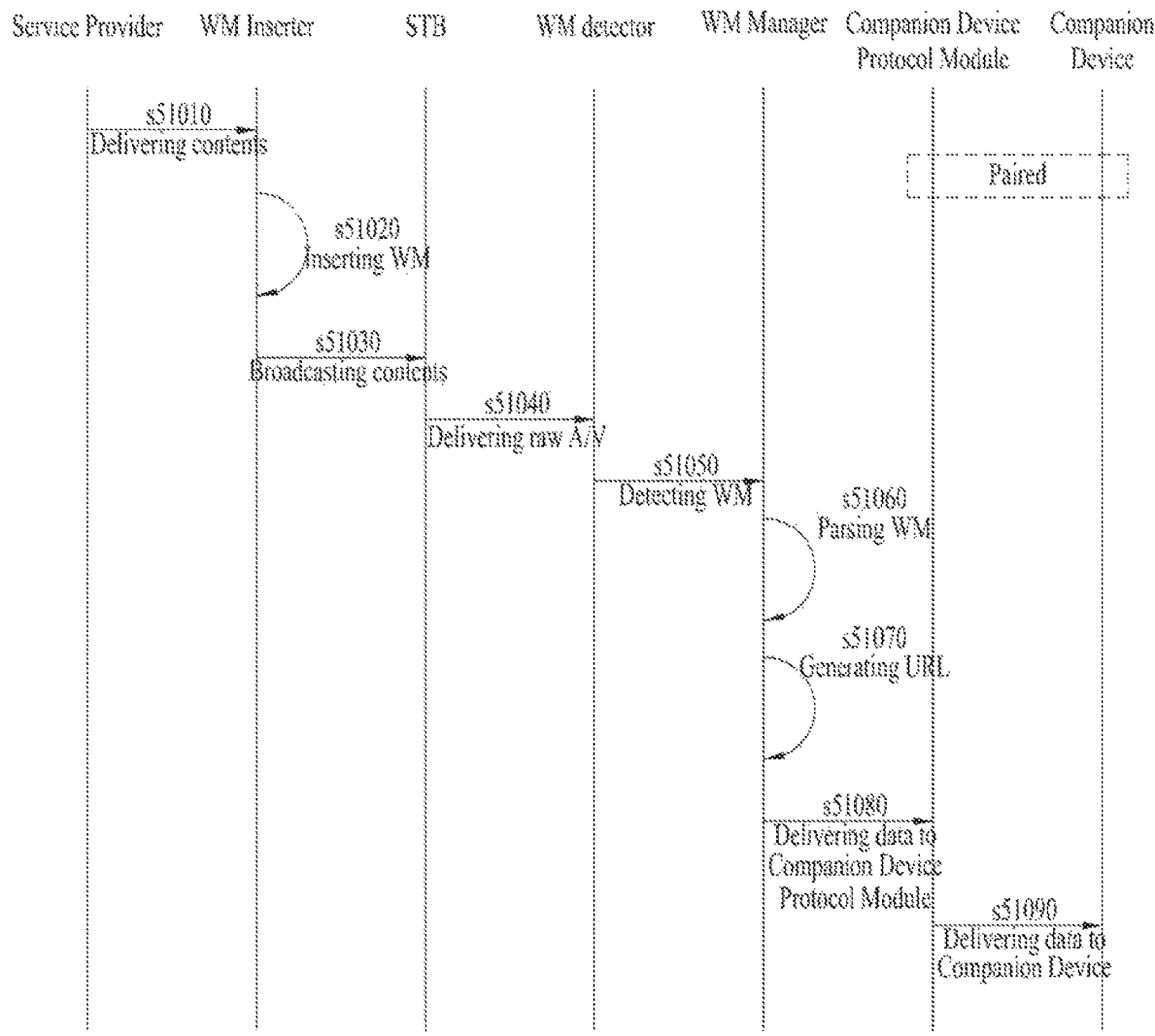

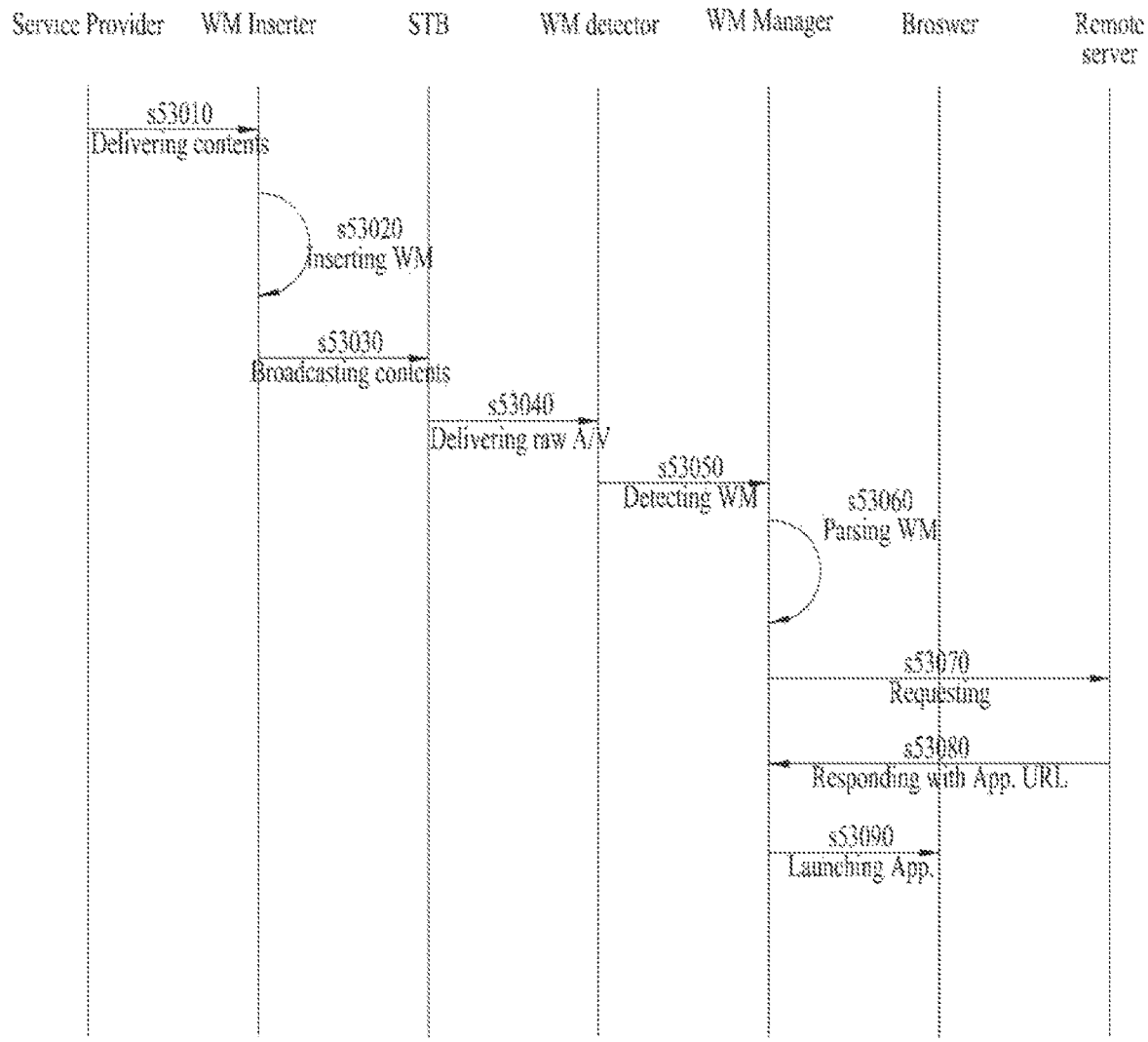

FIG. 55

| Delivery Type (1 bit) = 1 | WMId (8 bits) | Block Number (8 bits) | Last Block Number (8 bits) | Block Length (7 bits) | | | | |
|---|---|---|---|---|---|---|---|---|
| Timestamp Size (2 bits) | Timestamp Unit (3 bits) | Timestamp (var) | Content Identifier Flag (1 bit) | Event (1 bit) | Destination Flag (1 bit) | URL Protocol Flag (1 bit) | URL Flag (1 bit) | Reserved (2 bits) |
| Payload | | | | | | | | |

FIG. 56

| Delivery Type = 1 | WMId = 0x00 | Block Number = 0x00 | Last Block Number = 0x01 | Block Length | | | | |
|---|---|---|---|---|---|---|---|---|
| Timestamp Size = 01 | Timestamp Unit = 000 | Timestamp = 500S | Content Identifier Flag = 1 | Event Flag = 1 | Destination Flag = 1 | URL Protocol Flag = 1 | URL Flag = 1 | Reserved |
| Content Identifier | Event = 001 | Destination = 0x02 | URL Protocol Type = 001 | URL = atsc.org | | | | |

Payload

FIG. 57

| Delivery Type = 1 | WMId = 0x00 | Block Number = 0x01 | Last Block Number = 0x01 | Block Length | | | | |
|---|---|---|---|---|---|---|---|---|
| Timestamp Size = 01 | Timestamp Unit = 000 | Timestamp = 1000S | Content Identifier Flag = 0 | Event Flag = 0 | Destination Flag = 0 | URL Protocol Flag = 0 | URL Flag = 1 | Reserved |
| URL = /apps/app1.html | | | | | | | | |

Payload

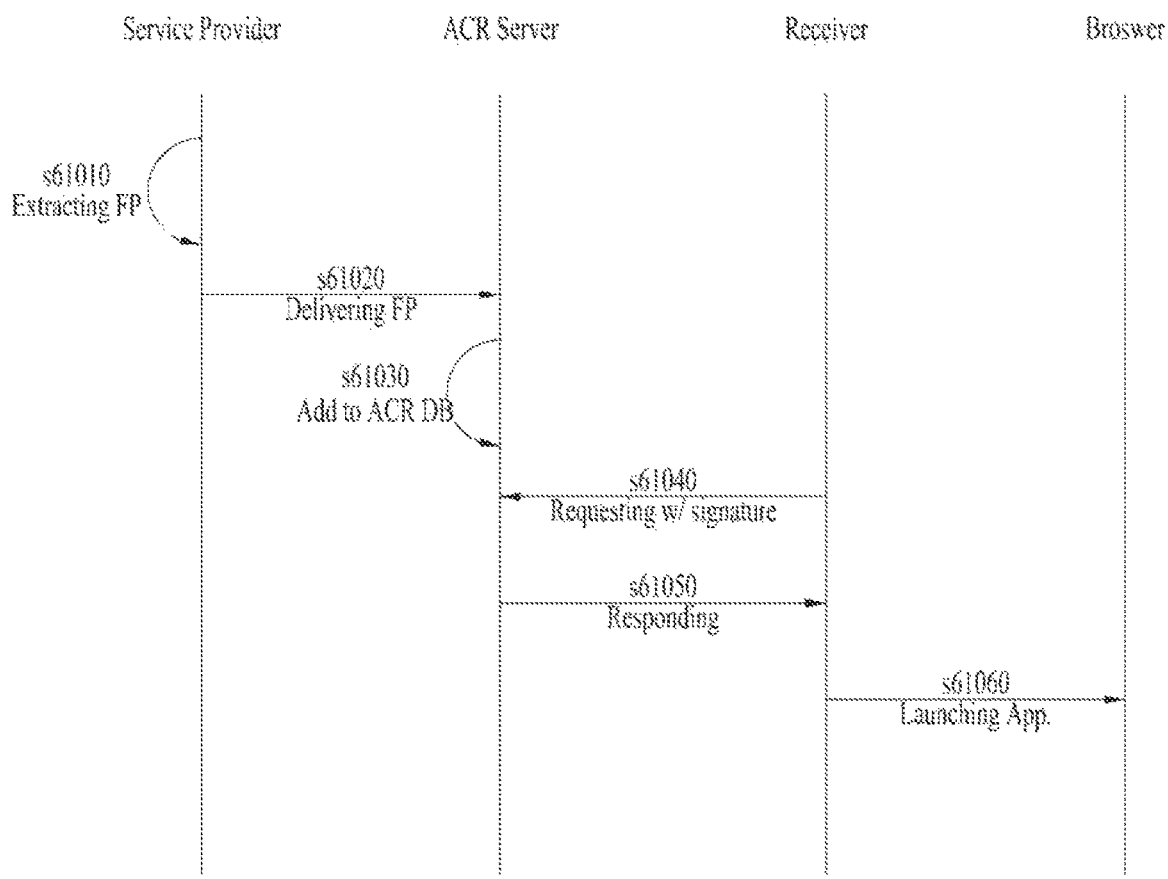

METHOD FOR TRANSMITTING BROADCAST SIGNALS AND METHOD FOR RECEIVING BROADCAST SIGNALS

CROSS-REFERENCE TO RELATED APPLICATIONS

This Application is a Continuation of U.S. patent application Ser. No. 17/031,308 filed on Sep. 24, 2020 (now U.S. Pat. No. 11,265,619 issued on Mar. 1, 2022), which is a Continuation of U.S. patent application Ser. No. 16/453,326 filed on Jun. 26, 2019 (now U.S. Pat. No. 10,827,232 issued on Nov. 3, 2020), which is a Continuation of U.S. patent application Ser. No. 15/711,089 filed on Sep. 21, 2017 (now U.S. Pat. No. 10,356,490 issued on Jul. 16, 2019), which is a Continuation of U.S. patent application Ser. No. 15/101,365 filed on Jun. 2, 2016 (now U.S. Pat. No. 9,800,952 issued on Oct. 24, 2017), which is the National Phase of PCT International Application No. PCT/KR2014/011636 filed on Dec. 1, 2014, which claims the benefit under 35 U.S.C. § 119(e) to U.S. Provisional Application No. 61/910,961 filed on Dec. 3, 2013, all of these applications are hereby expressly incorporated by reference into the present application.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data.

Still another object of the present invention is to provide an apparatus for transmitting broadcast signals, an apparatus for receiving broadcast signals and methods for transmitting and receiving broadcast signals to signal signaling information necessary to provide broadcast signals.

To achieve the object and other advantages and in accordance with the purpose of the invention, as embodied and broadly described herein, the present invention provides a method of providing interactive services. The method of providing interactive services includes receiving an uncompressed broadcast content from an external receiving unit, wherein an watermark is embedded in a frame of the uncompressed broadcast content; extracting the embedded watermark from the uncompressed broadcast content; parsing the extracted watermark; generating an URL by using information in the parsed watermark; and launching an application by using the generated URL, wherein the application provides the interactive services related to the uncompressed broadcast content.

Preferably, the watermark includes an URL field including a fraction of the URL, an URL protocol field indicating a protocol that the URL uses.

Preferably, the generating an URL further includes: combining the fraction of the URL and protocol part of the URL indicated by the URL protocol field, to generate the URL.

Preferably, plural watermarks are embedded in frames of the uncompressed broadcast content, wherein each of the plural watermarks include one of fractions of data, and wherein each of the plural watermarks include a delivery type field indicating that the data is divided into the plural fractions, and being delivered by using the plural watermarks.

Preferably, sizes of the each plural watermarks for the each frames can be adjusted by having a fraction of different sizes, based on quality of the each frames.

Preferably, the each plural watermarks include flag information indicating configuration of the fraction of the data inserted in the each plural watermarks.

Preferably, one of the watermarks includes an URL protocol field indicating a protocol that the URL uses, and wherein one of the other watermarks includes an URL field including a fraction of the URL.

Preferably, the watermark further includes a timestamp size field, a timestamp unit field, an event field and a destination type field, wherein the timestamp size field indicates number of bytes allocated for timestamps in the watermark, wherein the timestamp unit field indicates time unit of the timestamps, wherein the event field includes a command related to the application, wherein the destination type field indicates a secondary device that the application is targeting, and wherein the timestamps establish time base for synchronizing the interactive services with the uncompressed broadcast content.

Preferably, the method further includes: delivering the information in the parsed watermark to the secondary device that the application is targeting.

Preferably, the delivering the information further includes: processing the information in the parsed watermark, and delivering the processed information to the secondary device.

In other aspect, the present invention provides an apparatus for providing interactive services. The apparatus for providing interactive services includes a receiving module that receives an uncompressed broadcast content from an external receiving unit, wherein an watermark is embedded in a frame of the uncompressed broadcast content; an extracting module that extracts the embedded watermark from the uncompressed broadcast content; a parsing module that parses the extracted watermark; a generating module that generates an URL by using information in the parsed watermark; and a launching module that launches an application by using the generated URL, wherein the application provides the interactive services related to the uncompressed broadcast content.

Preferably, the watermark includes an URL field including a fraction of the URL, an URL protocol field indicating a protocol that the URL uses.

Preferably, the generating module combines the fraction of the URL and protocol part of the URL indicated by the URL protocol field, to generate the URL.

Preferably, plural watermarks are embedded in frames of the uncompressed broadcast content, wherein each of the plural watermarks include one of fractions of data, and wherein each of the plural watermarks include a delivery type field indicating that the data is divided into the plural fractions, and being delivered by using the plural watermarks.

Preferably, sizes of the each plural watermarks for the each frames can be adjusted by having a fraction of different sizes, based on quality of the each frames.

Preferably, the each plural watermarks include flag information indicating configuration of the fraction of the data inserted in the each plural watermarks.

Preferably, one of the watermarks includes an URL protocol field indicating a protocol that the URL uses, and wherein one of the other watermarks includes an URL field including a fraction of the URL.

Preferably, the watermark further includes a timestamp size field, a timestamp unit field, an event field and a destination type field, wherein the timestamp size field indicates number of bytes allocated for timestamps in the watermark, wherein the timestamp unit field indicates time unit of the timestamps, wherein the event field includes a command related to the application, wherein the destination type field indicates a secondary device that the application is targeting, and wherein the timestamps establish time base for synchronizing the interactive services with the uncompressed broadcast content.

Preferably, the apparatus further includes: a delivering module that delivers the information in the parsed watermark to the secondary device that the application is targeting.

Preferably, the delivering module processes the information in the parsed watermark, and delivers the processed information to the secondary device.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 21 illustrates DP mapping according to an embodiment of the present invention.

FIG. 25 illustrates a time interleaving according to an embodiment of the present invention.

FIG. 29 illustrates interleaved XFECBLOCKs from each interleaving array according to an embodiment of the present invention.

FIG. 48 is a diagram showing the meanings of the values of an event field according to one embodiment of the present invention.

FIG. 49 is a diagram showing the meanings of the values of a destination type field according to one embodiment of the present invention.

FIG. 50 is a diagram showing the structure of data to be inserted into a WM according to embodiment #1 of the present invention.

FIG. 51 is a flowchart illustrating a process of processing a data structure to be inserted into a WM according to embodiment #1 of the present invention.

FIG. 52 is a diagram showing the structure of data to be inserted into a WM according to embodiment #2 of the present invention.

FIG. 53 is a flowchart illustrating a process of processing a data structure to be inserted into a WM according to embodiment #2 of the present invention.

FIG. 54 is a diagram showing the structure of data to be inserted into a WM according to embodiment #3 of the present invention.

FIG. 55 is a diagram showing the structure of data to be inserted into a WM according to embodiment #4 of the present invention.

FIG. 56 is a diagram showing the structure of data to be inserted into a first WM according to embodiment #4 of the present invention.

FIG. 57 is a diagram showing the structure of data to be inserted into a second WM according to embodiment #4 of the present invention.

FIG. 60 is a diagram showing a data structure according to one embodiment of the present invention in a fingerprinting scheme.

FIG. 61 is a flowchart illustrating a process of processing a data structure according to one embodiment of the present invention in a fingerprinting scheme.

DETAILED DESCRIPTION OF THE INVENTION

Figure 1:
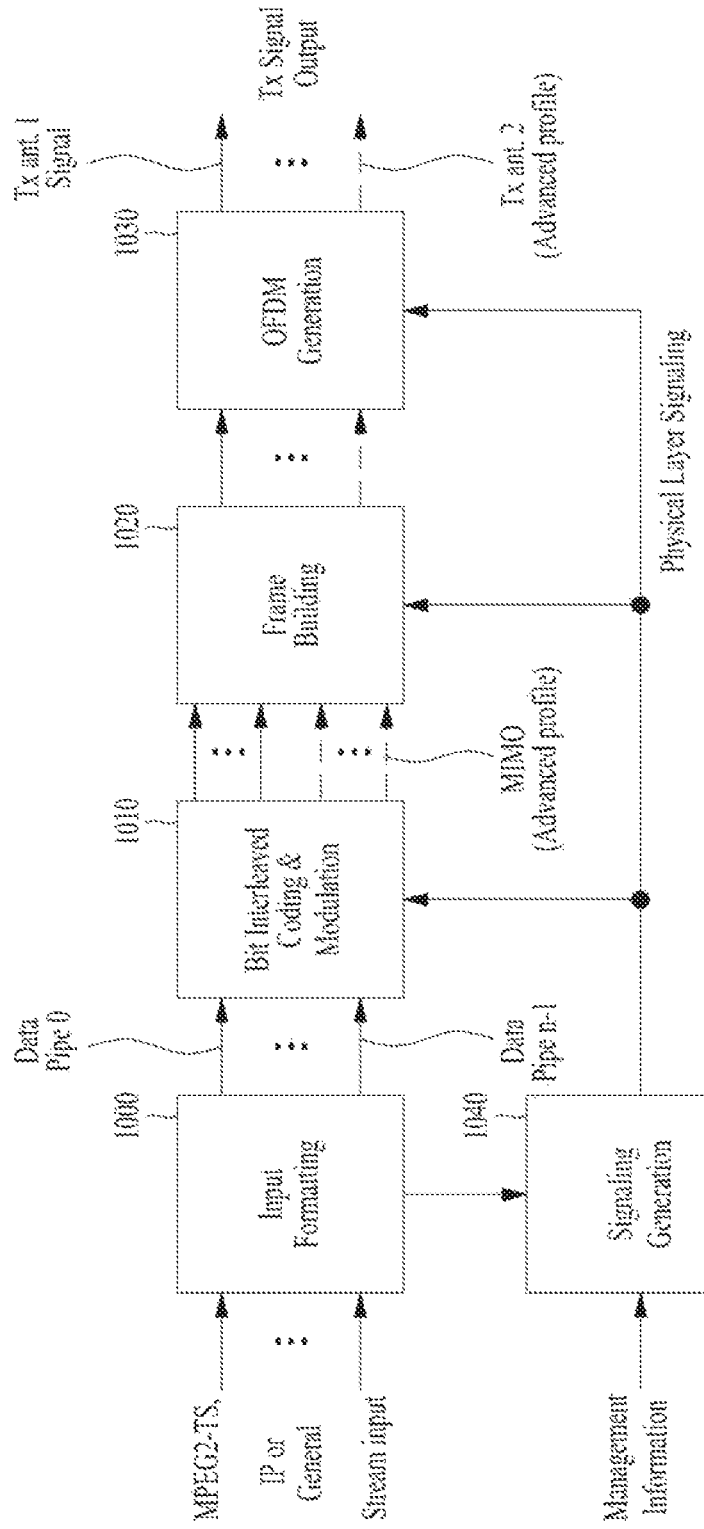
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles), each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8-bit field identifies uniquely a DP within the system identified by the SYSTEM_ID.

dummy cell: cell carrying a pseudo-random value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFT-size.

reserved for future use: not defined by the present document but may be defined in future.

super-frame: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
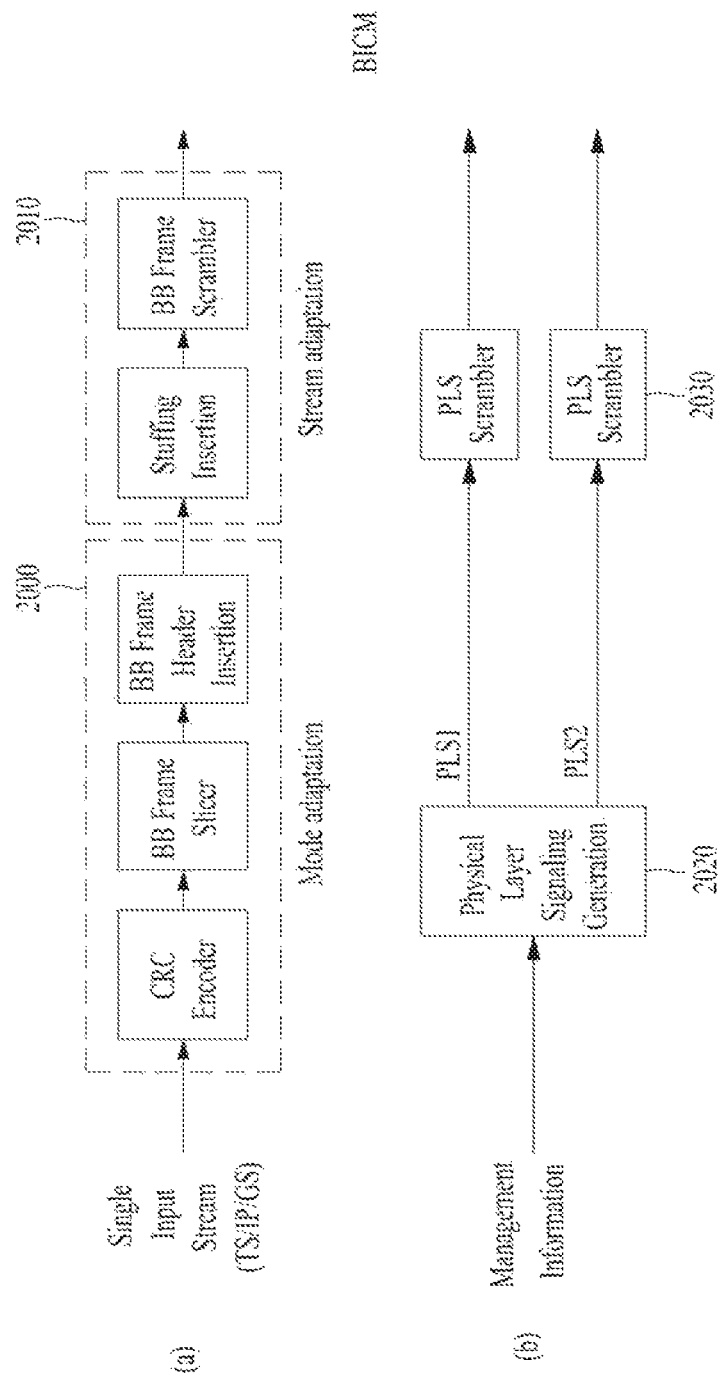
FIG. 2 illustrates an input formatting block according to one embodiment of the present invention.
Figure 3:
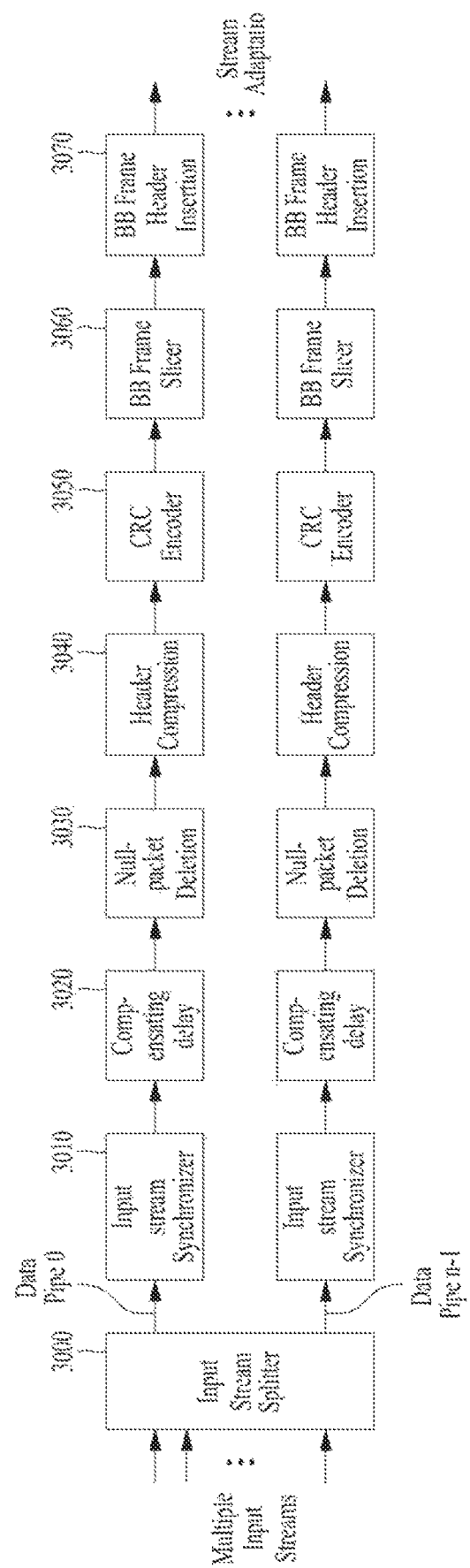
FIG. 3 illustrates an input formatting block according to another embodiment of the present invention.
Figure 4:
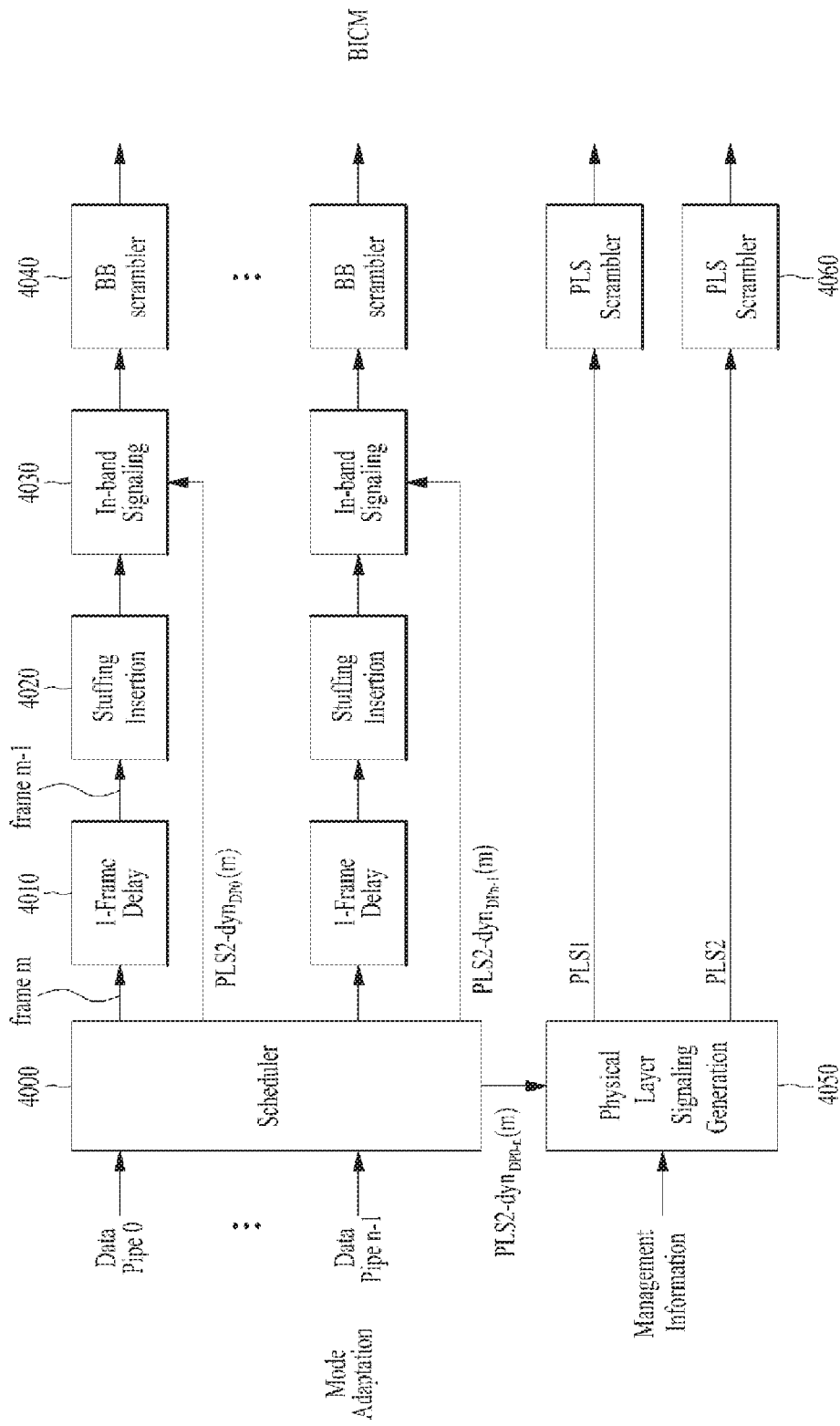
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
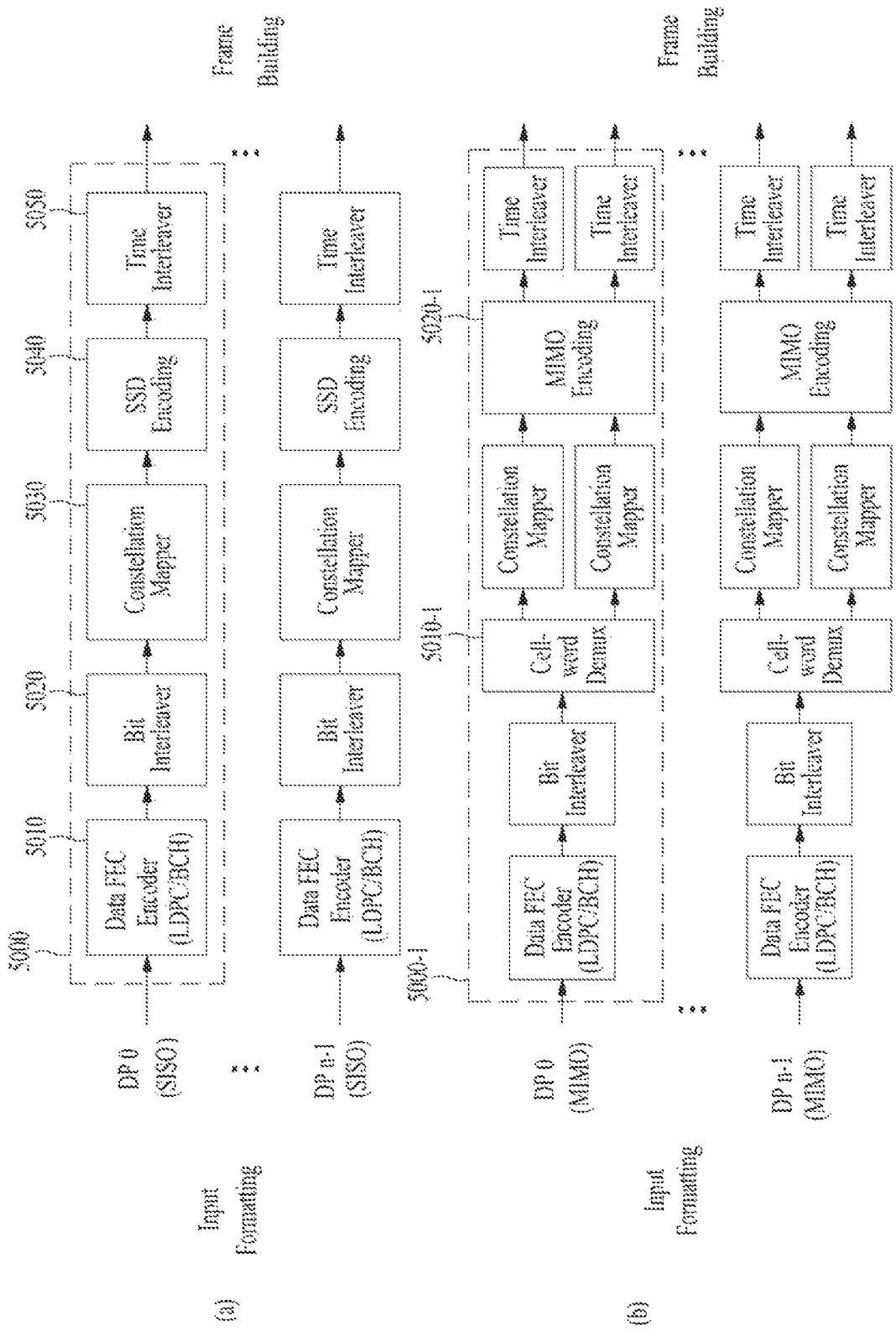
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
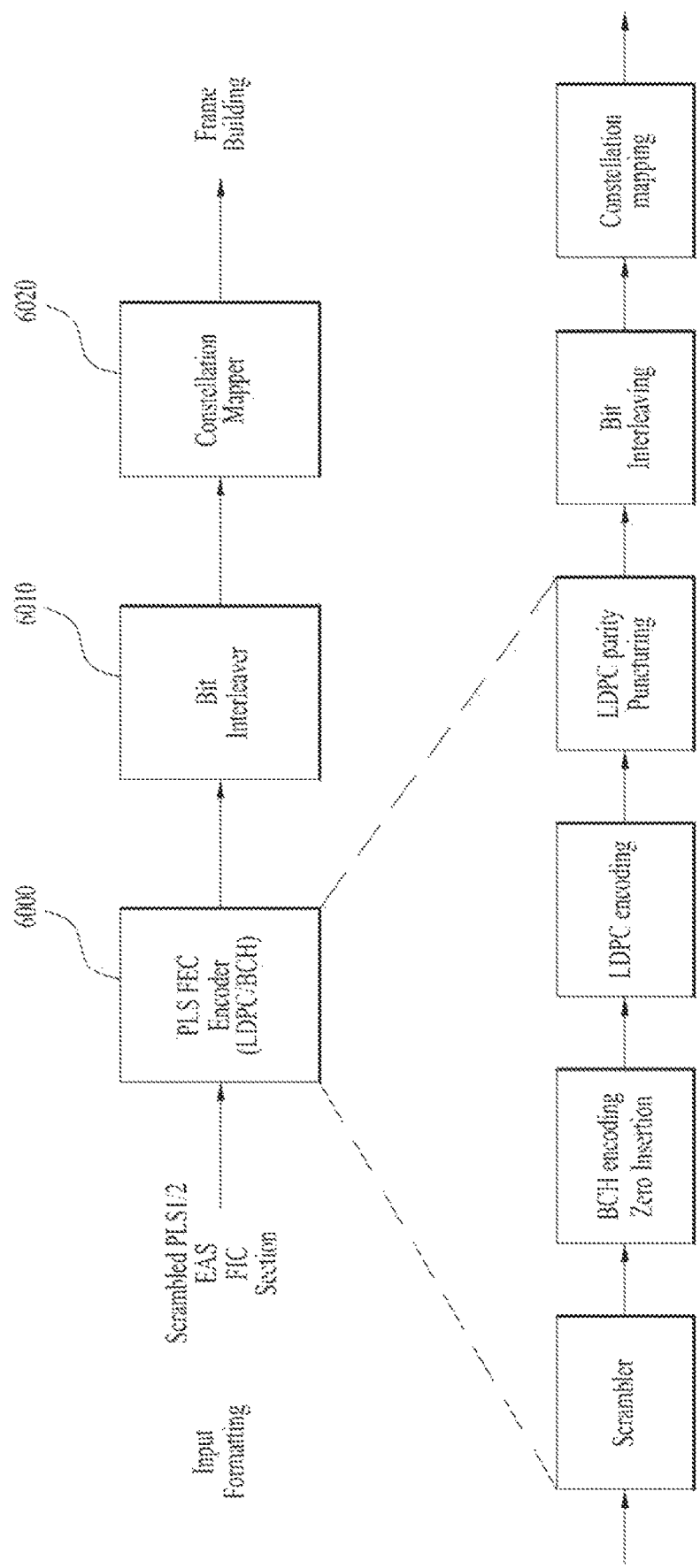
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc}\ P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ $(= N_{bch})$ | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
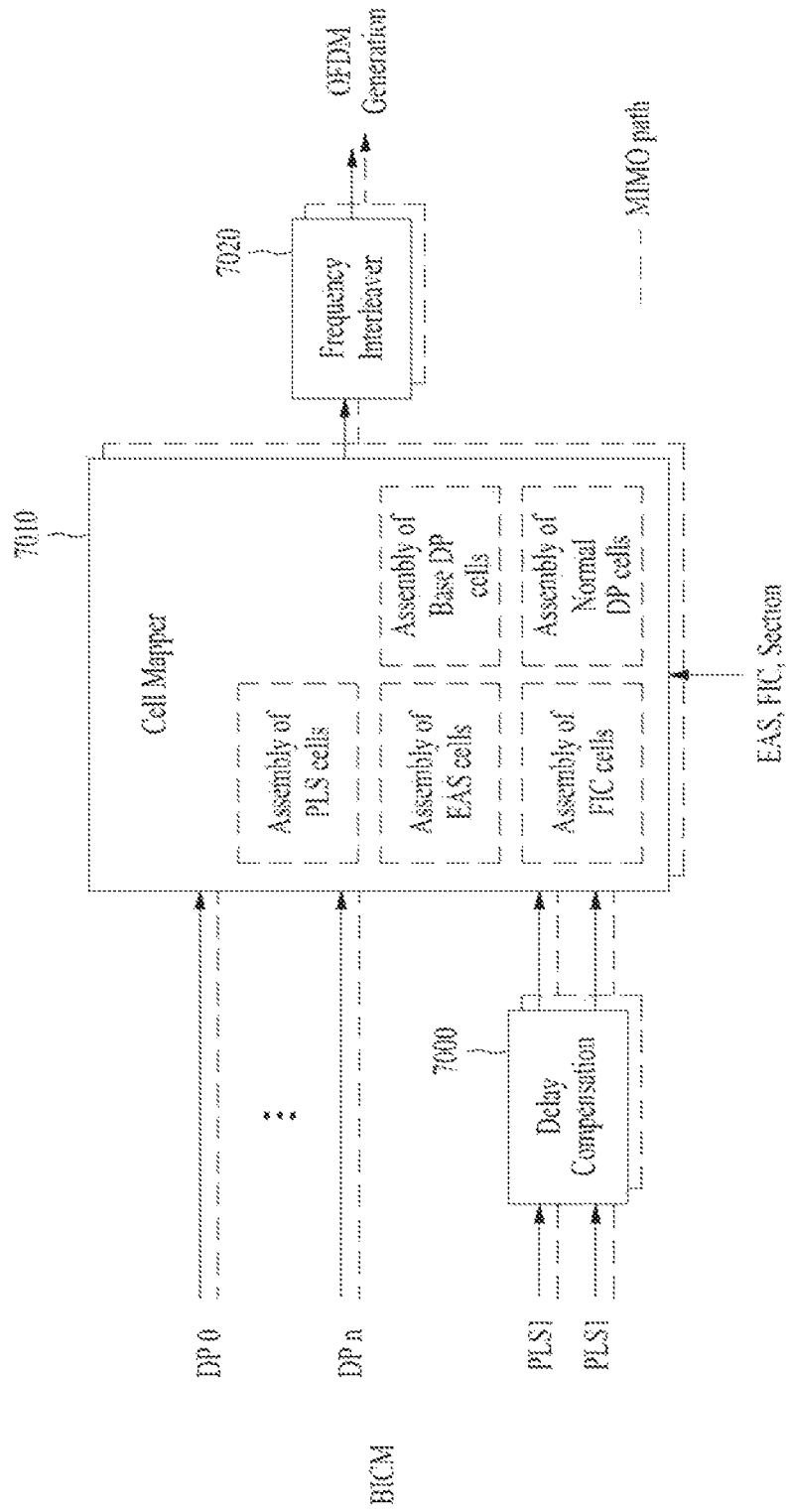
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 8:
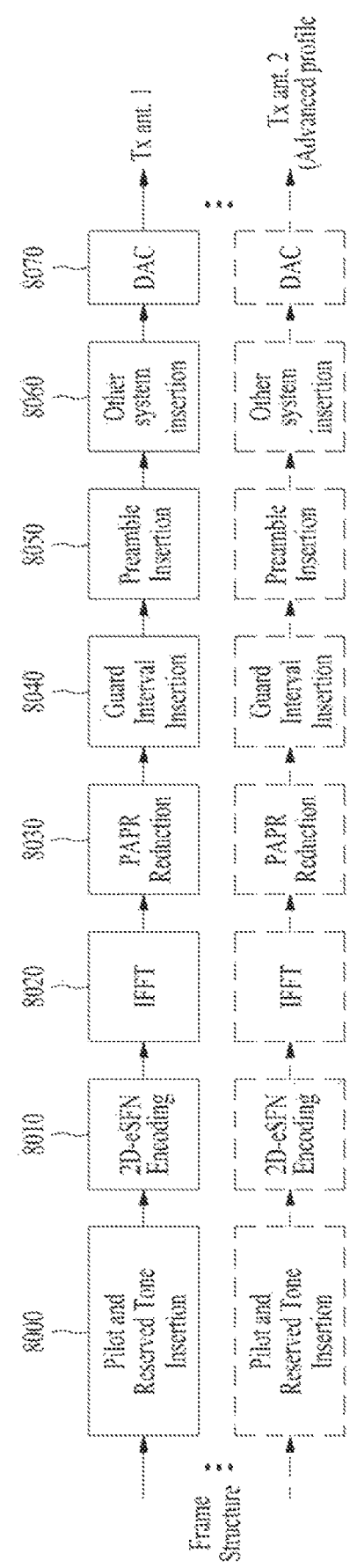
FIG. 8 illustrates an OFMD generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
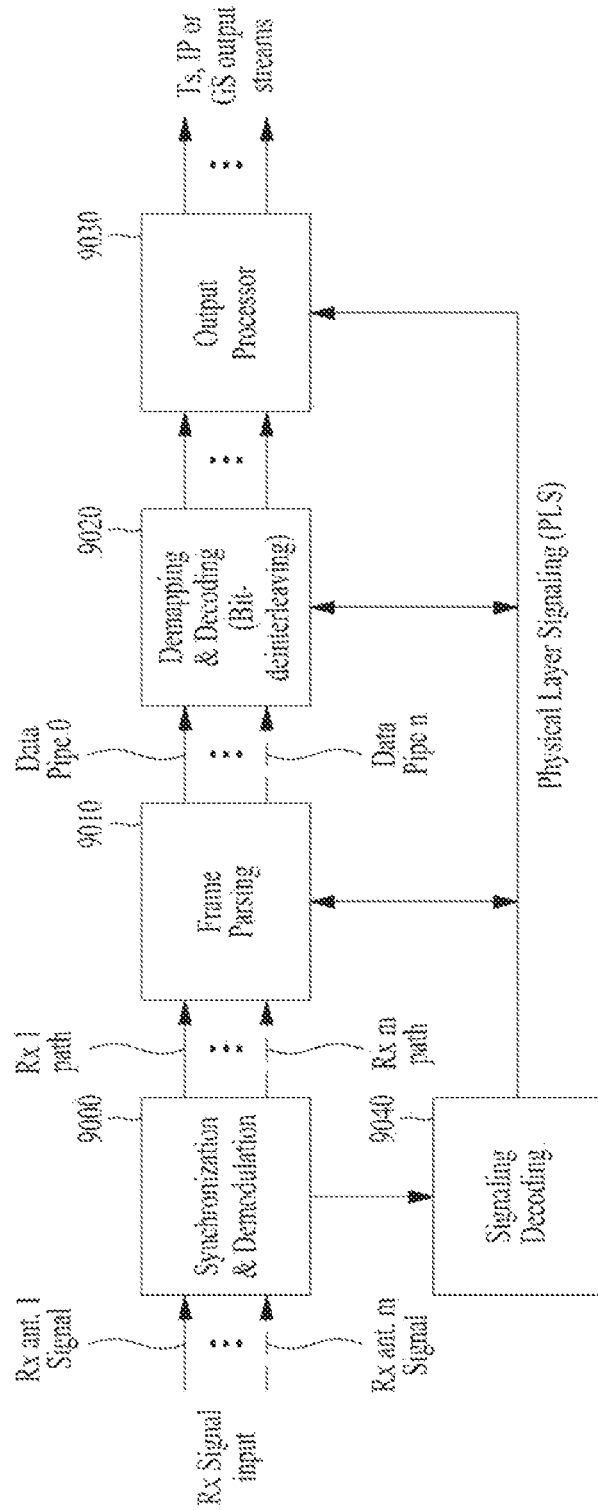
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (IPv4 or IPv6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
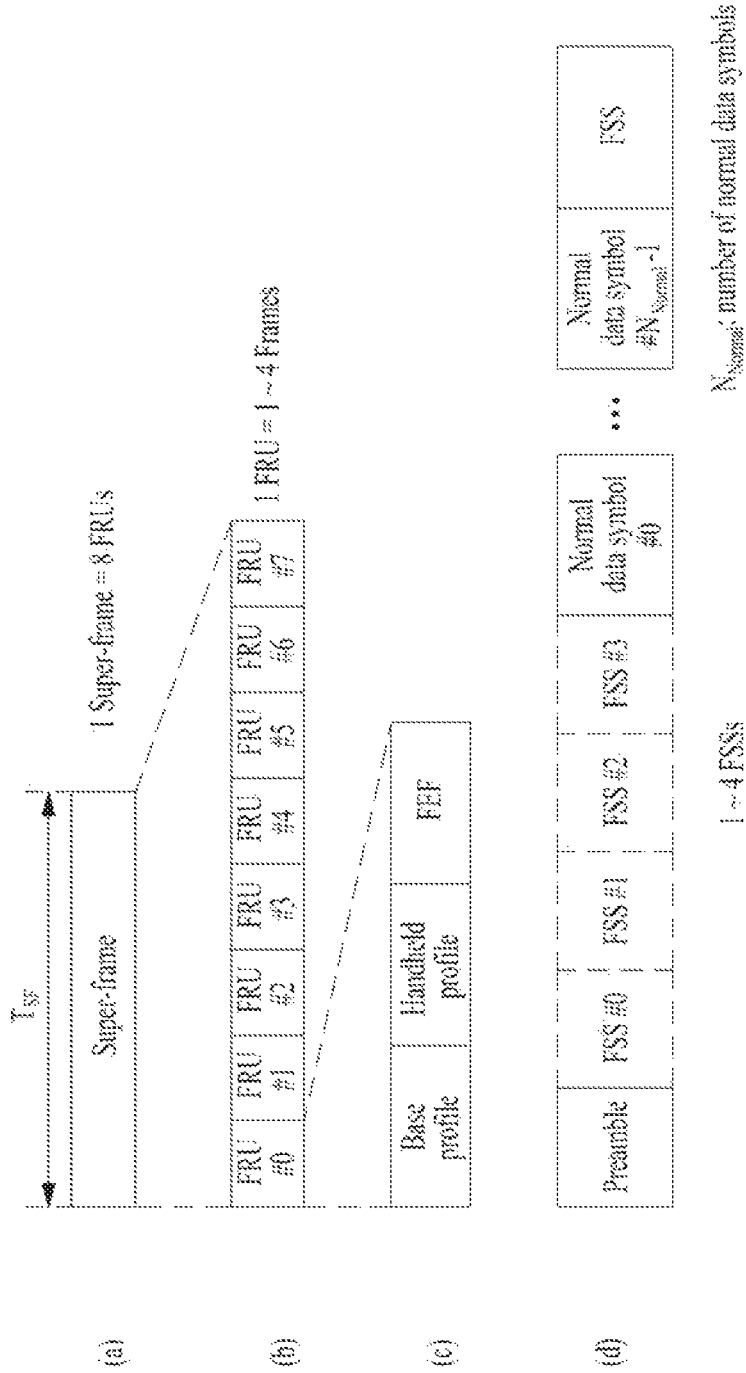
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system

TABLE 8

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present | whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data.

DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (HUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31.

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
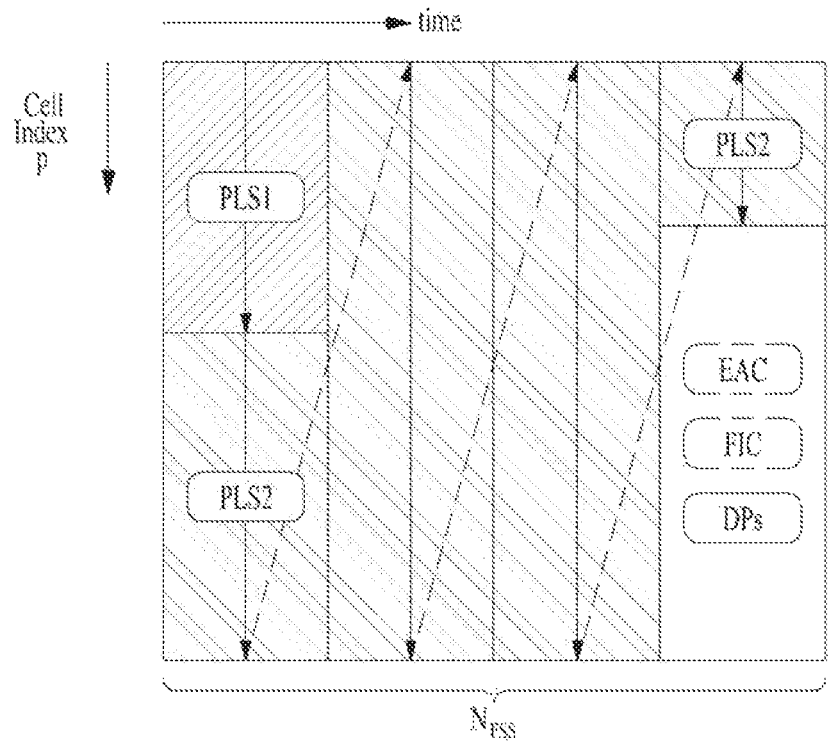
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
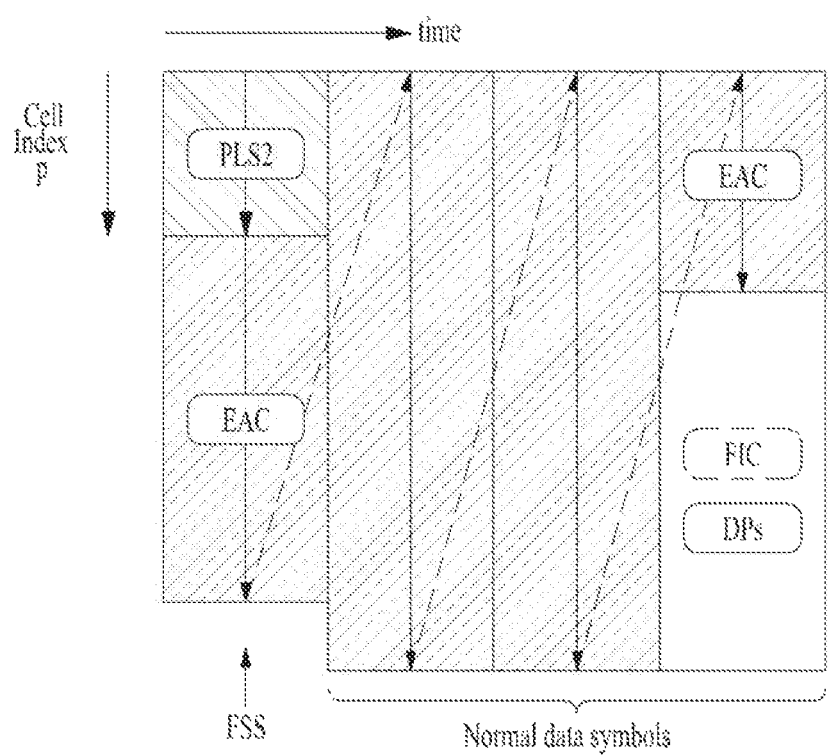
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
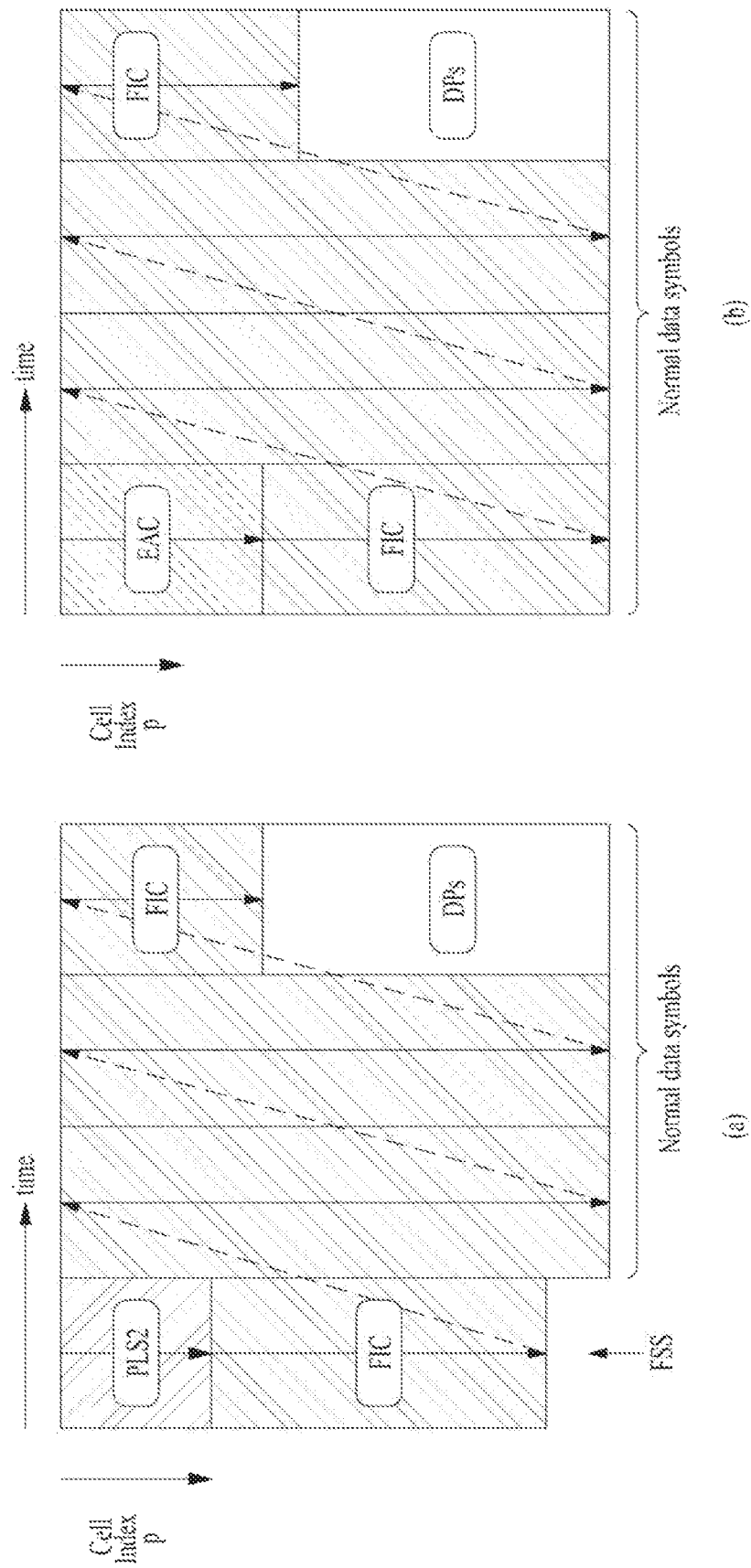
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
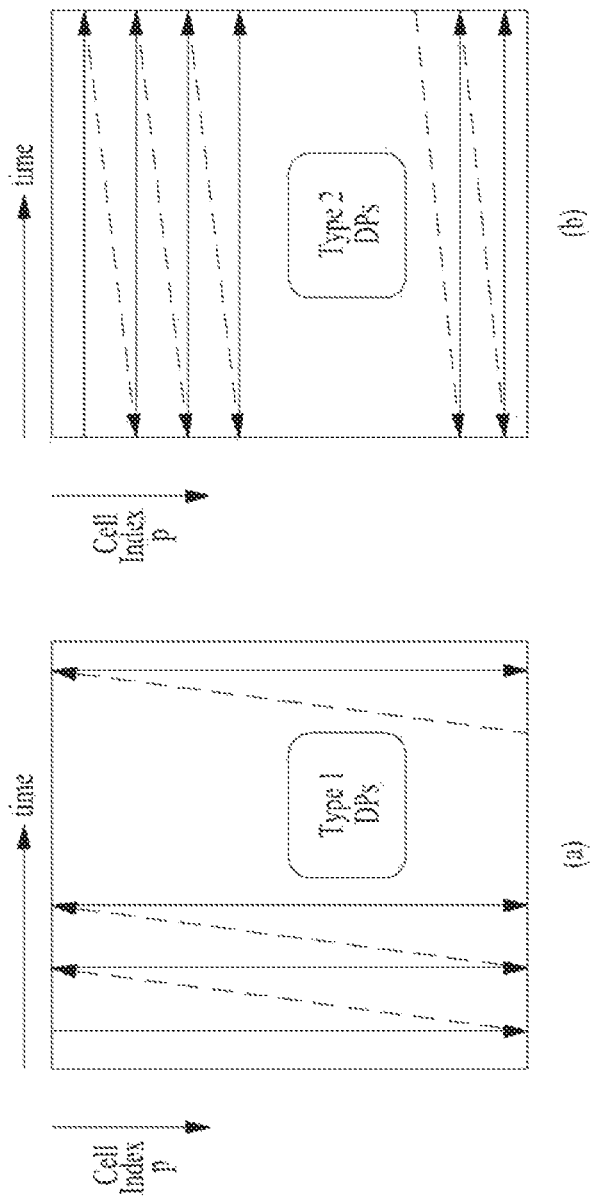
FIG. 20 illustrates a type of DP according to an embodiment of the present invention.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM.

Type 2 DP: DP is mapped by FDM.

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1} + D_{DP2} \leq D_{DP} \qquad \text{[Math Figure 2]}$$

where $D_{DP1}$ is the number of OFDM cells occupied by Type 1 DPs, $D_{DP2}$ is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
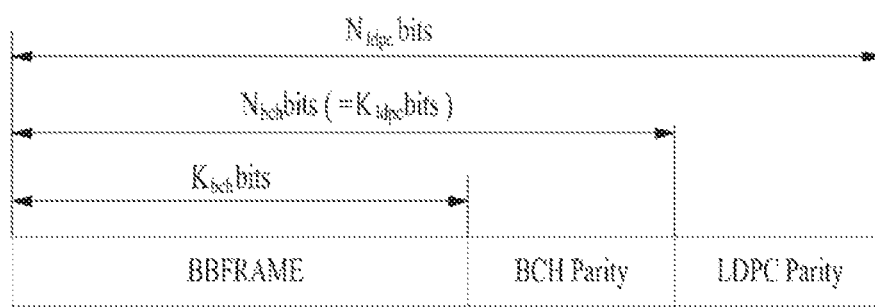
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc} = [I_{ldpc}\ P_{ldpc}] = [i_0, i_1, \ldots, i_{K_{ldpc}-1}, p_0, p_1, \ldots, p_{N_{ldpc}-K_{ldpc}-1}]$$ [Math Figure 3]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0 = p_1 = p_2 = \ldots = p_{N_{ldpc}-K_{ldpc}-1} = 0$$ [Math Figure 4]

2) Accumulate the first information bit—$i_0$, at parity bit addresses specified in the first row of an addresses of parity check matrix. The details of addresses of parity check matrix will be described later. For example, for rate 13/15:

$$p_{983} = p_{983} \oplus i_0$$ [Math Figure 5]

$$p_{2815} = p_{2815} \oplus i_0$$

$$p_{4837} = p_{4837} \oplus i_0$$

$$p_{4989} = p_{4989} \oplus i_0$$

$$p_{6138} = p_{6138} \oplus i_0$$

$$p_{6458} = p_{6458} \oplus i_0$$

$$p_{6921} = p_{6921} \oplus i_0$$

$$p_{6974} = p_{6974} \oplus i_0$$

$$p_{7572} = p_{7572} \oplus i_0$$

$$p_{8260} = p_{8260} \oplus i_0$$

$$p_{8496} = p_{8496} \oplus i_0$$

3) For the next 359 information bits, $i_s$, s=1, 2, ..., 359 accumulate is at parity bit addresses using following Math figure.

$$\{x + (s \bmod 360) \times Q_{ldpc}\} \bmod (N_{ldpc} - K_{ldpc})$$ [Math Figure 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1$$ [Math Figure 7]

$$p_{2839} = p_{2839} \oplus i_1$$

$$p_{4861} = p_{4861} \oplus i_1$$

$$p_{5013} = p_{5013} \oplus i_1$$

$$p_{6162} = p_{6162} \oplus i_1$$

$$p_{6482} = p_{6482} \oplus i_1$$

$$p_{6945} = p_{6945} \oplus i_1$$

$$p_{6998} = p_{6998} \oplus i_1$$

$$p_{7596} = p_{7596} \oplus i_1$$

$$p_{8284} = p_{8284} \oplus i_1$$

$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, ..., 719 are obtained using the Math FIG. 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1.

$$p_i = p_i \oplus p_{i-1}, i = 1, 2, ..., N_{ldpc} - K_{ldpc} - 1$$ [Math Figure 8]

where final content of $p_i$, i=0, 1, ... $N_{ldpc}-K_{ldpc}-1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
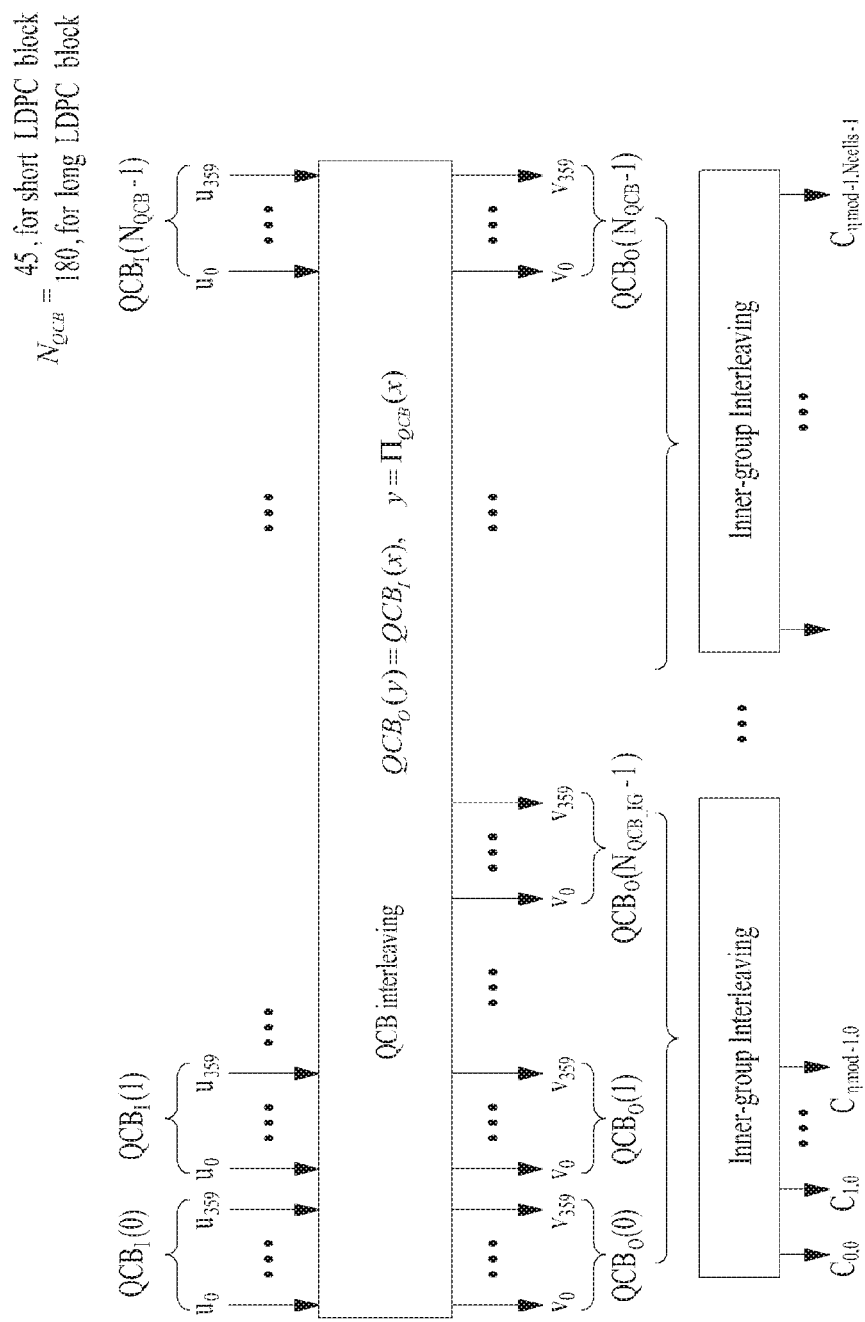
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order ($\eta$ mod) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
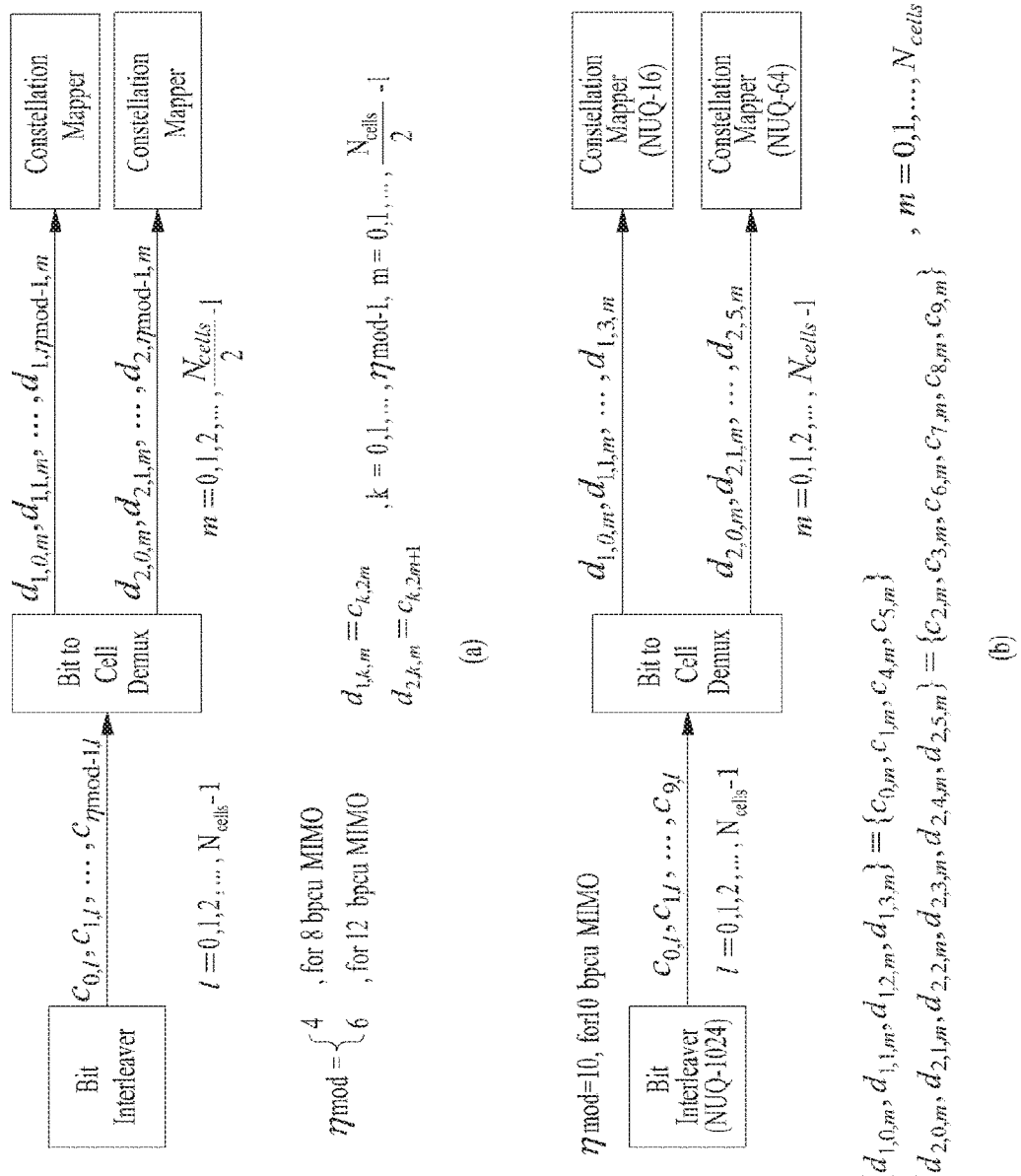
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word (c0,1, c1,1, . . . , c$\eta$ mod-1,1) of the bit interleaving output is demultiplexed into (d1,0,m, d1,1, m . . . , d1,$\eta$ mod-1,m) and (d2,0,m, d2,1,m . . . , d2$\eta$ mod-1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1, m . . . , d1,3,m) and (d2,0,m, d2,1,m . . . , d2,5,m), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames HUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{Jump}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1},$$
$$\ldots, d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q} & \text{, the output of } SSD\text{-encoding} \\ g_{n,s,r,q} & \text{, the output of } MIMO \text{ encoding} \end{cases}.$$

In addition, assume that output XFECBLOCKs from the time interleaver are defined as $$(h_{n,s,0}, h_{n,s,1}, \ldots, h_{n,s,i}, \ldots, h_{n,s,N_{xBLOCK\_TI}(n,s)\times N_{cells}-1}),$$

where $h_{n,s,i}$ is the ith output cell (for $i=0, \ldots, N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 26:
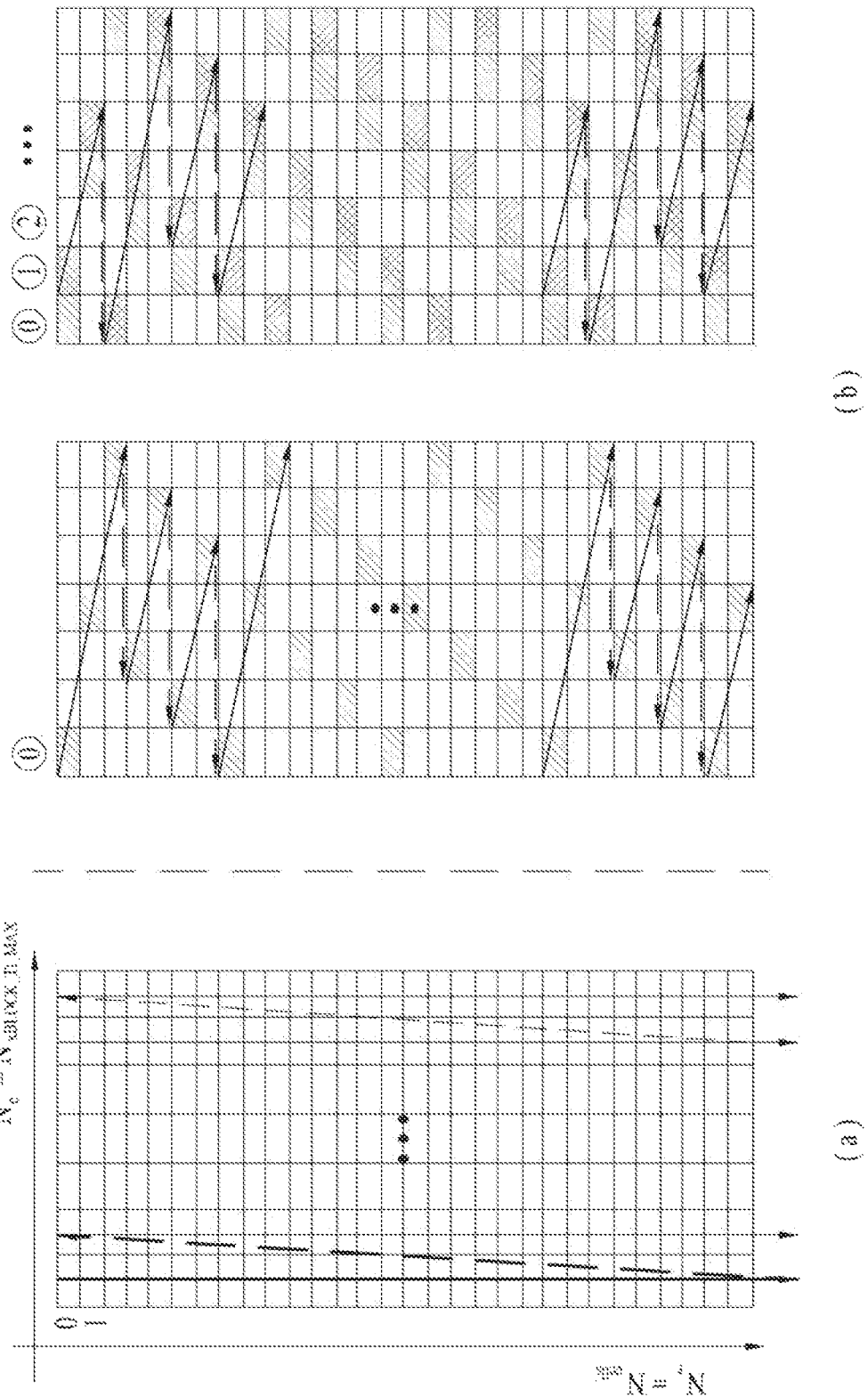
FIG. 26 illustrates the basic operation of a twisted row-column block interleaver according to an embodiment of the present invention.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ ($i=0, \ldots, N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \qquad \text{[Math Figure 9]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

$$\text{for } \begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases}, \quad \text{[Math Figure 10]}$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
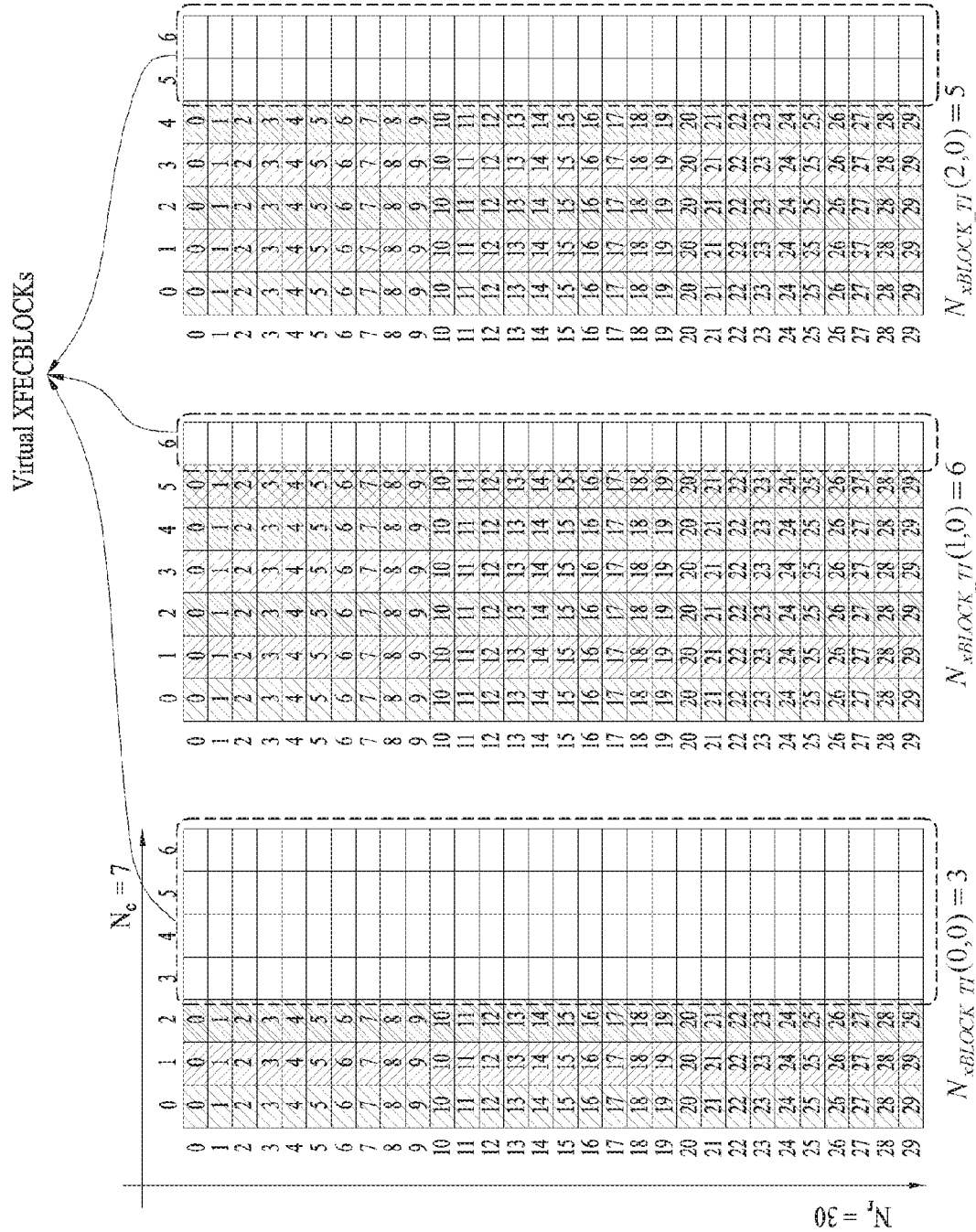
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

$$p = 0; \qquad \text{[Math Figure 11]}$$
$$\text{for } i = 0; i < N_{cells} N'_{xBLOCK\_TI\_MAX}; i = i + 1$$
$$\{\text{GENERATE}(R_{n,s,i}, C_{n,s,i});$$
$$V_i = N_r C_{n,s,j} + R_{n,s,j}$$
$$\text{if } V_i < N_{cells} N_{xBLOCK\_TI}(n, s)$$
$$\{$$
$$Z_{n,s,p} = V_i; p = p + 1;$$
$$\}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N'_{xBLOCK\_Group\_MAX}/N_{TI} \rfloor = N_{xBLOCK\_TI\_MAX} = 6$.

Figure 28:
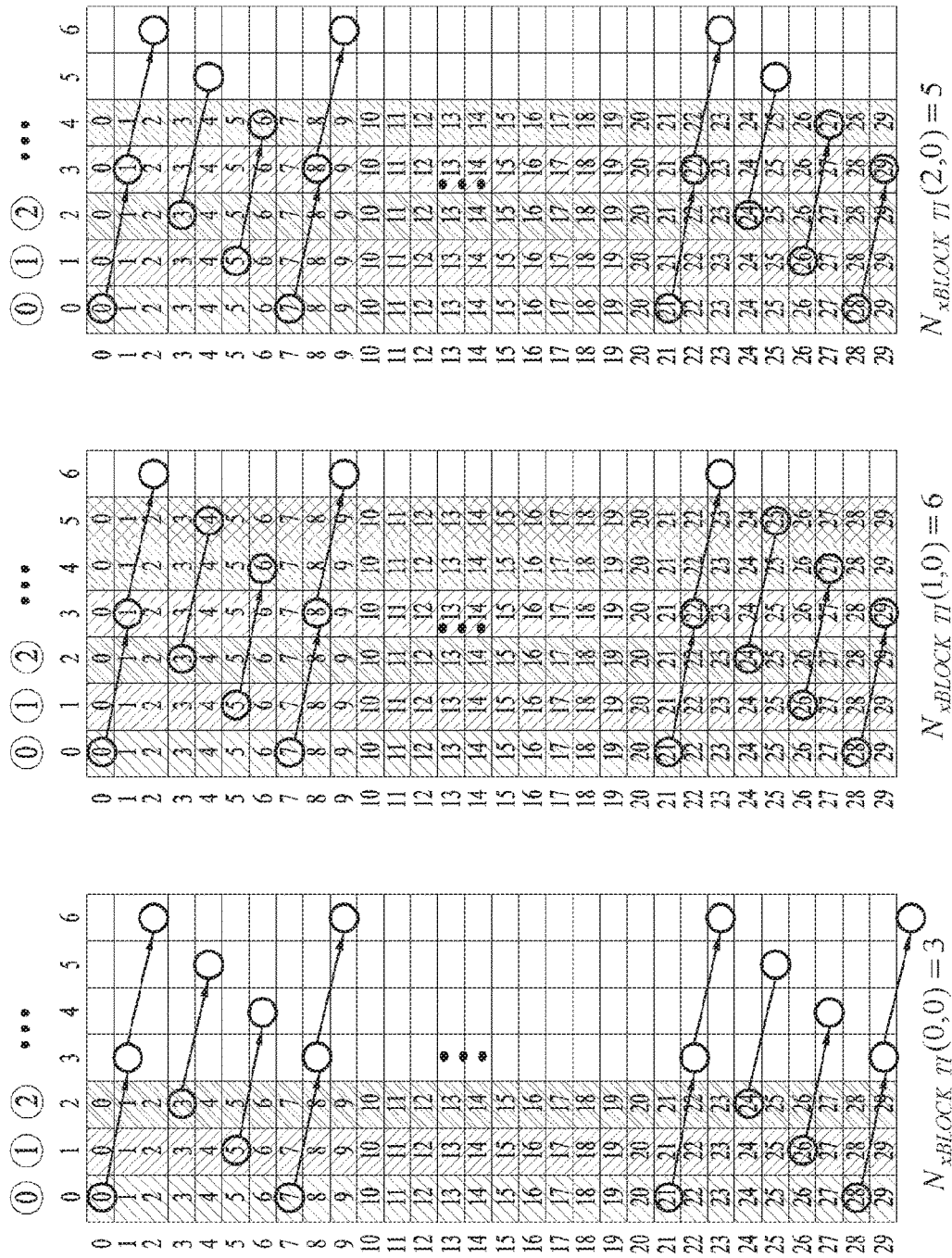
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

Figure 29:
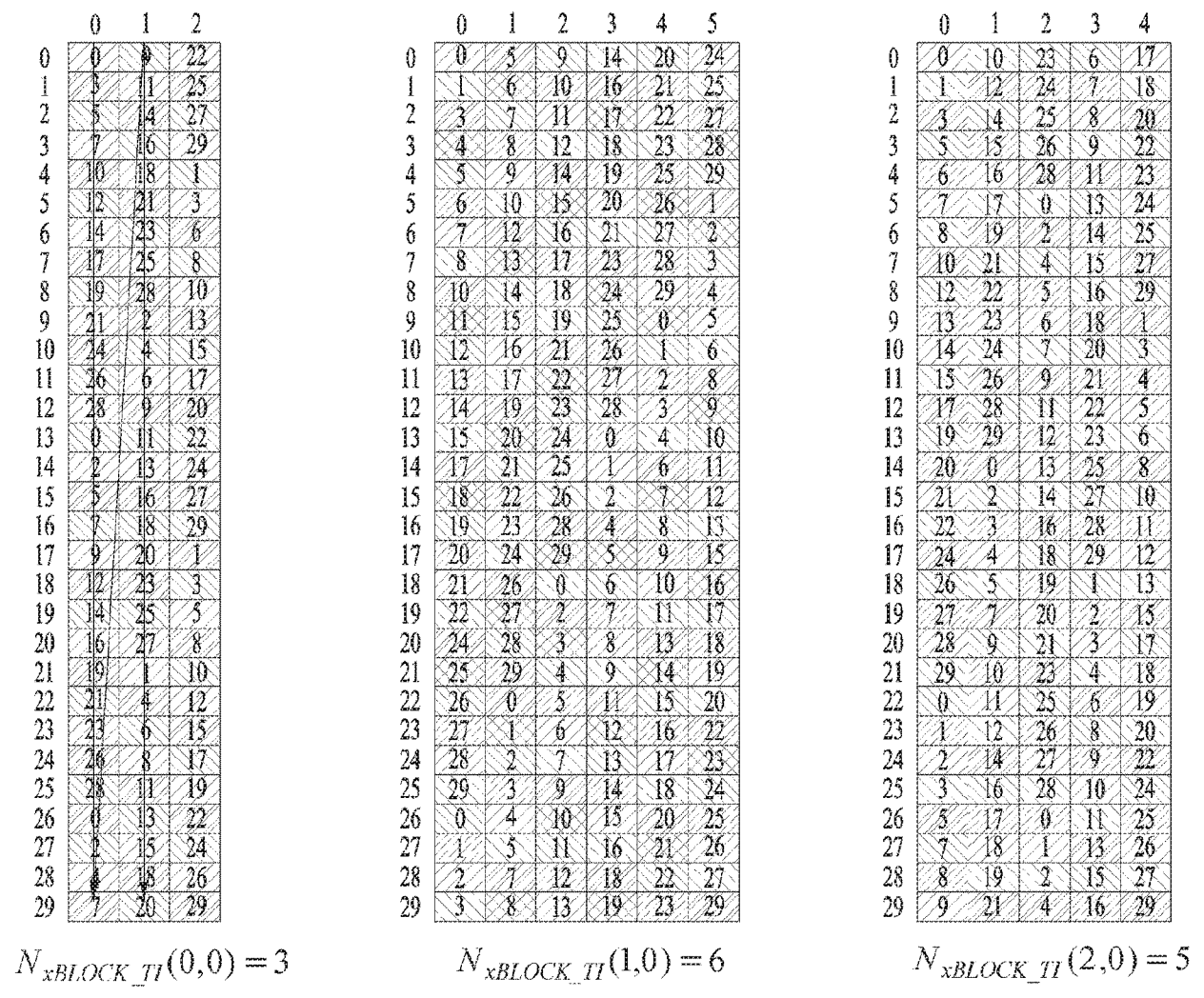

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}=7$ and Sshift=3.

Hereinafter, a mobile terminal relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 30 to 38 according to an embodiment.

Figure 30:
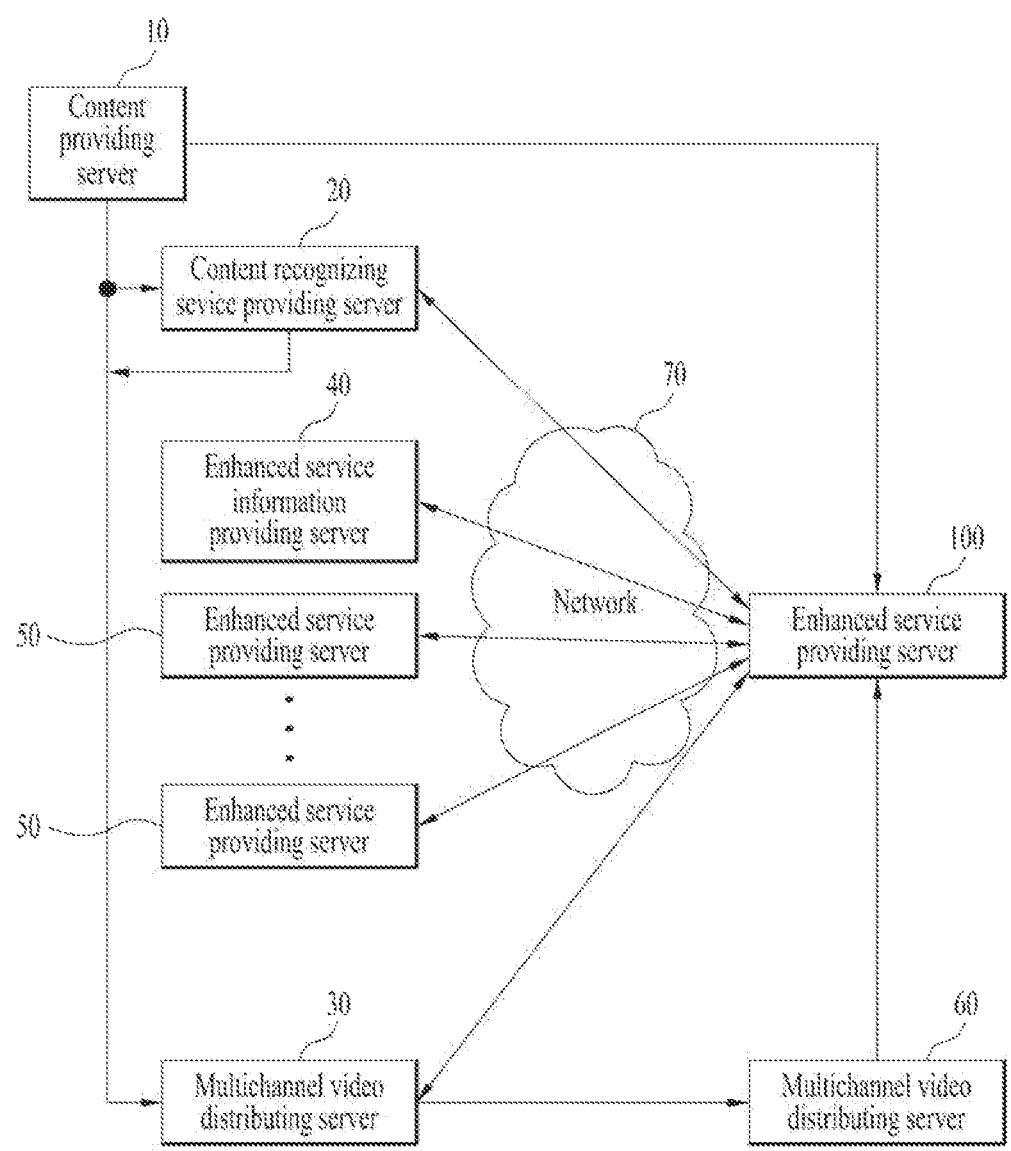
FIG. 30 is a block diagram illustrating the network topology according to the embodiment.

FIG. 30 is a block diagram illustrating the network topology according to the embodiment.

As shown in FIG. 30, the network topology includes a content providing server 10, a content recognizing service providing server 20, a multichannel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts feature information from some frames or audio samples of the main audio-visual content and stores it. This feature information is called signature.

The multichannel video distributing server 30 receives and multiplexes broadcast signals from a plurality of broadcasting stations and provides the multiplexed broadcast signals to the broadcast receiving device 60. Especially, the multichannel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multichannel video distributing server 30 may exclude the extracted enhanced service or may add another enhanced service, a broadcasting station may not provide services led by it. There may be at least one multichannel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 100 through its external input port.

The enhanced service information providing server 40 provides enhanced service information on at least one available enhanced service relating to a main AV content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server.

The video display device 100 may be a television, a notebook computer, a hand phone, and a smart phone, each including a display unit. The video display device 100 may receive an uncompressed main AV content from the broadcast receiving device 60 or a broadcast signal including an encoded main AV content from the contents providing server 10 or the multichannel video distributing server 30. The video display device 100 may receive a content recognizing service from the content recognizing service providing server 20 through the network 70, an address of at least one available enhanced service relating to a main AV content from the enhanced service information providing server 40 through the network 70, and at least one available enhanced service relating to a main AV content from the enhanced service providing server 50.

At least two of the content providing server 10, the content recognizing service providing server 20, the multichannel video distributing server 30, the enhanced service information providing server 40, and the plurality of enhanced service providing servers 50 may be combined in a form of one server and may be operated by one provider.

Figure 31:
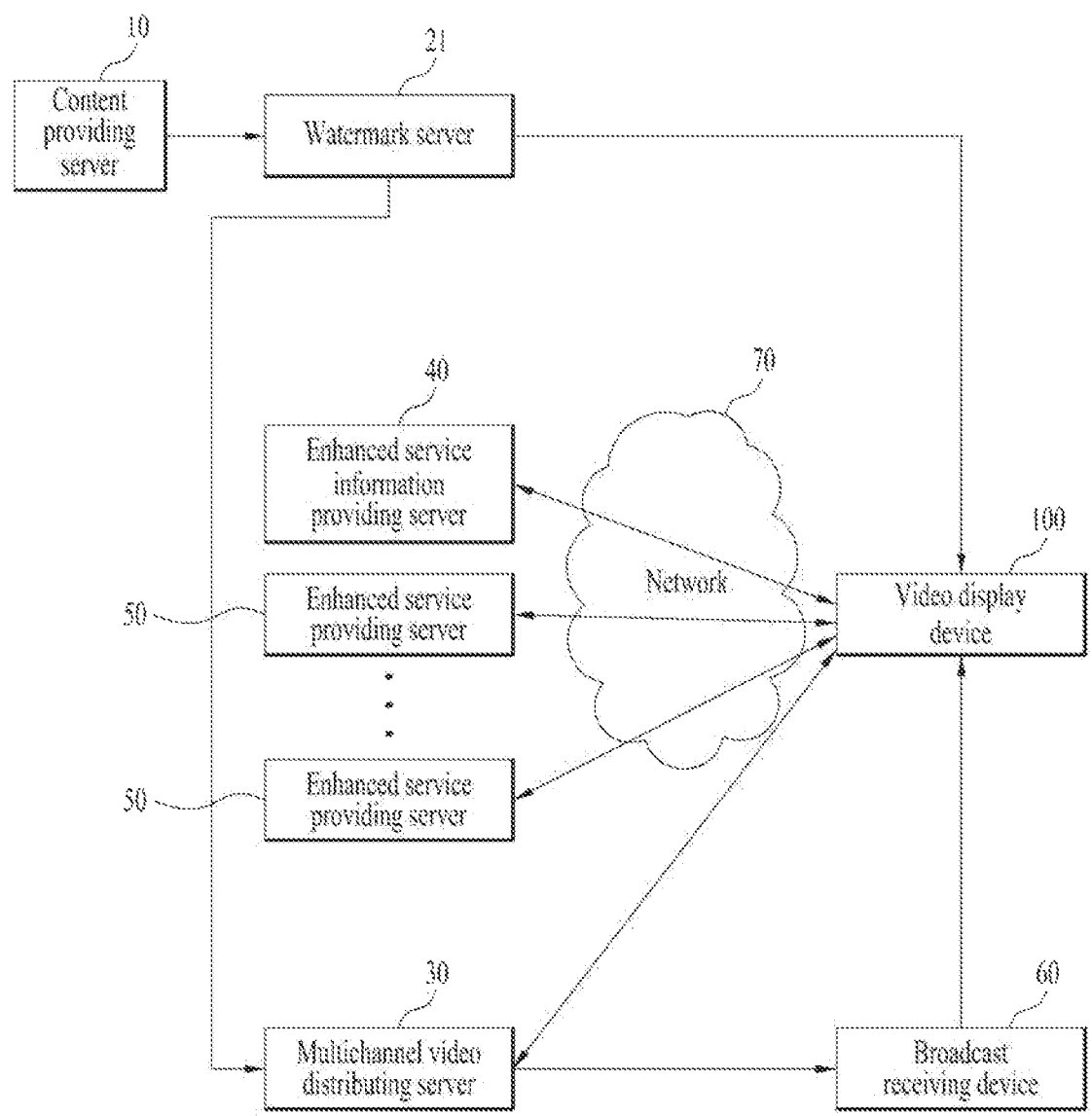
FIG. 31 is a block diagram illustrating a watermark based network topology according to an embodiment.

FIG. 31 is a block diagram illustrating a watermark based network topology according to an embodiment.

As shown in FIG. 31, the watermark based network topology may further include a watermark server 21.

As shown in FIG. 31, the watermark server 21 edits a main AV content to insert content information into it. The multichannel video distributing server 30 may receive and distribute a broadcast signal including the modified main AV content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 32:
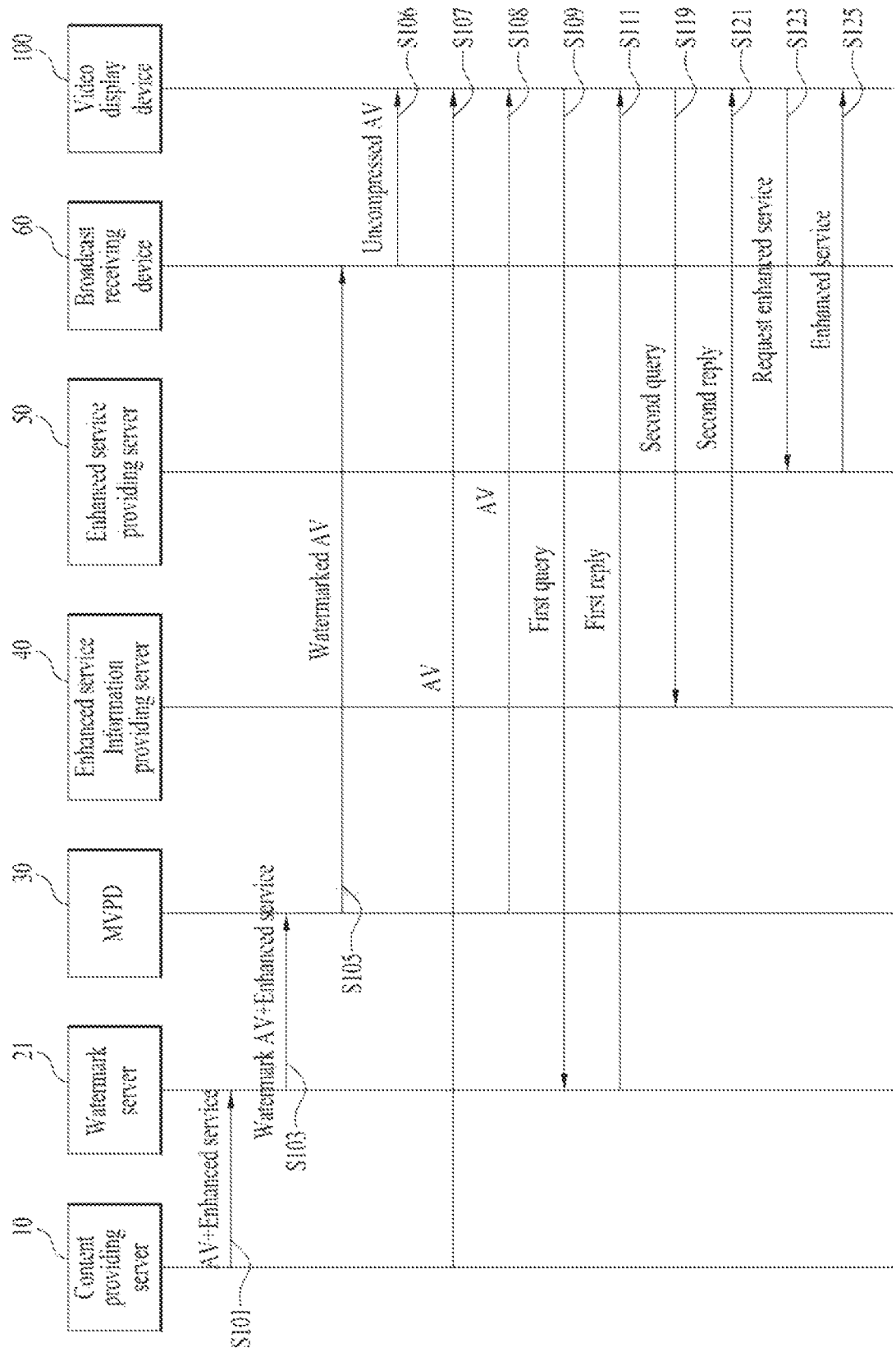
FIG. 32 is a ladder diagram illustrating a data flow in a watermark based network topology according to an embodiment.

FIG. 32 is a ladder diagram illustrating a data flow in a watermark based network topology according to an embodiment.

First, the content providing server 10 transmits a broadcast signal including a main AV content and an enhanced service in operation S101.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where feature information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 100 acquires watching information of the main AV content and reports the acquired watching information to the main AV content watching information reporting address in the main AV content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee-Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main AV content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S106.

Moreover, the content providing server 10 also broadcasts a broadcast signal including a main AV content through a wireless channel in operation S107.

Additionally, the MVPD 30 may directly transmit a broadcast signal including a main AV content to the video display device 100 without going through the broadcast receiving device 60 in operation S108.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from some frames or a section of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S109.

The watermark server 21 provides a first reply to the first query in operation S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

Figure 33:
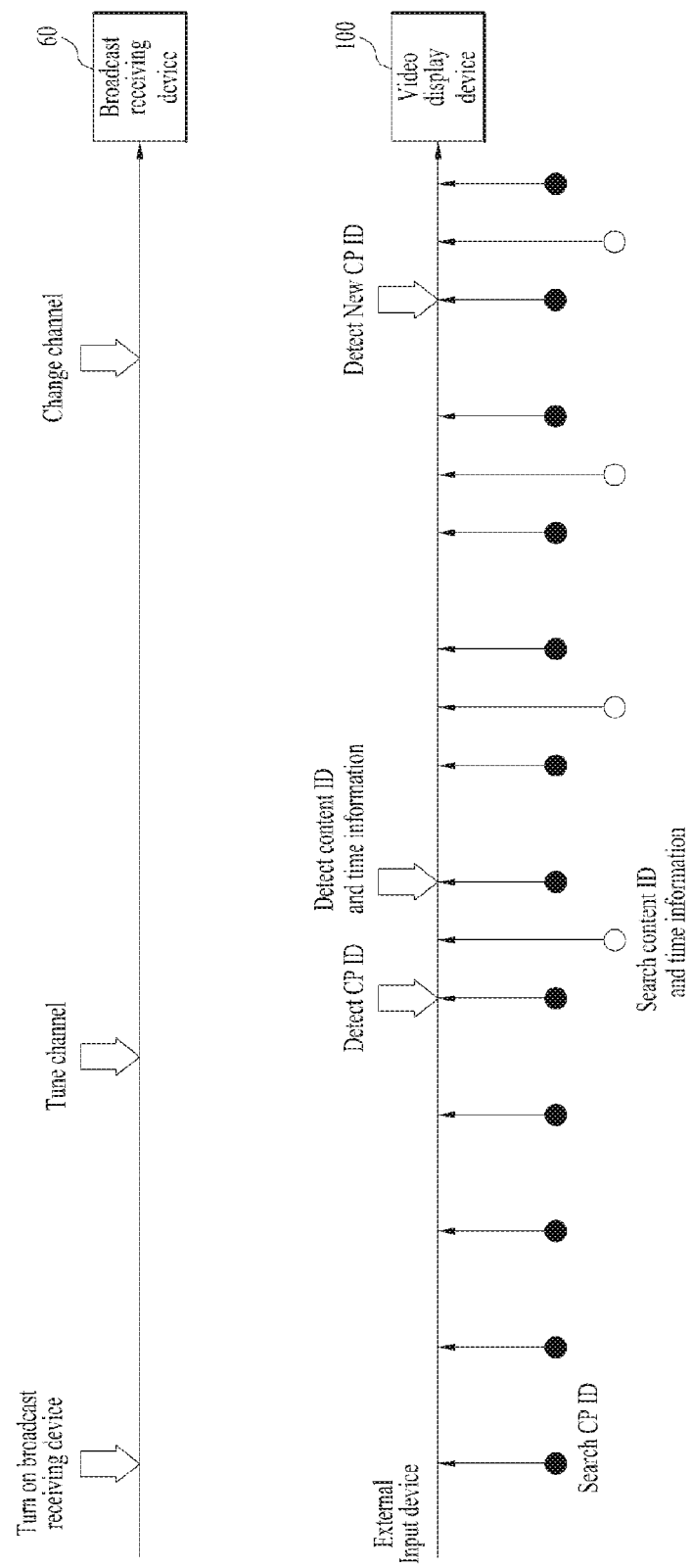
FIG. 33 is a view illustrating a watermark based content recognition timing according to an embodiment.

FIG. 33 is a view illustrating a watermark based content recognition timing according to an embodiment.

As shown in FIG. 33, when the broadcast receiving device 60 is turned on and tunes a channel, and also, the video display device 100 receives a main AV content of the turned channel from the broadcast receiving device 60 through an external input port 111, the video display device 100 may sense a content provider identifier (or a broadcasting station identifier) from the watermark of the main AV content. Then, the video display device 100 may sense content information from the watermark of the main AV content on the basis of the sensed content provider identifier.

At this point, as shown in FIG. 33, the detection available period of the content provider identifier may be different from that of the content information. Especially, the detection available period of the content provider identifier may be shorter than that of the content information. Through this, the video display device 100 may have an efficient configuration for detecting only necessary information.

Figure 34:
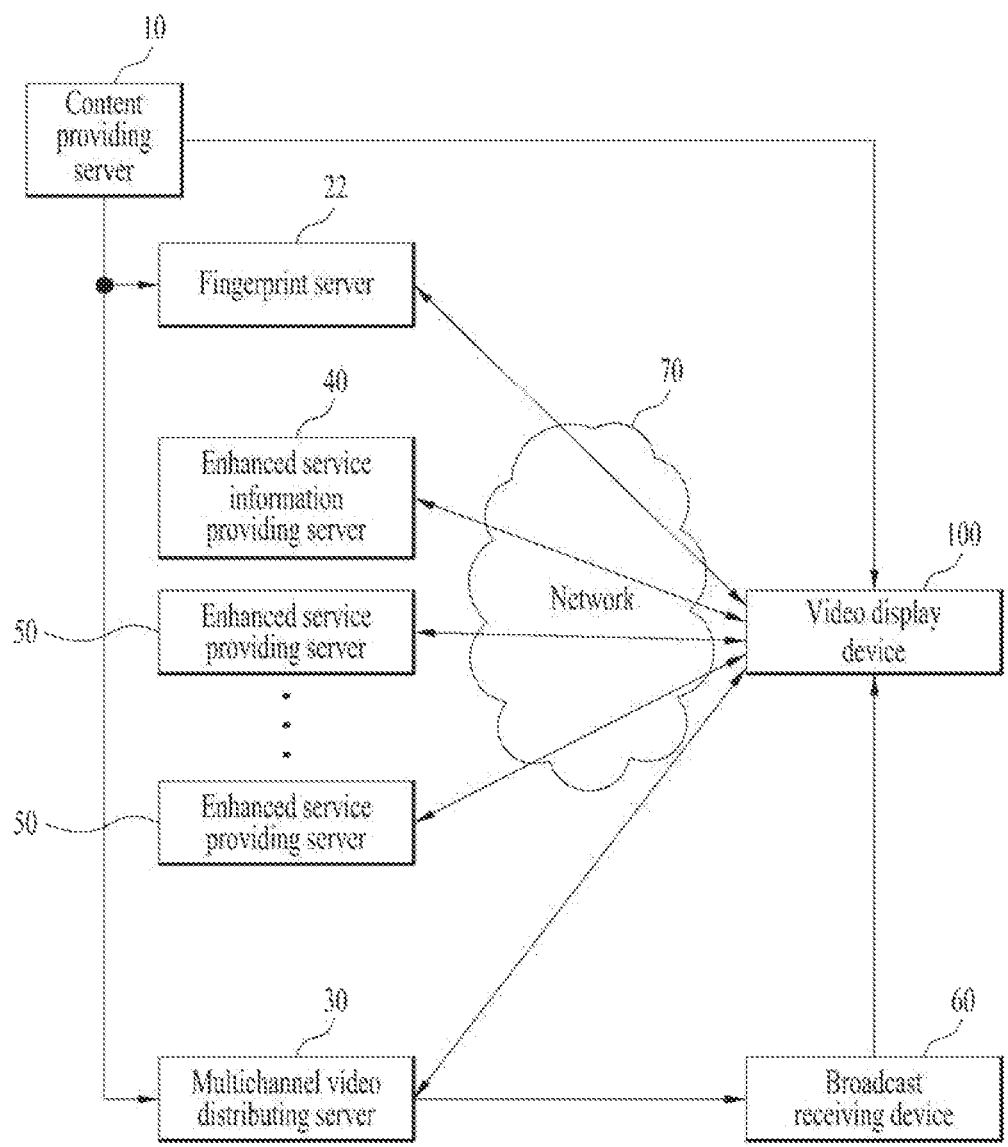
FIG. 34 is a block diagram illustrating a fingerprint based network topology according to an embodiment.

FIG. 34 is a block diagram illustrating a fingerprint based network topology according to an embodiment.

As shown in FIG. 34, the network topology may further include a fingerprint server 22.

As shown in FIG. 34, the fingerprint server 22 does not edit a main AV content, but extracts feature information from some frames or a section of audio samples of the main AV content and stores the extracted feature information. Then, when receiving the feature information from the video display device 100, the fingerprint server 22 provides an identifier and time information of an AV content corresponding to the received feature information.

Figure 35:
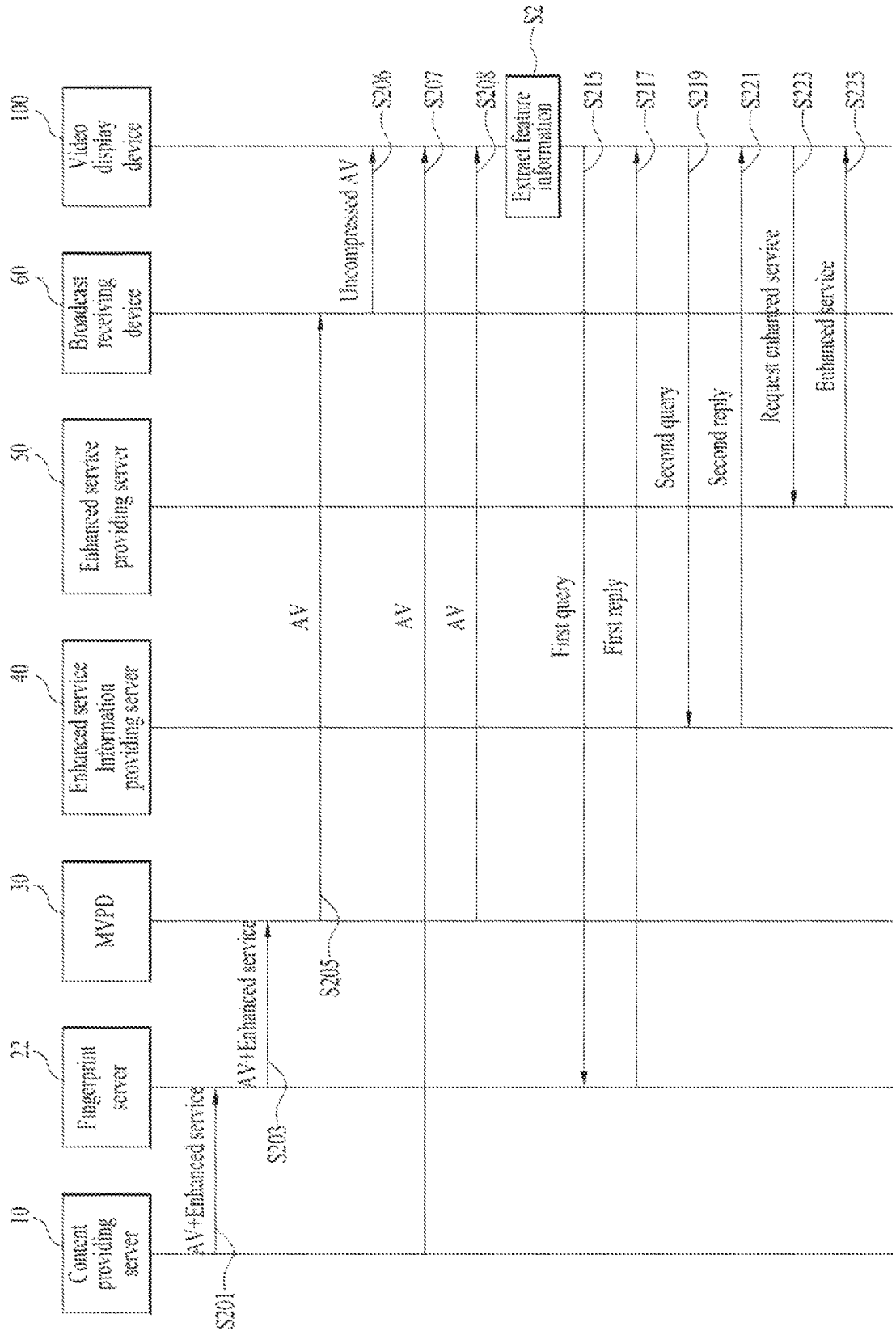
FIG. 35 is a ladder diagram illustrating a data flow in a fingerprint based network topology according to an embodiment.

FIG. 35 is a ladder diagram illustrating a data flow in a fingerprint based network topology according to an embodiment.

First, the content providing server 10 transmits a broadcast signal including a main AV content and an enhanced service in operation S201.

The fingerprint server 22 receives a broadcast signal that the content providing server 10, extracts a plurality of pieces of feature information from a plurality of frame sections or a plurality of audio sections of the main AV content, and establishes a database for a plurality of query results corresponding to the plurality of feature information in operation S203. The query result may include at least one of content information, enhanced service information, and an available enhanced service.

The MVPD 30 receives broadcast signals including a main AV content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S206.

Moreover, the content providing server 10 also broadcasts a broadcast signal including a main AV content through a wireless channel in operation S207.

Additionally, the MVPD 30 may directly transmit a broadcast signal including a main AV content to the video display device 100 without going through the broadcast receiving device 60.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts feature information from some frames or a section of audio samples of the obtained main AV content in operation S213.

The video display device 100 accesses the fingerprint server 22 corresponding to the predetermined fingerprint server address to transmit a first query including the extracted feature information in operation S215.

The fingerprint server 22 provides a query result as a first reply to the first query in operation S217. If the first reply corresponds to fail, the video display device 100 accesses the fingerprint server 22 corresponding to another fingerprint server address to transmit a first query including the extracted feature information.

The fingerprint server 22 may provide Extensible Markup Language (XML) document as a query result. Examples of the XML document containing a query result will be described.

Figure 36:
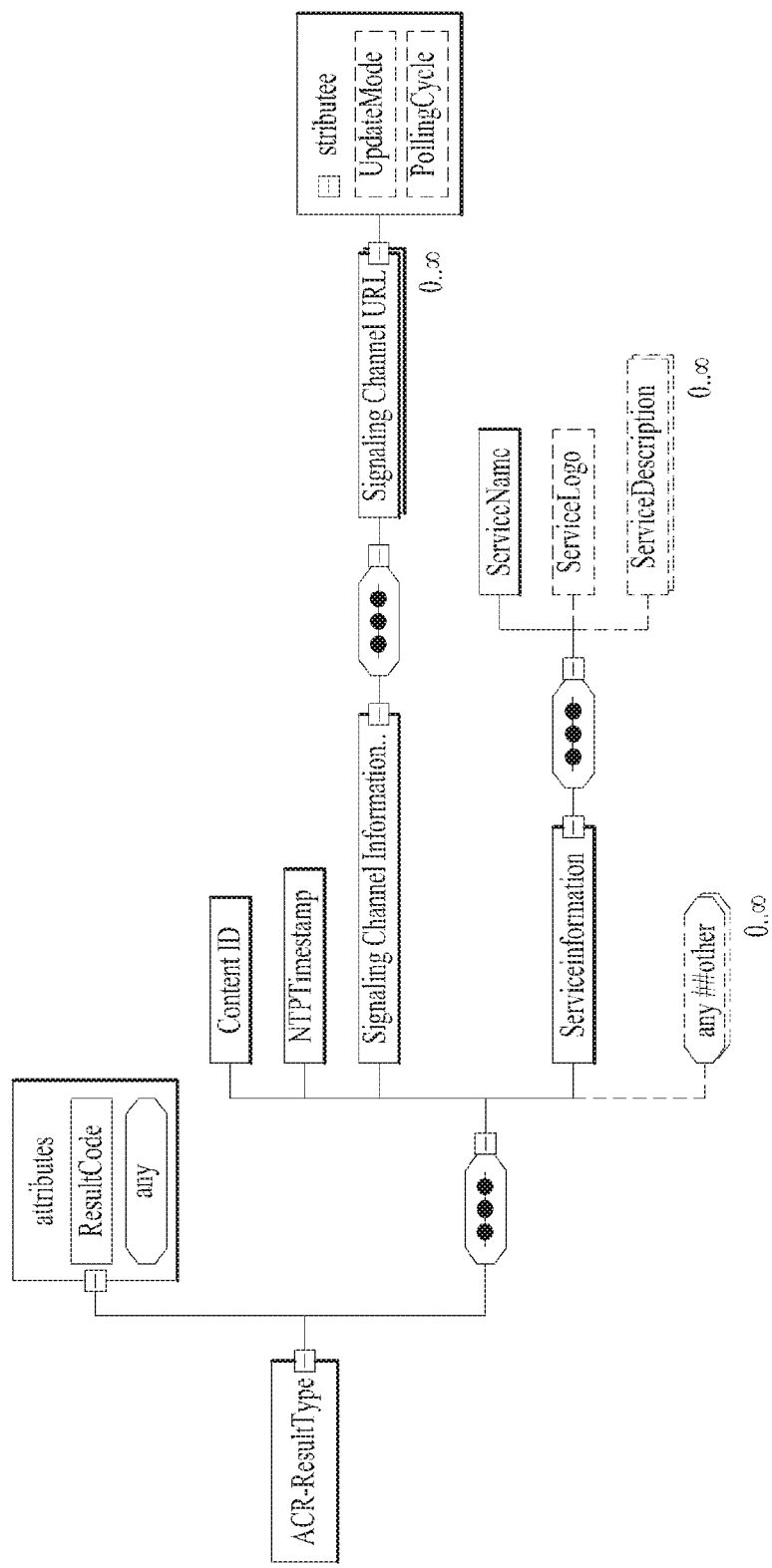
FIG. 36 is a view illustrating an XML schema diagram of ACR-Resulttype containing a query result according to an embodiment.

FIG. 36 is a view illustrating an XML schema diagram of ACR-Resulttype containing a query result according to an embodiment.

As shown in FIG. 36, ACR-Resulttype containing a query result includes ResultCode attributes and ContentID, NTPTimestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

An XML schema of ACR-ResultType containing the query result is illustrated below.

TABLE 34

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL"
                        maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                        type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="xs:anyURI"
                        minOccurs="0"/>
                    <xs:element name="ServiceDescription" type="xs:string"
```

TABLE 34-continued

```
        minOccurs="0" maxOccurs="unbounded"/>
      </xs:sequence>
    </xs:complexType>
  </xs:element>
  <xs:any namespace="##other" processContents="skip"
    minOccurs="0" maxOccurs="unbounded"/>
  </xs:sequence>
  <xs:attribute name="ResultCode" type="xs:string" use="required"/>
  <xs:anyAttribute processContents="skip"/>
</xs:complexType>
```

As the ContentID element, an ATSC content identifier may be used as shown in table below.

TABLE 35

| Syntax | The Number of bits | format |
|---|---|---|
| ATSC_content_identifier(){ | 16 | uimsbf |
| TSID |  |  |
| reserved | 2 | bslbf |
| end_of_day | 5 | uimsbf |
| unique_for | 9 | uimsbf |
| content_id | var |  |
| } |  |  |

As shown in the table, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
urn:oma:bcast:iauth:atsc:service:<region>:<xsid>:<serviceid>.

Here, <region> is an international country code including two characters regulated by ISO 639-2. <xsid> for local service is a decimal number of TSID as defined in <region>, and <xsid> (regional service) (major>69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1.
urn:oma:bcastiauth:atsc:service:us:0:100.200.

Moreover, as the ContentID element, an ATSC content identifier may be used as described below.

The ATSC content identifier has the following form.
urn:oma:bcast:iauth:atsc:content:<region>:<xsidz>:<contentid>:<unique_for>:<end_of_day>.

Here, <region> is an international country code including two characters regulated by ISO 639-2. <xsid> for local service is a decimal number of TSID as defined in <region>, and may be followed by ".".<serviceid>. <xsid> for (regional service) (major>69) is <serviceid>. <content_id> is a base64 sign of a content_id field defined in above described table, <unique_for> is a decimal number sign of an uniq-ue_for field defined in above described table, and <end_of_day> is a decimal number sign of an end_of_day field defined in above described table.

Hereinafter, FIG. 35 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S221.

If the video display device 100 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Figure 37:
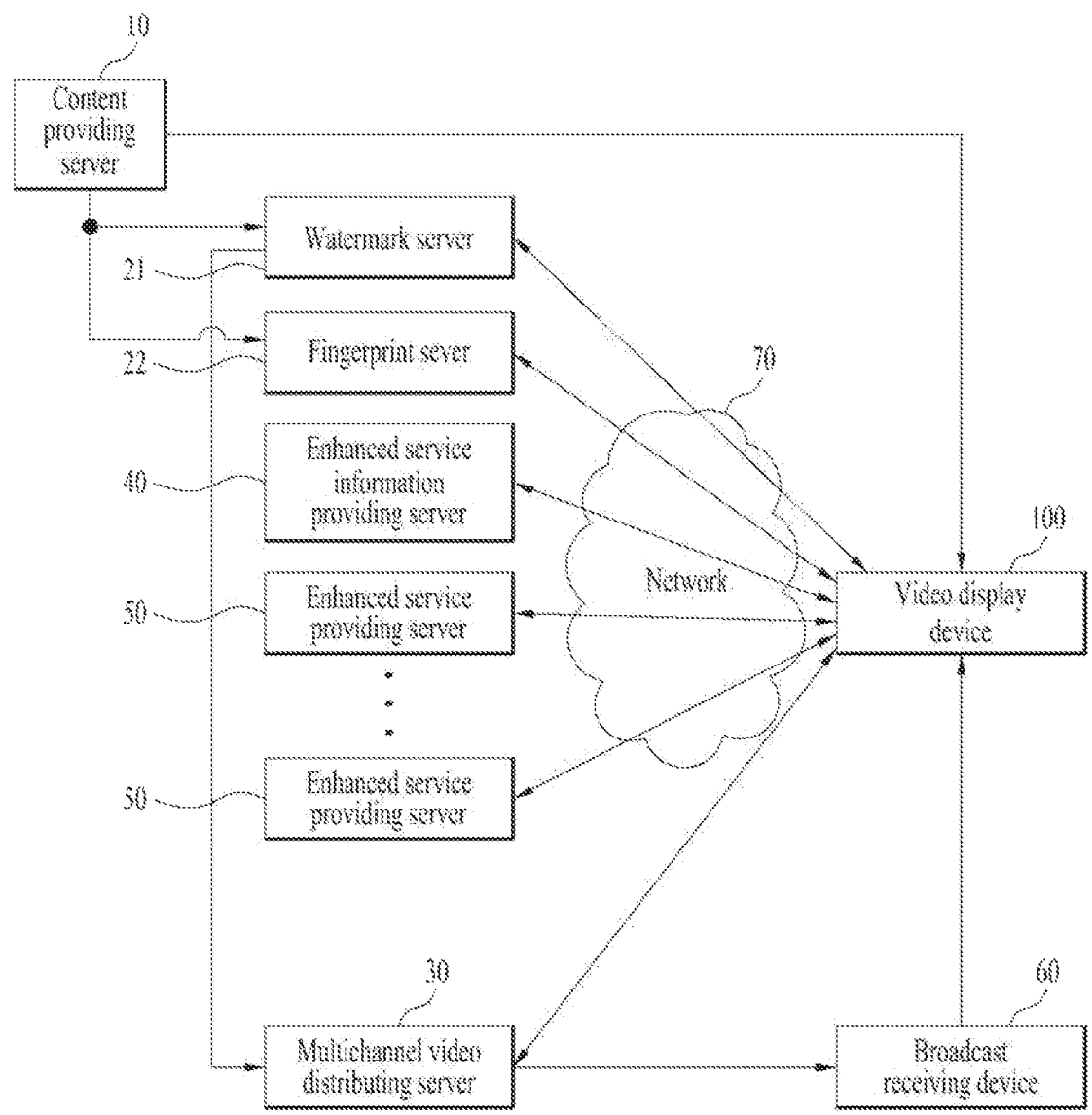
FIG. 37 is a block diagram illustrating a watermark and fingerprint based network topology according to an embodiment.

FIG. 37 is a block diagram illustrating a watermark and fingerprint based network topology according to an embodiment.

As shown in FIG. 37, the watermark and fingerprint based network topology may further include a watermark server 21 and a fingerprint server 22.

As shown in FIG. 37, the watermark server 21 inserts content provider identifying information into a main AV content. The watermark server 21 may insert content provider identifying information as a visible watermark such as a logo or an invisible watermark into a main AV content.

The fingerprint server 22 does not edit a main AV content, but extracts feature information from some frames or a certain section of audio samples of the main AV content and stores the extracted feature information. Then, when receiving the feature information from the video display device 100, the fingerprint server 22 provides an identifier and time information of an AV content corresponding to the received feature information.

Figure 38:
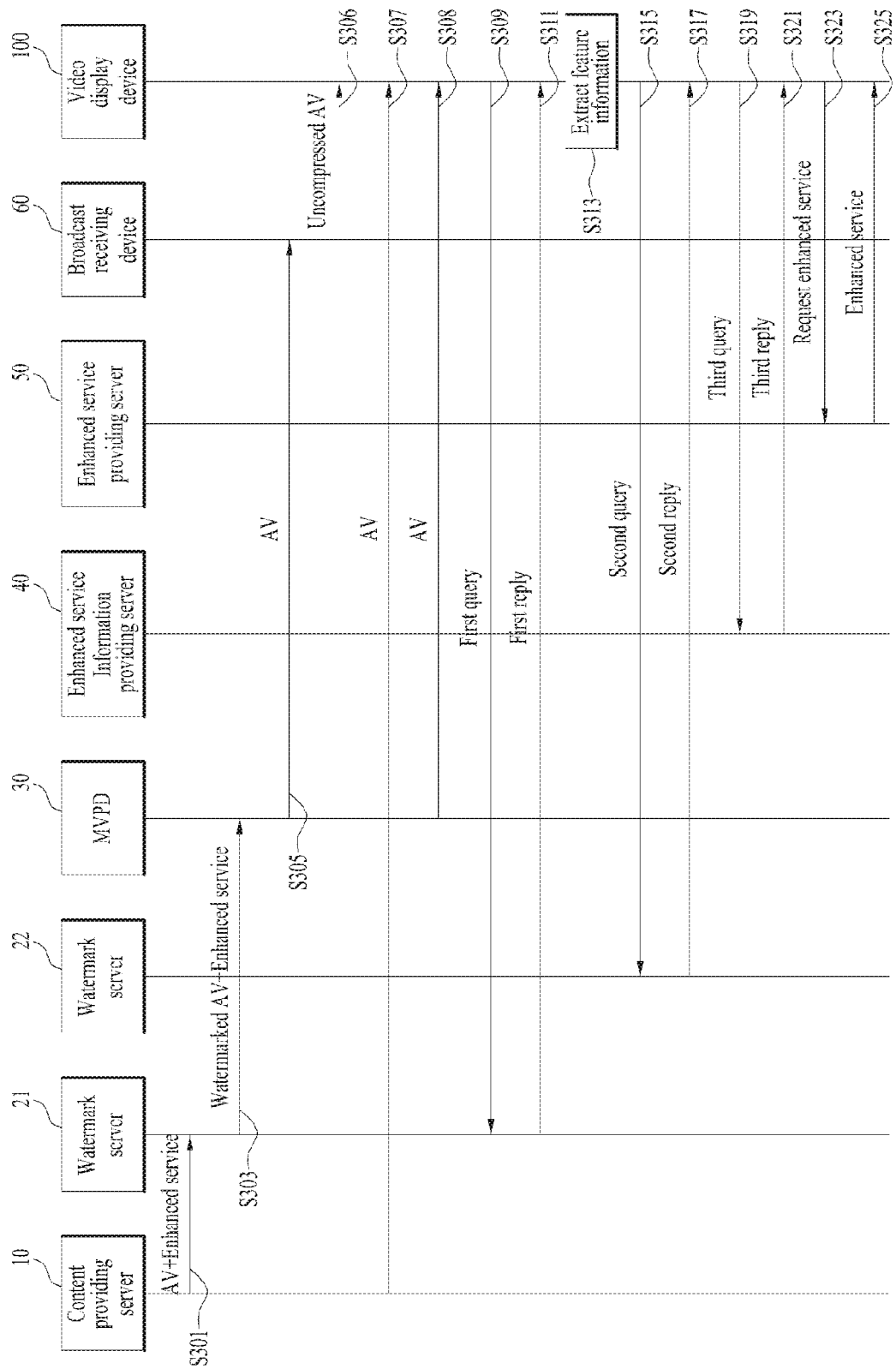
FIG. 38 is a ladder diagram illustrating a data flow in a watermark and fingerprint based network topology according to an embodiment.

FIG. 38 is a ladder diagram illustrating a data flow in a watermark and fingerprint based network topology according to an embodiment.

First, the content providing server 10 transmits a broadcast signal including a main AV content and an enhanced service in operation S301.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S306.

Moreover, the content providing server 10 also broadcasts a broadcast signal including a main AV content through a wireless channel in operation S307.

Additionally, the MVPD 30 may directly transmit a broadcast signal including a main AV content to the video display device 100 without going through the broadcast receiving device 60 in operation S308.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from audio samples in some frames or periods of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 100 extracts feature information from some frames or a certain section of audio samples of the main AV content in operation S313.

The video display device 100 accesses the fingerprint server 22 corresponding to the fingerprint server address in the first reply to transmit a second query including the extracted feature information in operation S315.

The fingerprint server 22 provides a query result as a second reply to the second query in operation S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 100 enhanced service information for at least one available enhanced service as a third reply to the third query in operation S321.

If the video display device 100 obtains at least one available enhanced service address through the first reply, the second reply, or the third reply, it accesses the at least one available enhanced service address to request enhanced service in operation S323, and then, obtains the enhanced service in operation S325.

Then, referring to FIG. 39, the video display device 100 will be described according to an embodiment.

Figure 39:
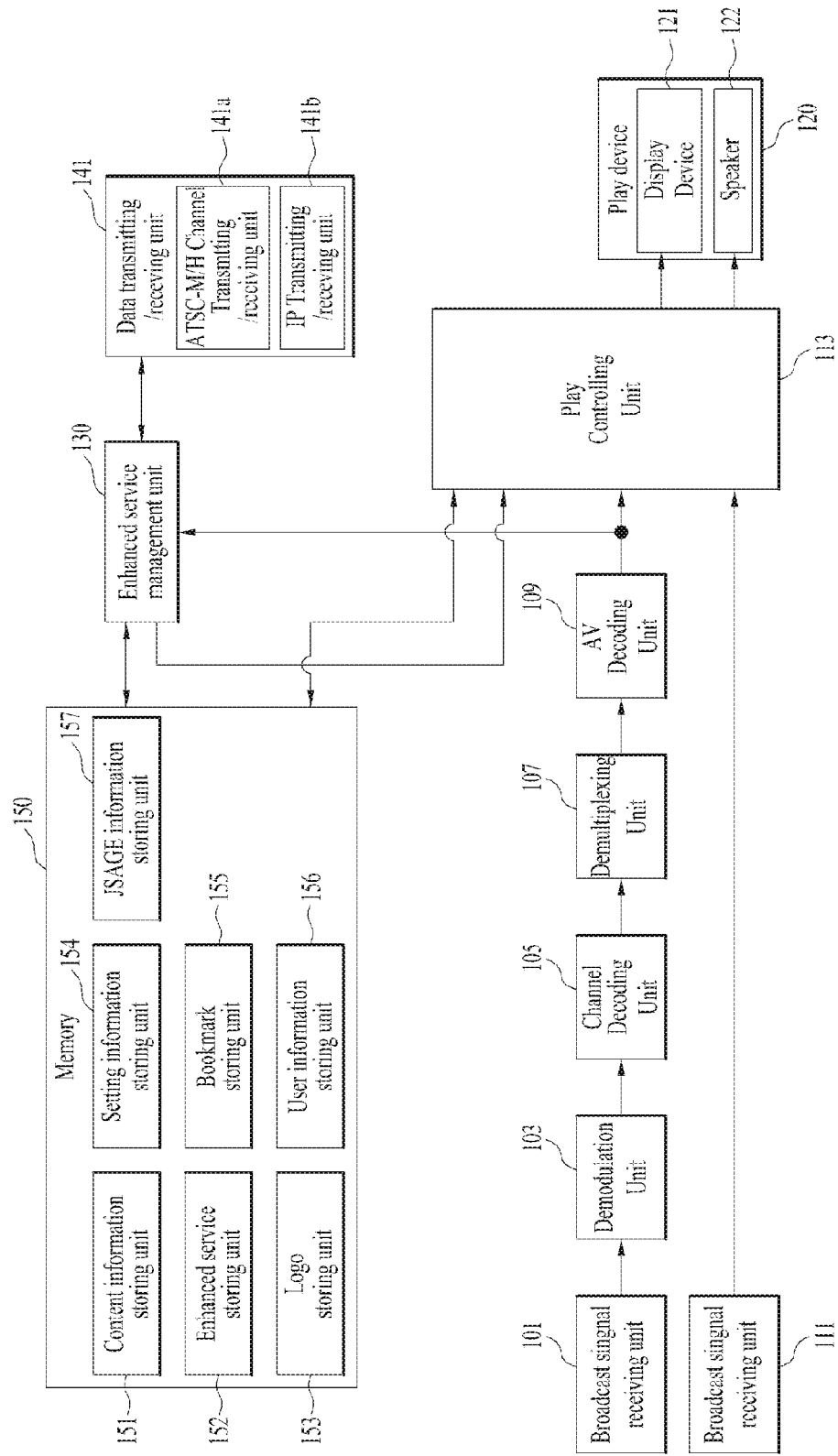
FIG. 39 is a block diagram illustrating the video display device according to the embodiment.

FIG. 39 is a block diagram illustrating the video display device according to the embodiment.

As shown in FIG. 39, the video display device 100 includes a broadcast signal receiving unit 101, a demodulation unit 103, a channel decoding unit 105, a demultiplexing unit 107, an AV decoding unit 109, an external input port 111, a play controlling unit 113, a play device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main AV content and enhanced service from the channel-decoded data. The separated enhanced service is stored in an enhanced service storage unit 152.

The AV decoding unit 109 performs AV decoding on the separated main AV content to generate an uncompressed main AV content.

Moreover, the external input port 111 receives an uncompressed main AV content from the broadcast receiving device 60, a digital versatile disk (DVD) player, a Blu-ray disk player, and so on. The external input port 111 may include at least one of a DSUB port, a High Definition Multimedia Interface (HDMI) port, a Digital Visual Interface (DVI) port, a composite port, a component port, and an S-Video port.

The play controlling unit 113 controls the play device 120 to play at least one of an uncompressed main AV content that the AV decoding unit 109 generates and an uncompressed main AV content received from the external input port 111 according to a user's selection.

The play device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main AV content and obtains available enhanced service on the basis of the obtained content information. Especially, as described above, the enhanced service management unit 130 may obtain the identification information of the main AV content on the basis of some frames or a certain section of audio samples the uncompressed main AV content. This is called automatic contents recognition (ACR) in this specification.

The data transmitting/receiving unit 141 may include an Advanced Television Systems Committee-Mobile/Handheld (ATSC-M/H) channel transmitting/receiving unit 141a and an IP transmitting/receiving unit 141b.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of feature information.

The enhanced service storage unit 152 may store a plurality of enhanced services corresponding to a plurality of feature information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main AV content watching information and enhanced service usage information within the set range. The usage information range may be set in each virtual channel. Additionally, the usage information measurement allowable range may be set over an entire physical channel.

The usage information providing unit 157 stores the main AV content watching information and the enhanced service usage information, which are collected by the video display device 100. Additionally, the video display device 100 analyzes a service usage pattern on the basis of the collected main AV content watching information and enhanced service usage information, and stores the analyzed service usage pattern in the usage information storage unit 157.

The enhanced service management unit 130 may obtain the content information of the main AV content from the fingerprint server 22 or the content information storage unit 151. If there is no content information or sufficient content information, which corresponds to the extracted feature information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main AV content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main AV content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Then, referring to FIGS. 40 and 41, a method of synchronizing a playback time of a main AV content with a playback time of an enhanced service according to an embodiment will be described.

Figure 40:
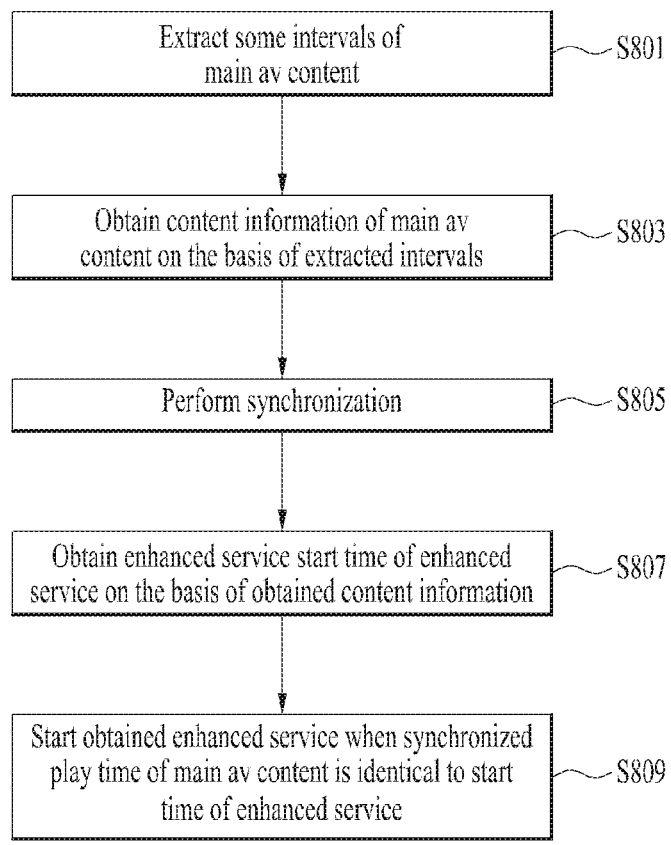
FIG. 40 is a flowchart illustrating a method of synchronizing a playback time of a main AV content with a playback time of an enhanced service according to an embodiment.

FIG. 40 is a flowchart illustrating a method of synchronizing a playback time of a main AV content with a playback time of an enhanced service according to an embodiment.

Enhanced service information may include a start time of an enhanced service. At this point, the video display device 100 may need to start the enhanced service at the start time. However, since the video display device 100 receives a signal transmitting an uncompressed main AV content with no time stamp, the reference time of a plying time of the main AV content is different from that of a start time of the enhanced service. Although the video display device 100 receives a main AV content having time information, the reference time of a plying time of the main AV content may be different from that of a start time of the enhanced service, like rebroadcasting. Accordingly, the video display device 100 may need to synchronize the reference time of the main AV content with that of the enhanced service. Especially, the video display device 100 may need to synchronize the playback time of the main AV content with the start time of the enhanced service.

First, the enhanced service management unit 130 extracts a certain section of a main AV content in operation S801. The section of the main AV content may include at least one of some video frames or a certain audio section of the main AV content. Time that the enhanced service management unit 130 extracts the section of the main AV content is designated as Tn.

The enhanced service management unit 130 obtains content information of a main AV content on the basis of the extracted section S803. In more detail, the enhanced service management unit 130 decodes information encoded with invisible watermark in the extracted section to obtain content information. Additionally, the enhanced service management unit 130 may extract feature information in the extracted section, and obtain the content information of the main AV content from the fingerprint server 22 or the content information storage unit 151 on the basis of the extracted feature information. Time that the enhanced service management unit 130 obtains the content information is designated as Tm.

Moreover, the content information includes a start time Ts of the extracted section. After the content information acquisition time Tm, the enhanced service management unit 130 synchronizes the playback time of the main AV content with the start time of the enhanced service on the biases of Ts, Tm, and Tn S805. In more detail, the enhanced service management unit 130 regards the content information acquisition time Tm as a time Tp, which can be calculated by Tp=Ts+(Tm−Tn).

Additionally, the enhanced service management unit 130 regards a time of when Tx elapses after the content information acquisition time as Tp+Tx.

Then, the enhanced service management unit 130 obtains an enhanced service and its start time Ta on the obtained content information in operation S807.

If the synchronized playback time of the main AV content is identical to the start time Ta of the enhanced service, the enhanced service management unit 130 starts the obtained enhanced service in operation S809. In more detail, the enhanced service management unit 130 may start the enhanced service when Tp+Tx=Ta is satisfied.

Figure 41:
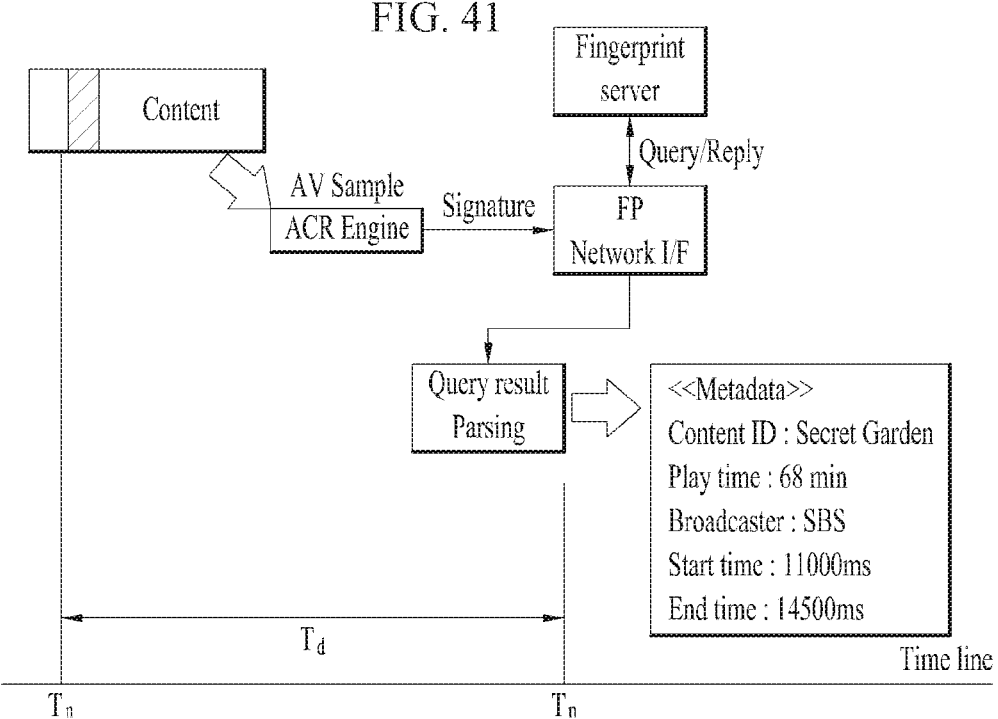
FIG. 41 is a conceptual diagram illustrating a method of synchronizing a playback time of a main AV content with a playback time of an enhanced service according to an embodiment.

FIG. 41 is a conceptual diagram illustrating a method of synchronizing a playback time of a main AV content with a playback time of an enhanced service according to an embodiment.

As shown in FIG. 41, the video display device 100 extracts an AV sample during a system time Tn.

The video display device 100 extracts feature information from the extracted AV sample, and transmits a query including the extracted feature information to the fingerprint server 22 to receive a query result. The video display device 100 confirms whether a start time Ts of the extracted AV sample corresponds to 11000 ms at Tm by parsing the query result.

Accordingly, the video display device 100 regards the time of when the start time of the extracted AV sample is confirmed as Ts+(Tm−Tn), so that, after that, the playback time of the main AV content may be synchronized with the start time of the enhanced service.

Next, a structure of a video display device according to various embodiments will be described with reference to FIGS. 42 and 43.

Figure 42:
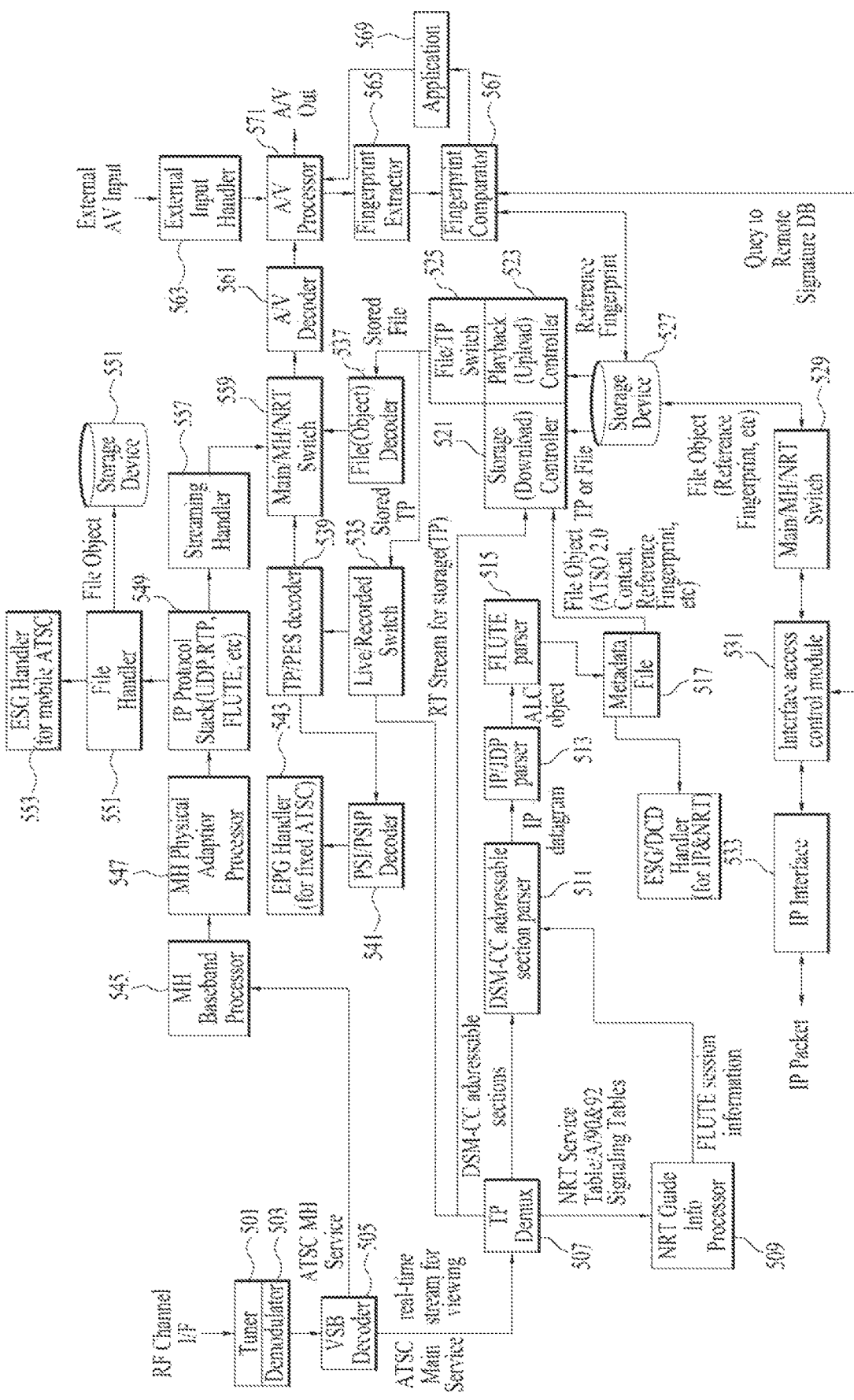
FIG. 42 is a block diagram illustrating a structure of a fingerprint based video display device according to another embodiment.

FIG. 42 is a block diagram illustrating a structure of a fingerprint based video display device according to another embodiment.

As shown in FIG. 42 a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint feature information from an AV stream.

The Fingerprint Comparator 567 compares the feature information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

Figure 43:
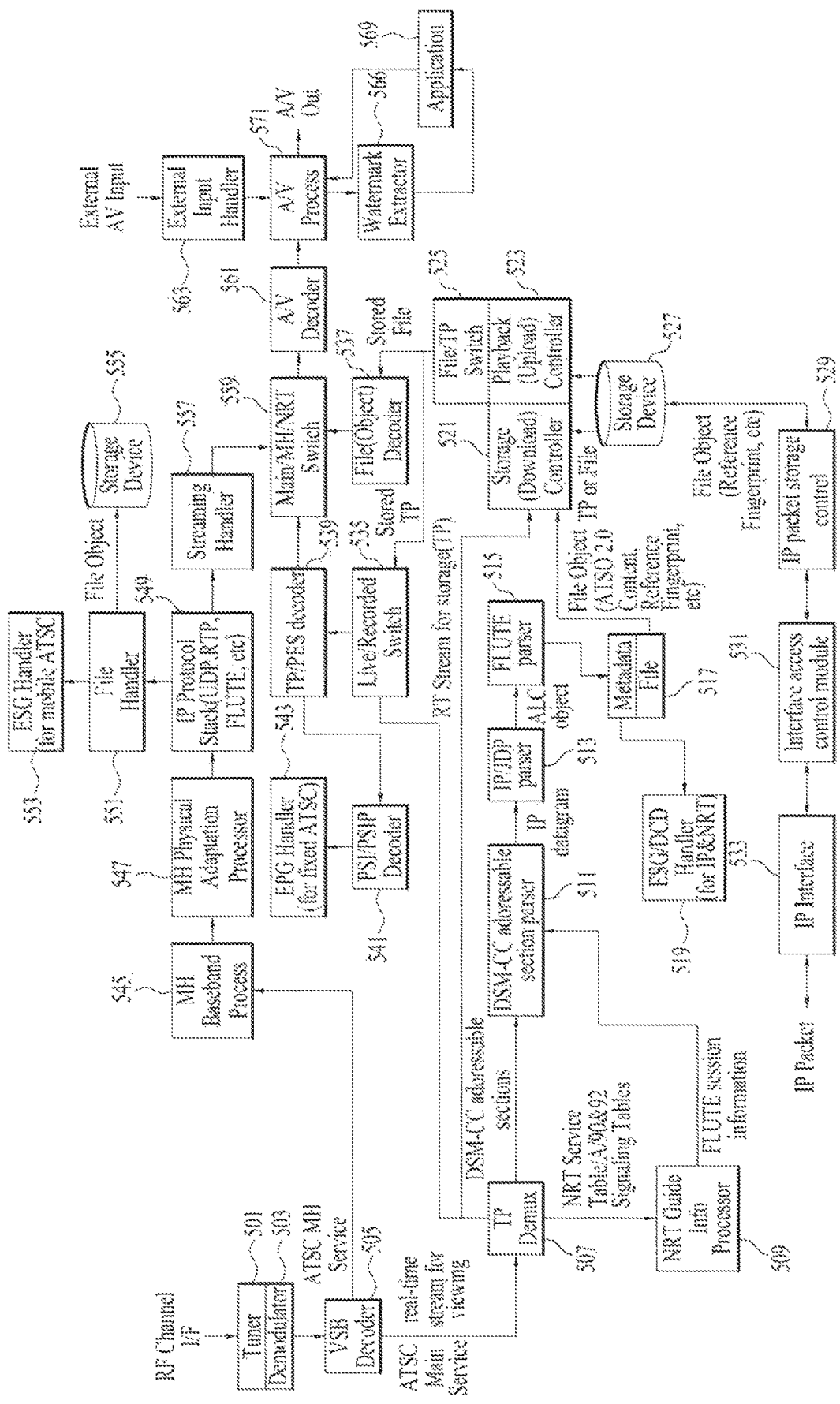
FIG. 43 is a block diagram illustrating a structure of a watermark based video display device according to another embodiment.

FIG. 43 is a block diagram illustrating a structure of a watermark based video display device according to another embodiment.

Although the watermark based video display device of FIG. 43 is similar to the fingerprint based video display device of FIG. 42, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

Figures 44, 45:
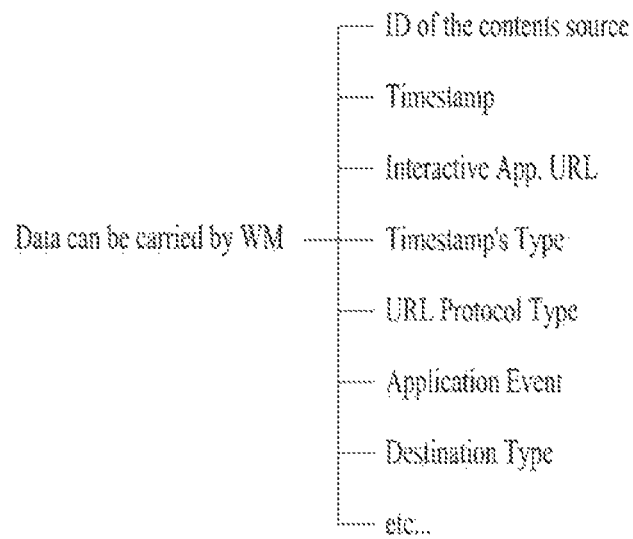
FIG. 44 is a diagram showing data which may be delivered via a watermarking scheme according to one embodiment of the present invention.
FIG. 45 is a diagram showing the meanings of the values of the timestamp type field according to one embodiment of the present invention.

FIG. 44 is a diagram showing data which may be delivered via a watermarking scheme according to one embodiment of the present invention.

As described above, an object of ACR via a WM is to obtain supplementary service related information of content from incompressible audio/video in an environment capable of accessing only incompressible audio/video (that is, an environment in which audio/video is received from a cable/satellite/IPTV, etc.). Such an environment may be referred to as an ACR environment. In the ACR environment, since a receiver receives incompressible audio/video data only, the receiver may not confirm which content is currently being displayed. Accordingly, the receiver uses a content source ID, a current point of time of a broadcast program and URL information of a related application delivered by a WM to identify displayed content and provide an interactive service.

In delivery of a supplementary service related to a broadcast program using an audio/video watermark (WM), all supplementary information may be delivered by the WM as a simplest method. In this case, all supplementary information may be detected by a WM detector to simultaneously process information detected by the receiver.

However, in this case, if the amount of WMs inserted into audio/video data increases, total quality of audio/video may deteriorate. For this reason, only minimum necessary data may be inserted into the WM. A structure of WM data for enabling a receiver to efficiently receive and process a large amount of information while inserting minimum data as a WM needs to be defined. A data structure used for the WM may be equally used even in a fingerprinting scheme which is relatively less influenced by the amount of data.

As shown, data delivered via the watermarking scheme according to one embodiment of the present invention may include an ID of a content source, a timestamp, an interactive application URL, a timestamp's type, a URL protocol type, an application event, a destination type, etc. In addition, various types of data may be delivered via the WM scheme according to the present invention.

The present invention proposes the structure of data included in a WM when ACR is performed via a WM scheme. For shown data types, a most efficient structure is proposed by the present invention.

Data which can be delivered via the watermarking scheme according to one embodiment of the present invention include the ID of the content source. In an environment using a set top box, a receiver (a terminal or TV) may not check a program name, channel information, etc. when a multichannel video programming distributor (MVPD) does not deliver program related information via the set top box. Accordingly, a unique ID for identifying a specific content source may be necessary. In the present invention, an ID type of a content source is not limited. Examples of the ID of the content source may be as follows.

First, a global program ID may be a global identifier for identifying each broadcast program. This ID may be directly created by a content provider or may be created in the format specified by an authoritative body. Examples of the ID may include TMSId of "TMS metadata" of North America, an EIDR ID which is a movie/broadcast program identifier, etc.

A global channel ID may be a channel identifier for identifying all channels. Channel numbers differ between MVPDs provided by a set top box. In addition, even in the same MVPD, channel numbers may differ according to services designated by users. The global channel ID may be used as a global identifier which is not influenced by an MVPD, etc. According to embodiments, a channel transmitted via a terrestrial wave may be identified by a major channel number and a minor channel number. If only a program ID is used, since a problem may occur when several broadcast stations broadcast the same program, the global channel ID may be used to specify a specific broadcast channel.

Examples of the ID of the content source to be inserted into a WM may include a program ID and a channel ID. One or both of the program ID and the channel ID or a new ID obtained by combining the two IDs may be inserted into the WM. According to embodiments, each ID or combined ID may be hashed to reduce the amount of data. The ID of each content source may be of a string type or an integer type. In the case of the integer type, the amount of transmitted data may be further reduced.

In addition, data which can be delivered via the watermarking scheme according to one embodiment of the present invention may include a timestamp. The receiver should know a point of time of currently viewed content. This time related information may be referred to as a timestamp and may be inserted into the WM. The time related information may take the form of an absolute time (UTC, GPS, etc.) or a media time. The time related information may be delivered up to a unit of milliseconds for accuracy and may be delivered up to a smaller unit according to embodiments. The timestamp may have a variable length according to type information of the timestamp.

Data which can be delivered via the watermarking scheme according to one embodiment may include the URL of the interactive application. If an interactive application related to a currently viewed broadcast program is present, the URL of the application may be inserted into the WM. The receiver may detect the WM, obtain the URL, and execute the application via a browser.

FIG. 45 is a diagram showing the meanings of the values of the timestamp type field according to one embodiment of the present invention.

The present invention proposes a timestamp type field as one of data which can be delivered via a watermarking scheme. In addition, the present invention proposes an efficient data structure of a timestamp type field.

The timestamp type field may be allocated 5 bits. The first two bits of the timestamp may mean the size of the timestamp and the next 3 bits may mean the unit of time information indicated by the timestamp. Here, the first two bits may be referred to as a timestamp size field and the next 3 bits may be referred to as a timestamp unit field.

As shown, according to the size of the timestamp and the unit value of the timestamp, a variable amount of real timestamp information may be inserted into the WM. Using such variability, a designer may select a size allocated to the timestamp and the unit thereof according to the accuracy of the timestamp. If accuracy of the timestamp increases, it is possible to provide an interactive service at an accurate time. However, system complexity increases as accuracy of the timestamp increases. In consideration of this tradeoff, the size allocated to the timestamp and the unit thereof may be selected.

If the first two bits of the timestamp type field are 00, the timestamp may have a size of 1 byte. If the first two bits of the timestamp type field are 01, 10 and 11, the size of the timestamp may be 2, 4 and 8 bytes, respectively.

If the last three bits of the timestamp type field are 000, the timestamp may have a unit of milliseconds. If the last three bits of the timestamp type field are 001, 010 and 011, the timestamp may have second, minute and hour units, respectively. The last three bits of the timestamp type field of 101 to 111 may be reserved for future use.

Here, if the last three bits of the timestamp type field are 100, a separate time code may be used as a unit instead of a specific time unit such as millisecond or second. For example, a time code may be inserted into the WM in the form of HH:MM:SS:FF which is a time code form of SMPTE. Here, HH may be an hour unit, MM may be a minute unit and SS may be a second unit. FF may be frame information. Frame information which is not a time unit may be simultaneously delivered to provide a frame-accurate service. A real timestamp may have a form of HHMMSSFF excluding colon in order to be inserted into the WM. In this case, a timestamp size value may have 11 (8 bytes) and a timestamp unit value may be 100. In the case of a variable unit, how the timestamp is inserted is not limited by the present invention.

For example, if timestamp type information has a value of 10 and timestamp unit information has a value of 000, the size of the timestamp may be 4 bits and the unit of the timestamp may be milliseconds. At this time, if the timestamp is Ts=3265087, 3 digits 087 located at the back of the timestamp may mean a unit of milliseconds and the remaining digits 3265 may mean a second unit. Accordingly, when this timestamp is interpreted, a current time may mean that 54 minutes 25.087 seconds has elapsed after the program, into which the WM is inserted, starts. This is only exemplary and the timestamp serves as a wall time and may indicate a time of a receiver or a segment regardless of content.

Figures 46, 47:
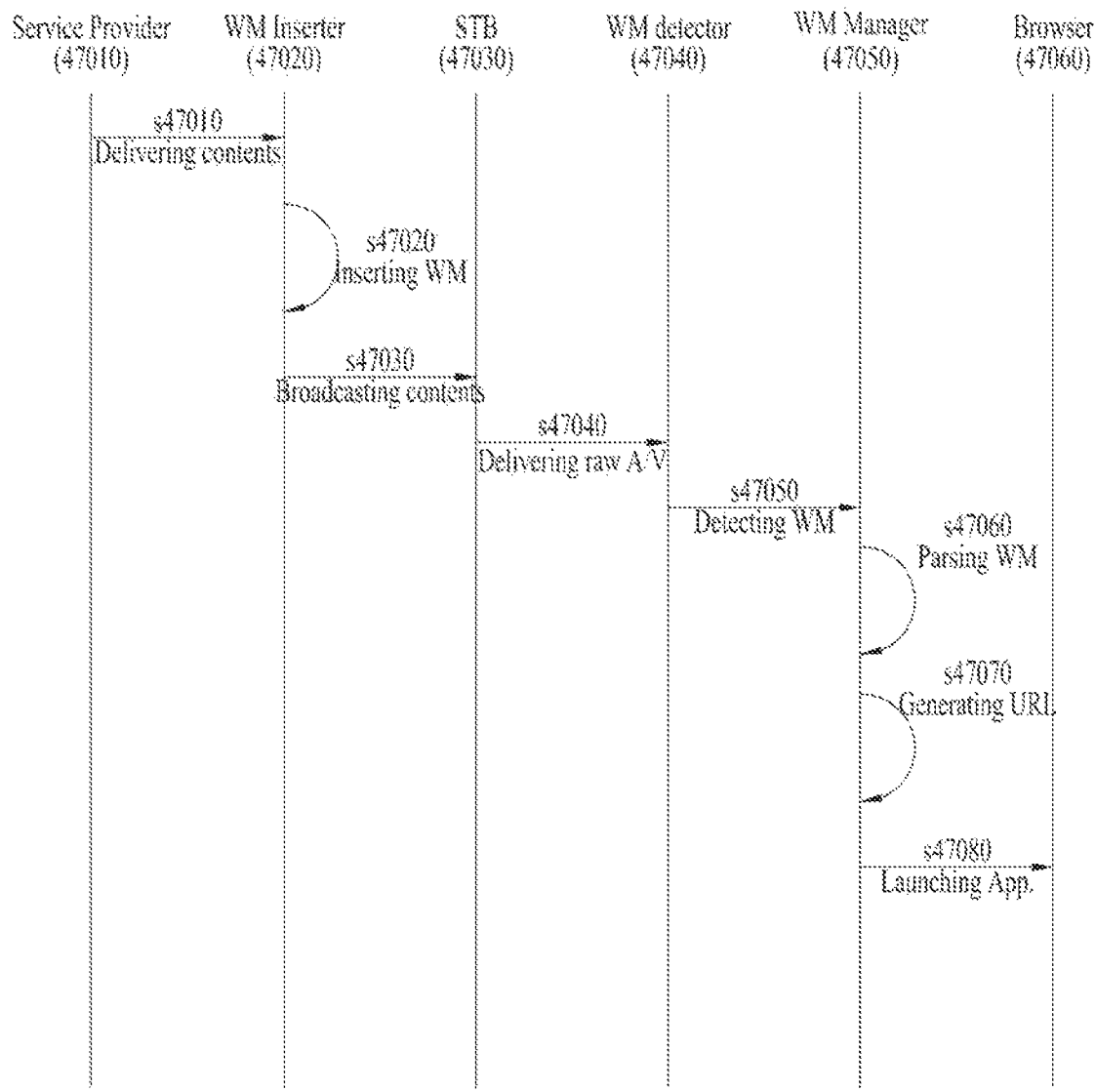
FIG. 46 is a diagram showing meanings of values of a URL protocol type field according to one embodiment of the present invention.
FIG. 47 is a flowchart illustrating a process of processing a URL protocol type field according to one embodiment of the present invention.

FIG. 46 is a diagram showing meanings of values of a URL protocol type field according to one embodiment of the present invention.

The present invention proposes a URL protocol type field as one of data which can be delivered via a watermarking scheme. In addition, the present invention proposes an efficient data structure of a URL protocol type field.

Among the above-described information, the length of the URL is generally long such that the amount of data to be inserted is relatively large. As described above, as the amount of data to be inserted into the WM decreases, efficiency increases. Thus, a fixed portion of the URL may be processed by the receiver. Accordingly, the present invention proposes a URL protocol type field.

The URL protocol type field may have a size of 3 bits. A service provider may set a URL protocol in a WM using the URL protocol type field. In this case, the URL of the interactive application may be inserted starting from a domain and may be transmitted to the WM.

A WM detector of the receiver may first parse the URL protocol type field, obtain URL protocol information and prefix the protocol to the URL value transmitted thereafter, thereby generating an entire URL. The receiver may access the completed URL via a browser and execute the interactive application.

Here, if the value of the URL protocol type field is 000, the URL protocol may be directly specified and inserted into the URL field of the WM. If the value of the URL protocol type field is 001, 010 and 011, the URL protocols may be http://, https:// and ws://, respectively. The URL protocol type field values of 100 to 111 may be reserved for future use.

The application URL may enable execution of the application via the browser (in the form of a web application). In addition, according to embodiments, a content source ID and timestamp information should be referred to. In the latter case, in order to deliver the content source ID information and the timestamp information to a remote server, a final URL may be expressed in the following form.

Request URL: http://domain/path?cid=1233456&t=5005.

In this embodiment, a content source ID may be 123456 and a timestamp may be 5005. CID may mean a query identifier of a content source ID to be reported to the remote server. t may mean a query identifier of a current time to be reported to the remote server.

FIG. 47 is a flowchart illustrating a process of processing a URL protocol type field according to one embodiment of the present invention.

First, a service provider 47010 may deliver content to a WM inserter 47020 (s47010). Here, the service provider 47010 may perform a function similar to the above-described content provision server. The WM inserter 47020 may insert the delivered content into a WM (s47020). Here, the WM inserter 47020 may perform a function similar to the above-described watermark server. The WM inserter 47020 may insert the above-described WM into audio or video by a WM algorithm. Here, the inserted WM may include the above-described application URL information, content source ID information, etc. For example, the inserted WM may include the above-described timestamp type field, the timestamp, the content ID, etc. The above-described protocol type field may have a value of 001 and URL information may have a value of atsc.org. The values of the field inserted into the WM are only exemplary and the present invention is not limited to this embodiment.

The WM inserter 47020 may transmit content, into which the WM is inserted (s47030). Transmission of the content, into which the WM is inserted, may be performed by the service provider 47010.

An STB 47030 may receive the content, into which the WM is inserted, and output incompressible A/V data (or raw A/V data) (s47040). Here, the STB 47030 may mean the above-described broadcast reception apparatus or the set top box. The STB 47030 may be mounted inside or outside the receiver.

A WM detector 47040 may detect the inserted WM from the received incompressible A/V data (s47050). The WM detector 47040 may detect the WM inserted by the WM inserter 47020 and deliver the detected WM to a WM manager.

The WM manager 47050 may parse the detected WM (s47060). In the above-described embodiment, the WM may have a URL protocol type field value of 001 and a URL value of atsc.org. Since the URL protocol type field value is 001, this may mean that http://protocol is used. The WM manager 47050 may combine http:// and atsc.org using this information to generate an entire URL (s47070).

The WM manager 47050 may send the completed URL to a browser 47060 and launch an application (s47080). In some cases, if the content source ID information and the timestamp information should also be delivered, the application may be launched in the form of http://atsc.org?cid=xxx&t=YYY.

The WM detector 47040 and the WM manager 47050 of the terminal are combined to perform the functions thereof in one module. In this case, steps s45050, s47060 and s47070 may be processed in one module.

FIG. 48 is a diagram showing the meanings of the values of an event field according to one embodiment of the present invention.

The present invention proposes an event field as one of the data which can be delivered via the watermarking scheme. In addition, the present invention proposes an efficient data structure of an event field.

The application may be launched via the URL extracted from the WM. The application may be controlled via a more detailed event. Events which can control the application may be indicated and delivered by the event field. That is, if an interactive application related to a currently viewed broadcast program is present, the URL of the application may be transmitted and the application may be controlled using events.

The event field may have a size of 3 bits. If the value of the event field is 000, this may indicate a "Prepare" command. Prepare is a preparation step before executing the application. A receiver, which has received this command, may download content items related to the application in advance. In addition, the receiver may release necessary resources in order to execute the application. Here, releasing the necessary resources may mean that a memory is cleaned or other unfinished applications are finished.

If the event field value is 001, this may indicate an "Execute" command. Execute may be a command for executing the application. If the event field value is 010, this may indicate a "Suspend" command. Suspend may mean that the executed application is suspended. If the event field value is 011, this may indicate a "Kill" command. Kill may be a command for finishing the already executed application. The event field values of 100 to 111 may be reserved for future use.

FIG. 49 is a diagram showing the meanings of the values of a destination type field according to one embodiment of the present invention.

The present invention proposes a destination type field as one of data which can be delivered via a watermarking scheme. In addition, the present invention proposes an efficient data structure of a destination type field.

With development of DTV related technology, supplementary services related to broadcast content may be provided by a companion device as well as a screen of a TV receiver. However, companion devices may not receive broadcast programs or may receive broadcast programs but may not detect a WM. Accordingly, among applications for providing a supplementary service related to currently broadcast content, if an application to be executed by a companion device is present, related information thereof should be delivered to the companion device.

At this time, even in an environment in which the receiver and the companion device interwork, it is necessary to know by which device an application or data detected from a WM is consumed. That is, information about whether the application or data is consumed by the receiver or the companion device may be necessary. In order to deliver such information as the WM, the present invention proposes a destination type field.

The destination type field may have a size of 3 bits. If the value of the destination type field is 0x00, this may indicate that the application or data detected by the WM is targeted at all devices. If the value of the destination type field is 0x01, this may indicate that the application or data detected by the WM is targeted at a TV receiver. If the value of the destination type field is 0x02, this may indicate that the application or data detected by the WM is targeted at a smartphone. If the value of the destination type field is 0x03, this may indicate that the application or data detected by the WM is targeted at a tablet. If the value of the destination type field is 0x04, this may indicate that the application or data detected by the WM is targeted at a personal computer. If the value of the destination type field is 0x05, this may indicate that the application or data detected by the WM is targeted at a remote server. Destination type field values of 0x06 to 0xFF may be reserved for future use.

Here, the remote server may mean a server having all supplementary information related to a broadcast program. This remote server may be located outside the terminal. If the remote server is used, the URL inserted into the WM may not indicate the URL of a specific application but may indicate the URL of the remote server. The receiver may communicate with the remote server via the URL of the remote server and receive supplementary information related to the broadcast program. At this time, the received supplementary information may be a variety of information such as a genre, actor information, synopsis, etc., of a currently broadcast program as well as the URL of an application related thereto. The received information may differ according to system.

According to another embodiment, each bit of the destination type field may be allocated to each device to indicate the destination of the application. In this case, several destinations may be simultaneously designated via bitwise OR.

For example, when 0x01 indicates a TV receiver, 0x02 indicates a smartphone, 0x04 indicates a tablet, 0x08 indicates a PC and 0x10 indicates a remote server, if the destination type field has a value of 0x6, the application or data may be targeted at the smartphone and the tablet.

According to the value of the destination type field of the WM parsed by the above-described WM manager, the WM manager may deliver each application or data to the companion device. In this case, the WM manager is a module for processing interworking with the companion device in the receiver and may deliver information related to each application or data.

FIG. 50 is a diagram showing the structure of data to be inserted into a WM according to embodiment #1 of the present invention.

In the present embodiment, data inserted into the WM may have information such as a timestamp type field, a timestamp, a content ID, an event field, a destination type field, a URL protocol type field and a URL. Here, the order of data may be changed and each datum may be omitted according to embodiments.

In the present embodiment, a timestamp size field of the timestamp type field may have a value of 01 and a timestamp unit field may have a value of 000. This may mean that 2 bits are allocated to the timestamp and the timestamp has a unit if milliseconds.

In addition, the event field has a value of 001, which means the application should be immediately executed. The destination type field has a value of 0x02, which may mean that data delivered by the WM should be delivered to the smartphone. Since the URL protocol type field has a value of 001 and the URL has a value of atsc.org, this may mean that the supplementary information or the URL of the application is http://atsc.org.

FIG. 51 is a flowchart illustrating a process of processing a data structure to be inserted into a WM according to embodiment #1 of the present invention.

Step s51010 of, at the service provider, delivering content to the WM inserter, step s51020 of, at the WM inserter, inserting the received content into the WM, step s51030 of, at the WM inserter, transmitting the content, into which the WM is inserted, step s51040 of, at the STB, receiving the content, into which the WM is inserted, and outputting the incompressible A/V data, step s51050 of, at the WM detector, detecting the WM, step s51060, at the WM manager, parsing the detected WM and/or step s51070 of, at the WM manager, generating an entire URL may be equal to the above-described steps.

The WM manager is a companion device protocol module in the receiver according to the destination type field of the parsed WM and may deliver related data (s51080). The companion device protocol module may manage interworking and communication with the companion device in the receiver. The companion device protocol module may be paired with the companion device. According to embodiments, the companion device protocol module may be a UPnP device. According to embodiments, the companion device protocol module may be located outside the terminal.

The companion device protocol module may deliver the related data to the companion device according to the destination type field (s51090). In embodiment #1, the value of the destination type field is 0x02 and the data inserted into the WM may be data for a smartphone. Accordingly, the companion device protocol module may send the parsed data to the smartphone. That is, in this embodiment, the companion device may be a smartphone.

According to embodiments, the WM manager or the device protocol module may perform a data processing procedure before delivering data to the companion device. The companion device may have portability but instead may have relatively inferior processing/computing capabilities and a small amount of memory. Accordingly, the receiver may process data instead of the companion device and deliver the processed data to the companion device.

Such processing may be implemented as various embodiments. First, the WM manager or the companion device protocol module may select only data required by the companion device. In addition, according to embodiments, if the event field includes information indicating that the application is finished, the application related information may not be delivered. In addition, if data is divided and transmitted via several WMs, the data may be stored and combined and then final information may be delivered to the companion device.

The receiver may perform synchronization using the timestamp instead of the companion device and deliver a command related to the synchronized application or deliver an already synchronized interactive service to the companion device and the companion device may perform display only. Timestamp related information may not be delivered, a time base may be maintained in the receiver only and related information may be delivered to the companion device when a certain event is activated. In this case, the companion device may activate the event according to the time when the related information is received, without maintaining the time base.

Similarly to the above description, the WM detector and the WM manager of the terminal may be combined to perform the functions thereof in one module. In this case, steps s51050, s51060, s51070 and s51080 may be performed in one module.

In addition, according to embodiments, the companion device may also have the WM detector. When each companion device receives a broadcast program, into which a WM is inserted, each companion device may directly detect the WM and then deliver the WM to another companion device. For example, a smartphone may detect and parse a WM and deliver related information to a TV. In this case, the destination type field may have a value of 0x01.

FIG. 52 is a diagram showing the structure of data to be inserted into a WM according to embodiment #2 of the present invention.

In the present embodiment, data inserted into the WM may have information such as a timestamp type field, a timestamp, a content ID, an event field, a destination type field, a URL protocol type field and a URL. Here, the order of data may be changed and each datum may be omitted according to embodiments.

In the present embodiment, a timestamp size field of the timestamp type field may have a value of 01 and a timestamp unit field may have a value of 000. This may mean that 2 bits are allocated to the timestamp and the timestamp has a unit of milliseconds. The content ID may have a value of 123456.

In addition, the event field has a value of 001, which means the application should be immediately executed. The destination type field has a value of 0x05, which may mean that data delivered by the WM should be delivered to the remote server. Since the URL protocol type field has a value of 001 and the URL has a value of remoteserver.com, this may mean that the supplementary information or the URL of the application is http://remoteserver.com.

As described above, if the remote server is used, supplementary information of the broadcast program may be received from the remote server. At this time, the content ID and the timestamp may be inserted into the URL of the remote server as parameters and requested from the remote server. According to embodiments, the remote server may obtain information about a currently broadcast program via support of API. At this time, the API may enable the remote server to acquire the content ID and the timestamp stored in the receiver or to deliver related supplementary information.

In the present embodiment, if the content ID and the timestamp are inserted into the URL of the remote server as parameters, the entire URL may be http://remoteserver.com?cid=1233456&t=5005. Here, CID may mean a query identifier of a content source ID to be reported to the remote server. Here, t may mean a query identifier of a current time to be reported to the remote server.

FIG. 53 is a flowchart illustrating a process of processing a data structure to be inserted into a WM according to embodiment #2 of the present invention.

Step s53010 of, at the service provider, delivering content to the WM inserter, step s53020 of, at the WM inserter, inserting the received content into the WM, step s53030 of, at the WM inserter, transmitting the content, into which the WM is inserted, step s53040 of, at the STB, receiving the content, into which the WM is inserted, and outputting the incompressible A/V data, step s53050 of, at the WM detector, detecting the WM, and step s53060, at the WM manager, parsing the detected WM may be equal to the above-described steps.

The WM manager may communicate with the remote server via the parsed destination type field 0x05. The WM manager may generate a URL http://remoteserver.com using the URL protocol type field value and the URL value. In addition, a URL http://remoteserver.com? cid= 123456&t= 5005 may be finally generated using the content ID and the timestamp value. The WM manager may make a request using the final URL (s53070).

The remote server may receive the request and transmit the URL of the related application suitable for the broadcast program to the WM manager (s53080). The WM manager may send the received URL of the application to the browser and launch the application (s53090).

Similarly to the above description, the WM detector and the WM manager of the terminal may be combined to perform the functions thereof in one module. In this case, steps s53050, s53060, s53070 and s53090 may be performed in one module.

FIG. 54 is a diagram showing the structure of data to be inserted into a WM according to embodiment #3 of the present invention.

The present invention proposes a delivery type field as one of data which can be delivered via a watermarking scheme. In addition, the present invention proposes an efficient data structure of a delivery type field.

In order to reduce deterioration in quality of audio/video content due to increase in amount of data inserted into the WM, the WM may be divided and inserted. In order to indicate whether the WM is divided and inserted, a delivery type field may be used. Via the delivery type field, it may be determined whether one WM or several WMs are detected in order to acquire broadcast related information.

If the delivery type field has a value of 0, this may mean that all data is inserted into one WM and transmitted. If the delivery type field has a value of 1, this may mean that data is divided and inserted into several WMs and transmitted.

In the present embodiment, the value of the delivery type field is 0. In this case, the data structure of the WM may be configured in the form of attaching the delivery type field to the above-described data structure. Although the delivery type field is located at a foremost part in the present invention, the delivery type field may be located elsewhere.

The WM manager or the WM detector may parse the WM by referring to the length of the WM if the delivery type field has a value of 0. At this time, the length of the WM may be computed in consideration of the number of bits of a predetermined field. For example, as described above, the length of the event field may be 3 bits. The size of the content ID and the URL may be changed but the number of bits may be restricted according to embodiments.

FIG. 55 is a diagram showing the structure of data to be inserted into a WM according to embodiment #4 of the present invention.

In the present embodiment, the value of the delivery type field may be 1. In this case, several fields may be added to the data structure of the WM.

A WMId field serves as an identifier for identifying a WM. If data is divided into several WMs and transmitted, the WM detector needs to identify each WM having divided data. At this time, the WMs each having the divided data may have the same WMId field value. The WMId field may have a size of 8 bits.

A block number field may indicate an identification number of a current WM among the WMs each having divided data. The values of the WMs each having divided data may increase by 1 according to order of transmission thereof. For example, in the case of a first WM among the WMs each having divided data, the value of the block number field may be 0x00. A second WM, a third WM and subsequent WMs thereof may have values of 0x01, 0x02, . . . . The block number field may have a size of 8 bits.

A last block number field may indicate an identification number of a last WM among WMs each having divided data. The WM detector or the WM manager may collect and parse the detected WMs until the value of the above-described block number field becomes equal to that of the last block number field. The last block number field may have a size of 8 bits.

A block length field may indicate a total length of the WM. Here, the WM means one of the WMs each having divided data. The block length field may have a size of 7 bits.

A content ID flag field may indicate whether a content ID is included in payload of a current WM among WMs each having divided data. If the content ID is included, the content ID flag field may be set to 1 and, otherwise, may be set to 0. The content ID flag field may have a size of 1 bit.

An event flag field may indicate whether an event field is included in payload of a current WM among WMs each having divided data. If the event field is included, the event flag field may be set to 1 and, otherwise, may be set to 0. The event flag field may have a size of 1 bit.

A destination flag field may indicate whether a destination type field is included in payload of a current WM among WMs each having divided data. If the destination type field is included, the destination flag field may be set to 1 and, otherwise, may be set to 0. The destination flag field may have a size of 1 bit.

A URL protocol flag field may indicate whether a URL protocol type field is included in payload of a current WM among WMs each having divided data. If the URL protocol type field is included, the URL protocol flag field may be set to 1 and, otherwise, may be set to 0. The URL protocol flag field may have a size of 1 bit.

A URL flag field may indicate whether URL information is included in payload of a current WM among WMs each having divided data. If the URL information is included, the URL flag field may be set to 1 and, otherwise, may be set to 0. The URL flag field may have a size of 1 bit.

The payload may include real data in addition to the above-described fields.

If data is divided into several WMs and transmitted, it is necessary to know information about when each WM is inserted. In this case, according to embodiments, a timestamp may be inserted into each WM. At this time, a timestamp type field may also be inserted into the WM, into which the timestamp is inserted, in order to know when the WM is inserted. Alternatively, according to embodiments, the receiver may store and use WM timestamp type information. The receiver may perform time synchronization based on a first timestamp, a last timestamp or each timestamp.

If data is divided into several WMs and transmitted, the size of each WM may be adjusted using the flag fields. As described above, if the amount of data transmitted by the WM increases, the quality of audio/video content may be influenced. Accordingly, the size of the WM inserted into a frame may be adjusted according to the transmitted audio/video frame. At this time, the size of the WM may be adjusted by the above-described flag fields.

For example, assume that any one of video frames of content has a black screen only. If a scene is switched according to content, one video frame having a black screen only may be inserted. In this video frame, the quality of content may not deteriorate even when a large amount of WMs is inserted. That is, a user does not sense deterioration in content quality. In this case, A WM having a large amount of data may be inserted into this video frame. At this time, most of the values of the flag fields of the WM inserted into the video frame may be 1. This is because the WM have most of the fields. In particular, a URL field having a large amount of data may be included in that WM. Therefore, a relatively small amount of data may be inserted into other video frames. The amount of data inserted into the WM may be changed according to designer's intention.

FIG. 56 is a diagram showing the structure of data to be inserted into a first WM according to embodiment #4 of the present invention.

In the present embodiment, if the value of the delivery type field is 1, that is, if data is divided into several WMs and transmitted, the structure of a first WM may be equal to that shown in FIG. 56.

Among WMs each having divided data, a first WM may have a block number field value of 0x00. According to embodiments, if the value of the block number field is differently used, the shown WM may not be a first WM.

The receiver may detect the first WM. The detected WM may be parsed by the WM manager. At this time, it can be seen that the delivery type field value of the WM is 1 and the value of the block number field is different from that of the last block number field. Accordingly, the WM manager may store the parsed information until the remaining WM having a WMID of 0x00 is received. In particular, atsc.org which is URL information may also be stored. Since the value of the last block number field is 0x01, when one WM is further received in the future, all WMs having a WMID of 0x00 may be received.

In the present embodiment, all the values of the flag fields are 1. Accordingly, it can be seen that information such as the event field is included in the payload of this WM. In addition, since the timestamp value is 5005, a time corresponding to a part, into which this WM is inserted, may be 5.005 seconds.

FIG. 57 is a diagram showing the structure of data to be inserted into a second WM according to embodiment #4 of the present invention.

In the present embodiment, if the value of the delivery type field is 1, that is, if data is divided into several WMs and transmitted, the structure of a second WM may be equal to that shown in FIG. 57.

Among WMs each having divided data, a second WM may have a block number field value of 0x01. According to embodiments, if the value of the block number field is differently used, the shown WM may not be a second WM.

The receiver may detect the second WM. The WM manager may parse the detected second WM. At this time, since the value of the block number field is equal to that of the last block number field, it can be seen that this WM is a last WM of the WMs having a WMId value of 0x00.

Among the flag fields, since only the value of the URL flag is 1, it can be seen that URL information is included. Since the value of the block number field is 0x01, this information may be combined with already stored information. In particular, the already stored atsc.org part and the /apps/app1.html part included in the second WM may be combined. In addition, in the already stored information, since the value of the URL protocol type field is 001, the finally combined URL may be http://atsc.org/apps/app1.html. This URL may be launched via this browser.

According to the second WM, a time corresponding to a part, into which the second WM is inserted, may be 10.005 seconds. The receiver may perform time synchronization based on 5.005 seconds of the first WM or may perform time synchronization based on 10.005 seconds of the last WM. In the present embodiment, the WMs are transmitted twice at an interval of 5 seconds. Since only audio/video may be transmitted during 5 seconds for which the WM is not delivered, deterioration in quality of content may be prevented. That is, even when data is divided into several WMs and transmitted, quality deterioration may be reduced. A time when the WM is divided and inserted may be changed according to embodiments.

Figure 58:
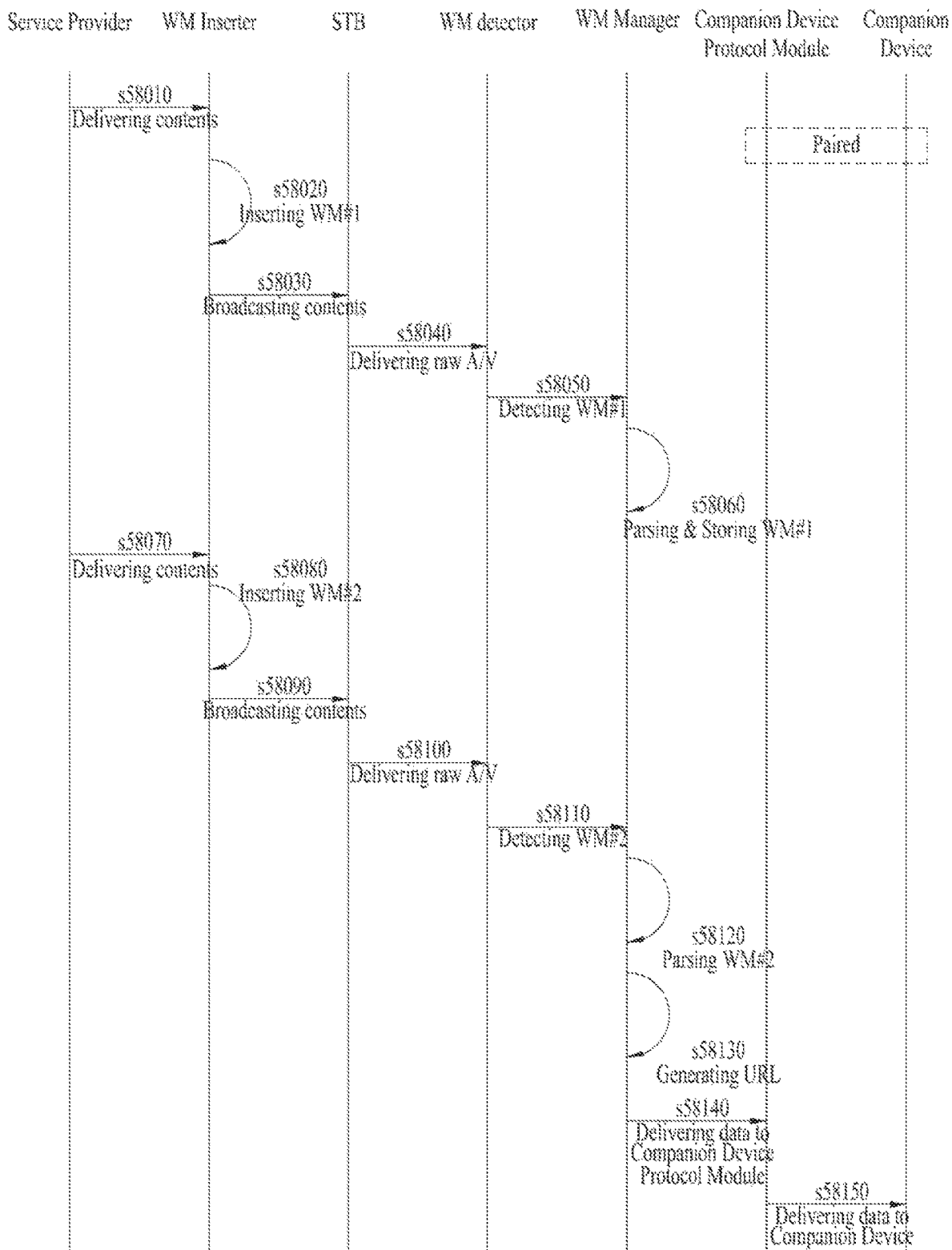
FIG. 58 is a flowchart illustrating a process of processing the structure of data to be inserted into a WM according to embodiment #4 of the present invention.

FIG. 58 is a flowchart illustrating a process of processing the structure of data to be inserted into a WM according to embodiment #4 of the present invention.

Step s58010 of, at the service provider, delivering content to the WM inserter, step s58020 of, at the WM inserter, inserting the received content into the WM #1, step s58030 of, at the WM inserter, transmitting the content, into which the WM #1 is inserted, step s58040 of, at the STB, receiving the content, into which the WM #1 is inserted, and outputting the incompressible A/V data, and step s58050 of, at the WM detector, detecting the WM #1 may be equal to the above-described steps.

WM #1 means one of WMs into which divided data is inserted and may be a first WM in embodiment #4 of the present invention. As described above, the block number field of this WM is 0x00 and URL information may be atsc.org.

The WM manager may parse and store detected WM #1 (s58060). At this time, the WM manager may perform parsing by referring to the number of bits of each field and the total length of the WM. Since the value of the block number field is different from the value of the last block number field and the value of the delivery type field is 1, the WM manager may parse and store the WM and then wait for a next WM.

Here, step s58070 of, at the service provider, delivering the content to the WM inserter, step s58080 of, at the WM inserter, inserting the received content to WM #2, step s58090 of, at the WM inserter, transmitting the content, into which WM #2 is inserted, step s58100 of, at the STB, receiving the content, into which WM #2 is inserted, and outputting incompressible A/V data and/or step s58110 of, at the WM detector, detecting WM #2 may be equal to the above-described steps.

WM #2 means one of WMs into which divided data is inserted and may be a second WM in embodiment #4 of the present invention. As described above, the block number field of this WM is 0x01 and URL information may be /apps/app1.html.

The WM manager may parse and store detected WM #2 (s58120). The information obtained by parsing WM #2 and the information obtained by parsing already stored WM #1 may be combined to generate an entire URL (s58130). In this case, the entire URL may be http://atsc.org/apps/app1.html as described above.

Step s58140 of, at the WM manager, delivering related data to the companion device protocol module of the receiver according to the destination type field and step s58150 of, at the companion device protocol module, delivering related data to the companion device according to the destination type field may be equal to the above-described steps.

The destination type field may be delivered by WM #1 as described above. This is because the destination flag field value of the first WM of embodiment #4 of the present invention is 1. As described above, this destination type field value may be parsed and stored. Since the destination type field value is 0x02, this may indicate data for a smartphone.

The companion device protocol module may communicate with the companion device to process the related information, as described above. As described above, the WM detector and the WM manager may be combined. The combined module may perform the functions of the WM detector and the WM manager.

Figure 59:
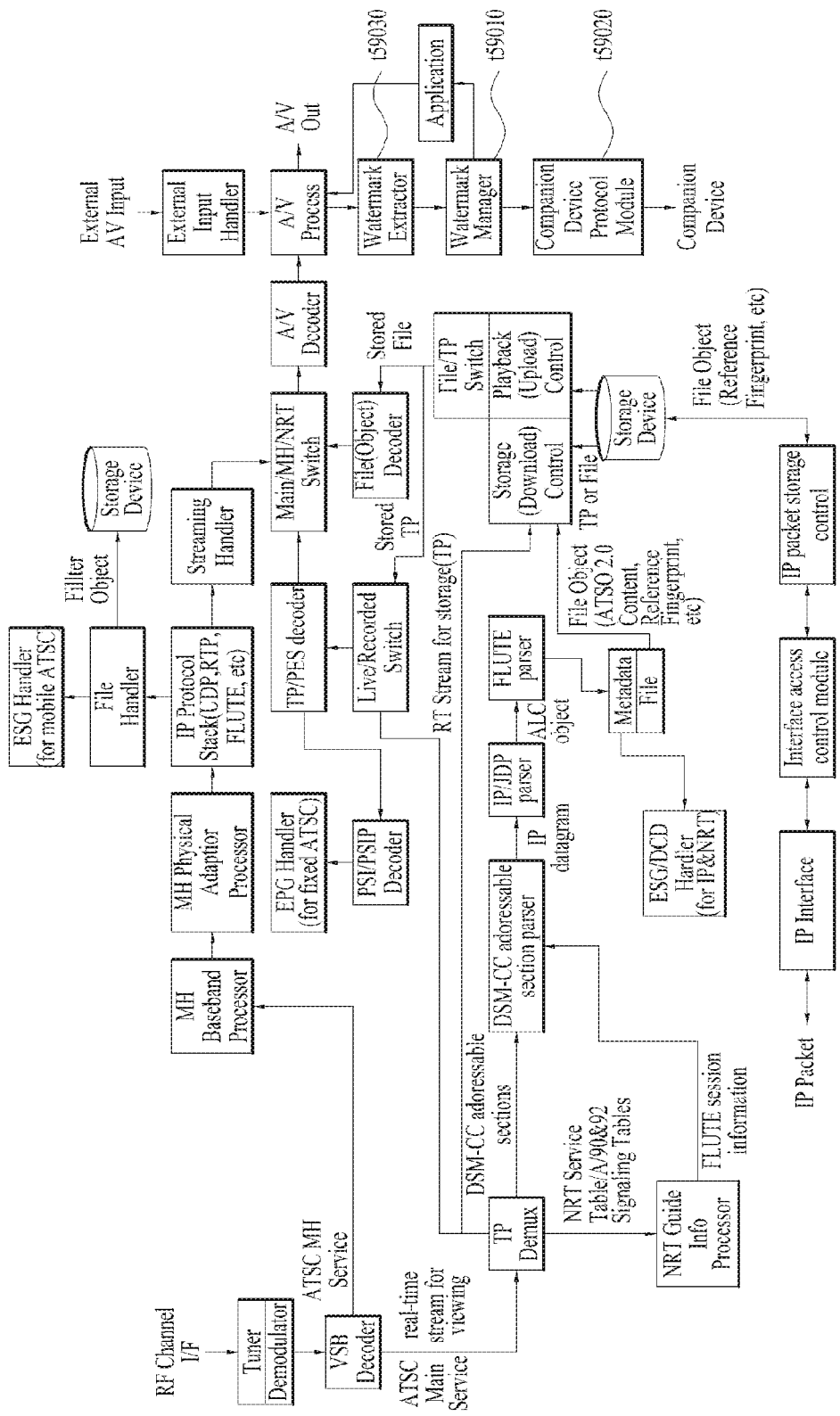
FIG. 59 is a diagram showing the structure of a watermark based image display apparatus according to another embodiment of the present invention.

FIG. 59 is a diagram showing the structure of a watermark based image display apparatus according to another embodiment of the present invention.

This embodiment is similar to the structure of the above-described watermark based image display apparatus, except that a WM manager t59010 and a companion device protocol module t59020 are added under a watermark extractor s59030. The remaining modules may be equal to the above-described modules.

The watermark extractor t59030 may correspond to the above-described WM detector.

The watermark extractor t59030 may be equal to the module having the same name as that of the structure of the above-described watermark based image display apparatus. The WM manager t59010 may correspond to the above-described WM manager and the companion device protocol module t59020 may correspond to the above-described companion device protocol module. Operations of the modules have been described above.

FIG. 60 is a diagram showing a data structure according to one embodiment of the present invention in a fingerprinting scheme.

In the case of a fingerprinting (FP) ACR system, deterioration in quality of audio/video content may be reduced as compared to the case of using a WM. In the case of the fingerprinting ACR system, since supplementary information is received from an ACR server, quality deterioration may be less than that of the WM directly inserted into content.

When information is received from the ACR server, since quality deterioration is reduced as described above, the data structure used for the WM may be used without change. That is, the data structure proposed by the present invention may be used even in the FP scheme. Alternatively, according to embodiments, only some of the WM data structure may be used.

If the above-described data structure of the WM is used, the meaning of the destination type field value of 0x05 may be changed. As described above, if the value of the destination type field is 0x05, the receiver requests data from the remote server. In the FP scheme, since the function of the remote server is performed by the ACR server, the destination type field value 0x05 may be deleted or redefined.

The remaining fields may be equal to the above-described fields.

FIG. 61 is a flowchart illustrating a process of processing a data structure according to one embodiment of the present invention in a fingerprinting scheme.

A service provider may extract a fingerprint (FP) from a broadcast program to be transmitted (s61010). Here, the service provider may be equal to the above-described service provider. The service provider may extract the fingerprint per content using a tool provided by an ACR company or using a tool thereof. The service provider may extract an audio/video fingerprint.

The service provider may deliver the extracted fingerprint to an ACR server (s61020). The fingerprint may be delivered to the ACR server before a broadcast program is transmitted in the case of a pre-produced program or as soon as the FP is extracted in real time in the case of a live program. If the FP is extracted in real time and delivered to the ACR server, the service provider may assign a content ID to content and assign information such as a transmission type, a destination type or a URL protocol type. The assigned information may be mapped to the FP extracted in real time and delivered to the ACR server.

The ACR server may store the received FP and related information thereof in an ACR DB (s61030). The receiver may extract the FP from an externally received audio/video signal. Here, the audio/video signal may be an incompressible signal. This FP may be referred to as a signature. The receiver may send a request to the server using the FP (s61040).

The ACR server may compare the received FP and the ACR DB. If an FP matching the received FP is present in the ACR DB, the content broadcast by the receiver may be recognized. If the content is recognized, delivery type information, timestamp, content ID, event type information, destination type information, URL protocol type information, URL information, etc. may be sent to the receiver (s61050).

Here, each information may be transmitted in a state of being included in the above-described field. For example, the destination type information may be transmitted in a state of being included in the destination type field. When responding to the receiver, the data structure used in the above-described WM may be used as the structure of the delivered data.

The receiver may parse the information received from the ACR server. In the present embodiment, since the value of the destination type field is 0x01, it can be seen that the application of the URL is executed by the TV. A final URL http://atsc.org may be generated using the value of the URL protocol type field and the URL information. The process of generating the URL may be equal to the above-described process.

The receiver may execute a broadcast related application via a browser using the URL (s61060). Here, the browser may be equal to the above-described browser. Steps s61040, s614050 and s61060 may be repeated.

Figure 62:
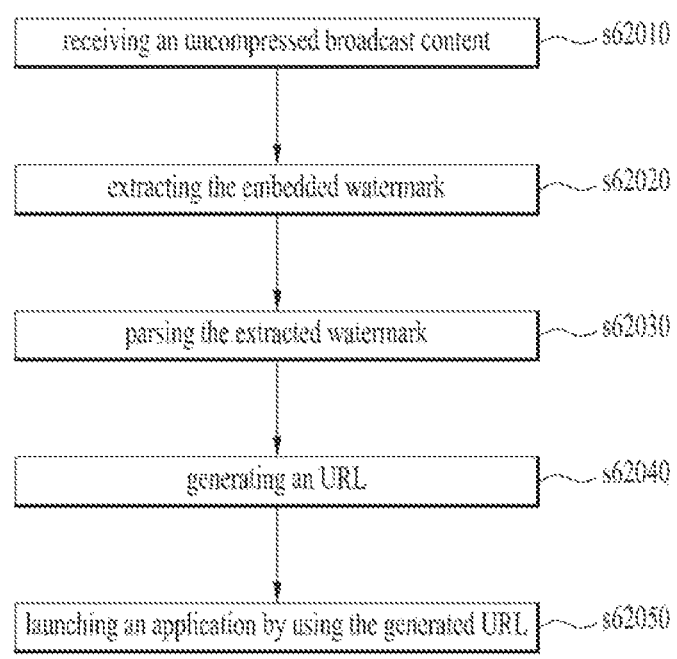
FIG. 62 illustrates a method of providing interactive services according to an embodiment of the present invention.

FIG. 62 illustrates a method of providing interactive services according to an embodiment of the present invention.

The method includes receiving an uncompressed broadcast content (s62010), extracting the embedded watermark (s62020), parsing the extracted watermark (s62030), generating an URL (s62040) and/or launching an application by using the generated URL (s62050).

The receiver can receive uncompressed broadcast contents from an external receiving unit (s62010). The external receiving unit can correspond to STB, described above. The uncompressed contents can be delivered to WM detector, described above. The uncompressed contents can include WM. As described above, the watermark can be embedded/inserted in a video/audio frame of the content. There can be plural WMs inserted in each plural frames of the uncompressed contents. The broadcast contents can be delivered to the receiver in forms of uncompressed contents, by STB, as described above.

The receiver can extract the embedded WM from the received uncompressed content (s62020). The extraction can be conducted by WM manager, described above. Also, the receiver can parse the extracted WM (s62030). The parsing can be conducted by WM manager as well.

The receiver or the WM manager described above, can generate an URL (s62040). The URL is for the application related to the interactive service. The application can provide the interactive services related to the uncompressed broadcast content. With the application, the user can be provided with the interactive service about the broadcast contents.

The receiver or the WM manager can use URL to launch the application (s62050). This step may correspond to the WM manager launching App. by using the browser. The browser may correspond to the above described browser.

In a method of providing interactive services according to other embodiment of the present invention, the watermark includes an URL field including a fraction of the URL, an URL protocol field indicating a protocol that the URL uses. As described above, the URL field can include a part of URL, such as "atsc.org". The URL protocol field, corresponding to the URL protocol field described above, can indicate protocols, such as http://, https://, etc.

In a method of providing interactive services according to another embodiment of the present invention, the receiver can generate final URL, by using the URL field and the URL protocol field. The generation process can be conducted by WM manager. The WM manager can combine the URL part carried by the URL field, and the protocol part of the URL indicated by the URL protocol field. The parts of the URL can be delivered to the receiver, through plural WMs. That is, the URL can be divided into even smaller parts, other than the embodiment described above. By combining the URL related information, the final URL can be generated.

In a method of providing interactive services according to another embodiment of the present invention, the uncompressed broadcast content can include plural WMs. The WMs can be inserted in plural video or audio frames of the broadcast content. The each WMs can include a fraction of the data that supposed to be delivered to the receiver. This embodiment may correspond to the embodiment using plural WMs including divided information, described above. Each of the WMs can include a delivery type field, described above. The delivery type field can indicate that the data is divided into plural fractions, and each fractions of data are being delivered by using the plural WMs.

In a method of providing interactive services according to another embodiment of the present invention, sizes of the each plural watermarks for the each frames can be adjusted by having a fraction of different sizes, based on quality of the each frames. As described above, in a case that plural WMs are used for carrying divided data, sizes of the each WMs can be adjusted. In that case, the size of WM can be adjusted by having certain fields or not. The configuration of the WM, what kind of information is included, can be recognized with flag information. By adjusting sizes based on quality situation in video/audio frames, the total quality of the contents can be prevented from quality deterioration.

In a method of providing interactive services according to another embodiment of the present invention, the each plural watermarks include flag information indicating configuration of the fraction of the data inserted in the each plural watermarks. Here, the flag information corresponds to such as, URL flag field, URL protocol flag field, and so on.

In a method of providing interactive services according to another embodiment of the present invention, in case that plural WMs are used for carrying plural fractions of data, one of the watermarks includes the URL protocol field, and one of the other watermarks includes the URL field. As described before, the parts of URL can be carried in several WMs by being carried in URL fields.

In a method of providing interactive services according to another embodiment of the present invention, the watermark further includes a timestamp size field, a timestamp unit field, an event field and a destination type field. The timestamp size field indicates number of bytes allocated for timestamps in the watermark. The timestamp unit field indicates time unit of the timestamps. The event field includes a command related to the application. The destination type field indicates a secondary device that the application is targeting. The timestamps establish time base for synchronizing the interactive services with the uncompressed broadcast content. Each fields are described above.

In a method of providing interactive services according to another embodiment of the present invention, the method further includes delivering the information in the parsed watermark to the secondary device that the application is targeting. As described above, the companion device protocol module can deliver information targeting second screen device, to corresponding second screen device.

In a method of providing interactive services according to another embodiment of the present invention, the receiver can process the in information in the parsed watermark, before delivering the information to the second screen device. Either WM manager or companion device protocol module can process information for second screen devices. The embodiments of such processing are described above. With such processing, the complexity on companion device's side can be reduced.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a content in a digital receiving apparatus, the method comprising:

receiving an uncompressed audio or video content from an external device;

obtaining a watermark message by re-assembling watermark blocks from the uncompressed audio or video content, wherein each of the watermark blocks includes a watermark identification field for identifying the watermark message, a fragment number field related to a number of a current watermark block of the watermark blocks, a last fragment field for specifying a number of a last watermark block of the watermark blocks, and a fragment of the watermark message, and wherein the watermark message includes first information for a first portion of a uniform resource locator (URL) and second information for a second portion of the URL;

constructing the URL based on the first information and the second information;

accessing a supplementary content based on the URL; and presenting the supplementary content.

2. The method of claim 1, further comprising:

obtaining another watermark message in the uncompressed audio or video content, wherein the another watermark message is a content identification message including a channel ID and a content ID, wherein the channel ID identifies a broadcast service associated with the uncompressed audio or video content, and wherein the content ID identifies the uncompressed audio or video content received from the external device.

3. The method of claim 2, wherein the content ID has a type of Entertainment Industry Data Registry (EIDR).

4. The method of claim 1, wherein the external device is a set top box (STB).

5. A digital receiving apparatus for processing a content, the digital receiving apparatus comprising:

a receiver configured to receive an uncompressed audio or video content from an external device;

a processor configured to obtain a watermark message by re-assembling watermark blocks from the uncompressed audio or video content, wherein each of the watermark blocks includes a watermark identification field for identifying the watermark message, a fragment number field related to a number of a current watermark block of the watermark blocks, a last fragment field for specifying a number of a last watermark block of the watermark blocks, and a fragment of the watermark message, wherein the watermark message includes first information for a first portion of a uniform resource locator (URL) and second information for a second portion of the URL, and wherein the processor is further configured to:

construct the URL based on the first information and the second information, and access a supplementary content based on the URL; and a display device configured to present the supplementary content.

6. The digital receiving apparatus of claim 5, wherein the processor is further configured to obtain another watermark message in the uncompressed audio or video content, wherein the another watermark message is a content identification message including a channel ID and a content ID, wherein the channel ID identifies a broadcast service associated with the uncompressed audio or video content, and wherein the content ID identifies the uncompressed audio or video content received from the external device.

7. The digital receiving apparatus of claim 6, wherein the content ID has a type of Entertainment Industry Data Registry (EIDR).

8. The digital receiving apparatus of claim 5, wherein the external device is a set top box (STB).

* * * * *